US012008423B2

(12) United States Patent
Hersch et al.

(10) Patent No.: US 12,008,423 B2
(45) Date of Patent: Jun. 11, 2024

(54) TWO-DIMENSIONAL CODES HIDDEN AS SCATTERED LINE SEGMENTS

(71) Applicants: Roger D. Hersch, Epalinges (CH); Romain Rossier, Vionnaz (CH)

(72) Inventors: Roger D. Hersch, Epalinges (CH); Romain Rossier, Vionnaz (CH)

(73) Assignee: Innoview Sarl, Epalinges (CH)

( * ) Notice: Subject to any disclaimer, the term of this patent is extended or adjusted under 35 U.S.C. 154(b) by 139 days.

(21) Appl. No.: 17/956,948

(22) Filed: Sep. 30, 2022

(65) Prior Publication Data

US 2024/0111984 A1 Apr. 4, 2024

(51) Int. Cl.
*G06K 19/06* (2006.01)

(52) U.S. Cl.
CPC . *G06K 19/06093* (2013.01); *G06K 19/06037* (2013.01); *G06K 19/06159* (2013.01)

(58) Field of Classification Search
None
See application file for complete search history.

(56) References Cited

U.S. PATENT DOCUMENTS

| | | | | |
|---|---|---|---|---|
| 10,628,647 | B1 * | 4/2020 | Rossier | G06T 1/005 |
| 2006/0280331 | A1 * | 12/2006 | Chosson | G07D 7/0032 |
| | | | | 382/100 |
| 2017/0076127 | A1 * | 3/2017 | Arce | G06K 19/06056 |
| 2017/0113481 | A1 | 4/2017 | Hersch et al. | |

OTHER PUBLICATIONS

S. Suzuki, K. Abe, Topological structural analysis of digitized binary images by border following, Computer Vision, Graphics, and Image Processing vol. 30, No. 1, 1985 32-46.
D. H. Douglas, T. K. Peucker, Algorithms for the reduction of the No. of points required to represent a digitized line or its caricature, Cartographica: The International Journal for Geographic Information and Geovisualization vol. 10 No. 2, 1973, 112-122.
R. Hartley, A. Zisserman, Multiple View Geometry in Computer Vision, Section 2.3 Projective transformations, 2nd Edition, Cambridge University Press, 2003, pp. 32-36.
N. Otsu, A threshold selection method from gray-level histograms, IEEE Transactions on Systems, Man and Cybernetics 9 (1) (1979) 62-66.

* cited by examiner

*Primary Examiner* — Kristy A Haupt

(57) ABSTRACT

Methods are disclosed for hiding a two-dimensional code such as a QR code within a visible layer of randomly scattered line segments. The scattering parameters comprise the length of successive line segments as well as their relative offsets. These parameters are stored in a key. The hidden 2d code is recovered with a computing device such as a smartphone carrying out the acquisition, perspective correction, and rectification of the visible layer of scattered line segments. This computing device synthesizes in its memory according to that same key a hidden layer of scattered line segments. The superposition of the acquired, perspectively corrected and rectified visible layer and of the hidden layer yields an image from which the hidden 2D code is revealed. The presented methods enable the secret transmission of information from the real world of documents and objects to databases located on computer networks.

26 Claims, 35 Drawing Sheets

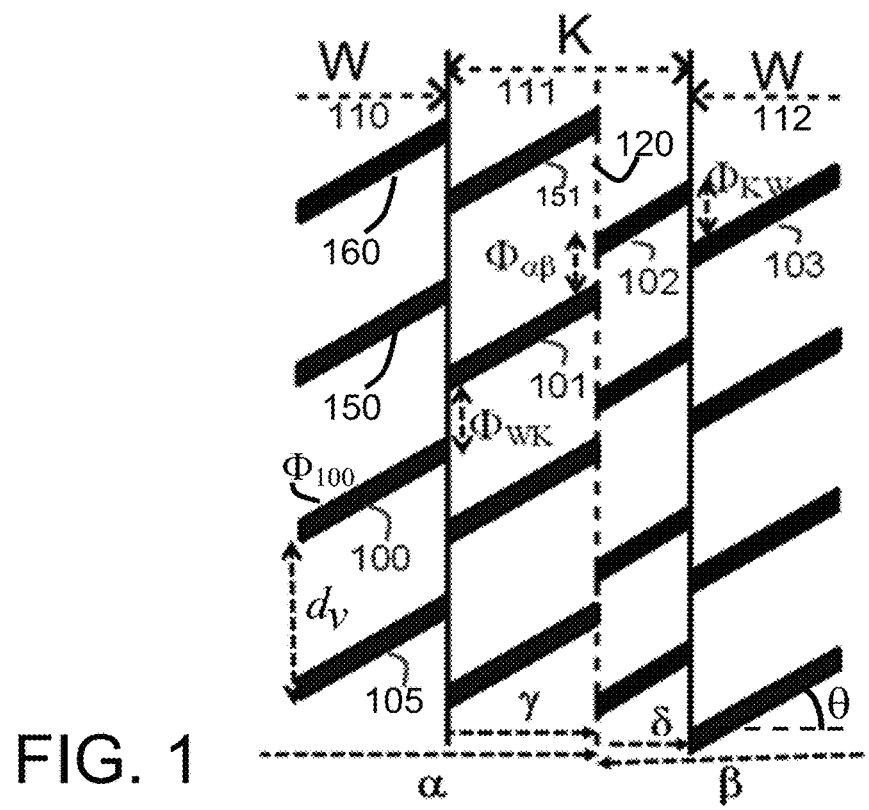
FIG. 1
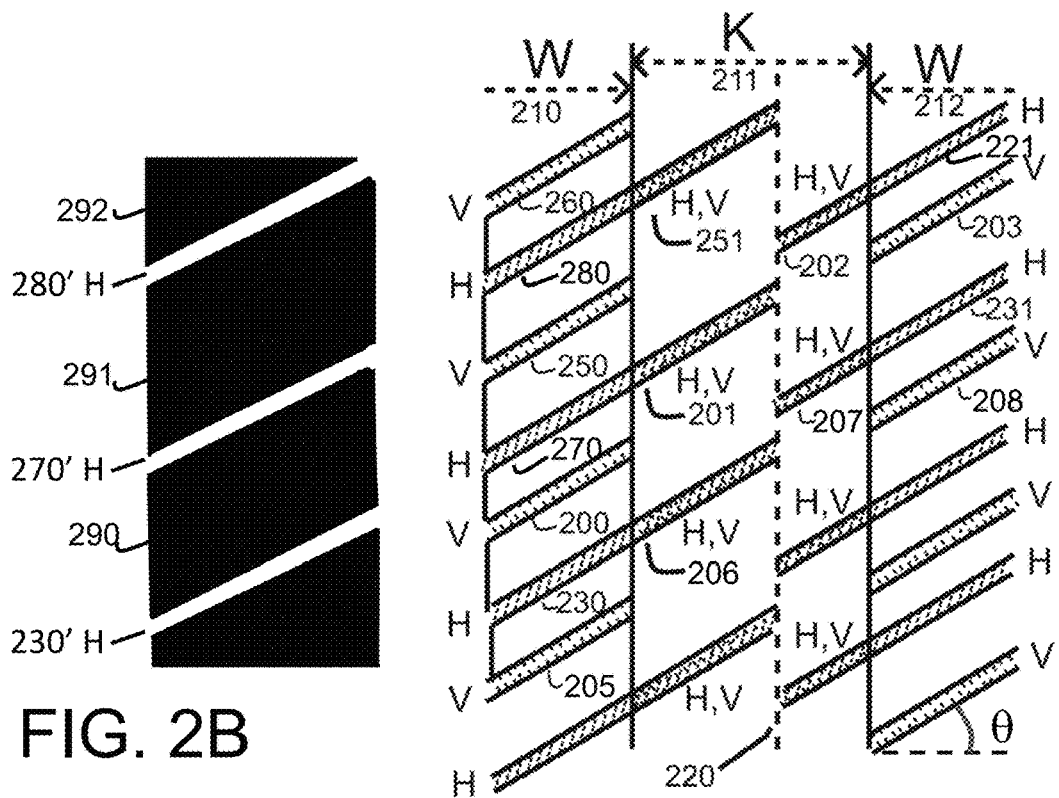
FIG. 2B
FIG. 2A

TWO-DIMENSIONAL CODES HIDDEN AS SCATTERED LINE SEGMENTS

CROSS-REFERENCE TO RELATED APPLICATIONS

The present application is related to U.S. patent application Ser. No. 16/261,611, now U.S. Pat. No. 10,628,647, filed Jan. 30, 2019, inventors R. Rossier and R. D. Hersch, also inventors in the present application, incorporated herein by reference.

FIELD OF THE DISCLOSURE

The present disclosure describes a system for recovering 2D codes such as QR-codes which are hidden within a visible layer containing scattered line segments. These 2D hidden codes carry a message. The hidden 2D codes are recovered with a software program running on the smartphone that captures an image of the visible layer containing the scattered line segments and performs a superposition operation with a layer hidden into the smartphone that also comprises scattered line segments.

BACKGROUND

Today's identification and tracking systems rely mainly on messages incorporated into barcodes, data matrix codes, Aztec codes and/or QR-codes. These kinds of codes have the disadvantage of being directly visible to human beings and at the same time of lacking an aesthetical value. There is a need of hiding these 2D codes and the message that they carry about a product, a service or a person. For example, hiding a 2D code within a product label helps raising the acceptability of that product. As a further example, a personal pass containing spatial information hidden within the face image of the document holder reinforces the security of that pass. The main advantage of the proposed system for hiding 2D codes resides in the fact that the 2D codes can neither be synthesized nor be modified without knowing the key that determines the layout of the scattered line segments. Such non-modifiable hidden 2D codes offer a strong protection against intruders and counterfeiters, compared with classical overt 1D or 2D barcodes.

A prior art effort for hiding a 2D code such as a QR-code is disclosed in U.S. Pat. No. 10,152,663, "Method to store a secret QR-code," inventors Gonzalo R. Arce, Gonzalo Garateguy, S. Xiaolu Wang, and Daniel L. Lau. The inventors describe a method to combine an overt code and a hidden code. The overt code has to be coloured. The hidden code is indirectly encoded onto a set of predefined directions orthogonal to the direction of the luminance vector in the RGB color space. This method aims at creating and transmitting a hidden code over electronic media. No mention is made about printing the hidden code and recovering it by a smartphone.

U.S. Pat. No. 10,628,647, inventors R. Rossier and R. D. Hersch, also inventors in the present application discloses a method to hide spatial codes by a multigrating with continuous grating lines shifted according to an elevation profile derived from the binary original code. The printed multigrating is acquired by the camera of a smartphone, perspectively rectified, phase controlled and superposed with a revealing layer forming also a grating of continuous lines. The superposed image is then processed to recover the hidden 2D code.

The present invention aims at improving the invention presented in U.S. Pat. No. 10,628,647 by creating a more advanced method for creating, printing and recovering hidden 2D codes. U.S. Pat. No. 10,628,647 has the drawback that the lines forming the base layer are continuous. An unauthorized third party may therefore, using tools such as Adobe Illustrator, try to recover the hidden code by forming a pseudo revealing line grating that follows the continuous lines present within the base layer and that, once superposed with the base layer, reveals the hidden code.

The present invention relies on the superposition of a visible layer of scattered line segments hiding a 2D code and of a hidden layer of scattered line segments. The layout of the scattered line segments in both layers is defined by a same key. Since the hidden layer of scattered segments is dynamically generated in a smartphone, it remains unknown to the public. The hidden 2D code can only be retrieved by the holder of the smartphone storing the key and therefore capable of generating the hidden layer. Within the smartphone, the superposition of visible and hidden layers enables recovering the hidden 2D code.

SUMMARY

The present invention discloses a method for hiding 2D codes such as QR codes within a visible layer, e.g. a print. This visible layer is formed by line segments that are scattered according to a key. Looking at the visible layer, there is no way of recovering the 2D hidden code. The hidden 2D code can be recovered by a smartphone holding the key with which visible and hidden layers of scattered line segments are generated. This smartphone performs a camera acquisition of the visible layer, a perspective correction, and a rectification. In addition, the smartphone synthesizes the hidden layer according to the key that that has been used to synthesize the visible layer. By superposing the perspectively corrected and rectified visible layer of scattered segments with the hidden layer of scattered segments, it recovers the 2D code that is hidden within the visible layer. Without the key, there is no way of generating the correct hidden layer of scattered segments and of recovering the hidden code.

A 2D code such as a QR-code is hidden within a visible layer made of scattered line segments. A key specifies successions of pseudo-randomly scattered line segments, each line segment being defined by its length and by its phase. In white regions of the 2D code, the scattered line segments are further offset by a fixed phase displacement value, i.e. their phase is the initial phase defined by the key plus the phase displacement due to the white region. With the same key, a hidden layer of scattered line segments is generated without any offset. In black regions of the 2D code, the scattered line segments of the visible layer and the scattered line segments of the hidden layer do overlap. In white regions of the 2D code, the corresponding line segments are disjoint. Within a computing device or within a smartphone, the superposition of an acquired, perspectively corrected and rectified visible layer and of a hidden layer generated with the same key enables retrieving the hidden 2D code.

In many use cases, a visible layer in one orientation hides a first 2D code and a visible layer in another orientation hides a second 2D code. The pixel by pixel union of both visible layers yields the composite visible layer. The smartphone acquires an image of the composite visible layer, performs perspective correction and rectification. It then generates one hidden layer at each of the two orientations.

The first hidden layer superposed with the perspectively corrected and rectified composite visible layer yields the first hidden 2D code and the second hidden layer superposed with the perspectively corrected and rectified composite visible layer yields the second hidden 2D code.

Rectification of the acquired and perspectively corrected visible layer is carried out by localizing a cross-grating surrounding the active area of the visible layer, by establishing correspondences between geometrically correct cross-grating intersections and actual cross-grating intersections and by deriving from these correspondences a geometric transformation mapping actual visible layer scattered segment locations onto locations as close as possible to geometrically correct visible layer scattered segment locations.

Within a visible layer, localizing the cross-grating surrounding the area of scattered segments is performed by searching for the external thin dark frame bordering the visible layer, searching the separating white area between external thin dark rectangular frame and the cross-grating and finally by finding the cross-grating. In order to find the top-left pixel and the starting pixel of the cross-grating, this search is performed only on the top left corner of the visible layer. The average intensity value within a vertical or a horizontal kernel indicates if the kernel is on a white area (external white), on a dark area (i.e. within the external thin dark rectangular frame) or on a gray area where black and white structures alternate (i.e. within the cross-grating). Kernels traversing areas selected from the succession of high intensity (external white), low intensity (thin dark frame), high intensity (white space between thin dark frame and cross-grating) and middle intensity (cross-grating) areas find the left most and top most pixels of the cross-grating. Their horizontal and vertical coordinates define the top-left corner of the cross-grating. Such a localization procedure is very fast.

In a further embodiment, it is possible to hide a 2D code within a single visible layer, i.e. a single layer of scattered line segments having a given orientation $\theta$, for example $-45°$. In that case, the cross-grating frame surrounding the single layer of scattered line segments can be created with a second grating of orientation $\theta+90°$, placed only at the areas defined for the cross-grating.

The present invention also discloses how to hide a 2D code in either slightly more than half the space or in slightly more than quarter the space that would be taken by the prior art method described in U.S. Pat. No. 10,628,647. We show a "half space" example where the active area hiding the 2D code takes only 52.3% of the space that would have been taken by the prior art method. We also show a "quarter space" example, where the active area hiding the code takes only 30.6% of the space that would have been taken by the prior art method.

Further advantages of the present disclosure are the following.

The scattered segments that form the visible layer and that hide a 2D code have a random spatial distribution, defined by one or more vectors of random numbers that are part of the secret key. Since the key is unknown to a potential intruder, the intruder has no means of creating a hidden layer that would allow recovering the hidden 2D code. In addition, without knowing the key, the potential intruder has no means of synthesizing a visible layer of scattered line segments that would incorporate a valid 2D code. Thanks to the presence of a cross-grating frame surrounding the active area of the visible layer containing the randomly scattered line segments hiding the 2D code, and thanks to a cross-grating localization procedure, a fast and exact registration is obtained between the acquired and processed image of the visible layer and the hidden layer. This exact registration enables within the smartphone the superposition of the acquired, perspectively corrected, and rectified visible layer with the hidden layer, generated by software within the smartphone. The superposition, low-pass filtered and thresholded, enables recovering the hidden 2D code.

The same framework enables hiding any kind of spatial code, e.g. QR-codes, data matrix codes, Aztec codes, 1D bar codes, custom codes, written words, alphanumerical signs, and graphical symbols. Such types of spatial codes can be hidden within the randomly scattered line segments of the visible layer. The superposition of the visible layer with the hidden layer enables recovering the hidden spatial code.

Let us give some insight into possible implementations. In respect to the visible and hidden layers, the length and phase of the line segments are specified in a horizontal space formed by vertically laid out horizontal bands. The actual line segments are created at an oblique orientation, by rotating the line segments specified in the horizontal space. The sequence of scattered line segments repeats itself horizontally within the horizontal bands. In a preferred embodiment, sequences of scattered segments on other bands are shifted instances of the scattered line segments present in a base band, the shift values being given by sequence shift numbers stored into a sequence shift number vector. The sequence shift numbers are random numbers between 1 and $w-1$, where $w$ is the length of the sequences of scattered line segments. As an alternative, each band can have its own specific sequence of scattered line segments. In that case, the key would incorporate one sequence vector per band. Long sequences of randomly scattered line segments can be made as complex as desired so as to perfectly hide a 2D code. The examples shown in the figures are didactical. They are not optimized for very high hiding capabilities.

In the case of "half-size" visible and hidden layer sizes, the top part of the hidden 2D code is hidden by scattered line segments at a first orientation (e.g. $-45°$) and the bottom part of the hidden 2D code is hidden by scattered line segments at a second orientation (e.g. $+45°$). The top part and the bottom part of the 2D code are recovered separately and assembled into a full 2D code. In the case of a "quarter-size" visible and hidden layer, the hidden 2D code is derived from a QR-code whose information modules are rearranged to form a first part hidden by scattered line segments at a first orientation (e.g. $-45°$) and a second part hidden by scattered line segments at a second orientation (e.g. $+45°$). Recovering the QR-code requires recovering the first part by superposing on the acquired, perspectively corrected, and rectified visible layer a first hidden layer having the first orientation (e.g. $-45°$), requires recovering the second part by superposing on the visible layer a second hidden layer having the second orientation (e.g. $+45°$), and requires reassembling the recovered information modules into a full QR-code.

A possible embodiment consists of a computing device or a smartphone which authenticate documents or goods by recovering a 2D code hidden into a visible layer of line segments scattered according to a key. Such a computing device or smartphone comprises:

(i) a CPU, a memory, a display, a camera or a scanner and a network interface;
(ii) a software module operable for acquisition, perspective correction, and rectification of the visible layer of scattered line segments;

(iii) a software module operable for the synthesis of a hidden layer made of line segments scattered according to that key;

(iv) a software module for the superposition of the perspectively corrected and rectified visible layer and of said hidden layer; the superposition recovering, after filtering and thresholding, the hidden 2D code. The recovered hidden 2D code can be decoded and compared with a list of valid 2D codes. This comparison helps in deciding if the document or object incorporating the visible layer is authentic or not.

The software modules performing the perspective correction and rectification, the synthesis of the hidden layer and the superposition of the perspectively corrected and rectified visible layer with the hidden layer can be deployed on a distributed computing system comprising a tracking computing server that is distinct from the computing device or smartphone performing the acquisition. In such a case, a computer connected to a camera or a scanner or a smartphone performs the acquisition and perspective correction. It transfers the acquired and perspectively corrected image of the visible layer to the tracking computing server. This tracking server recovers the hidden 2D code, decodes it and writes the decoded message into a repository. Such a repository forms the data base that is used by the tracking server to establish statistics about time and geographic location of goods that have been marked with a visible layer of scattered segments.

FIGURES

FIG. 1 shows an example of a part of a visible layer formed by scattered line segments hiding a vertical black bar (K) on a white background (W), where transitions between successive line segments are either white black transitions (W→K), black white transitions (K→W), α-area β-area transitions (α→β) or β-area α-area transitions (β→α);

FIG. 2A shows the same example as in FIG. 1, but with both the visible layer of scattered line segments (V) and the hidden layer of scattered line segments (H);

Figure 3:
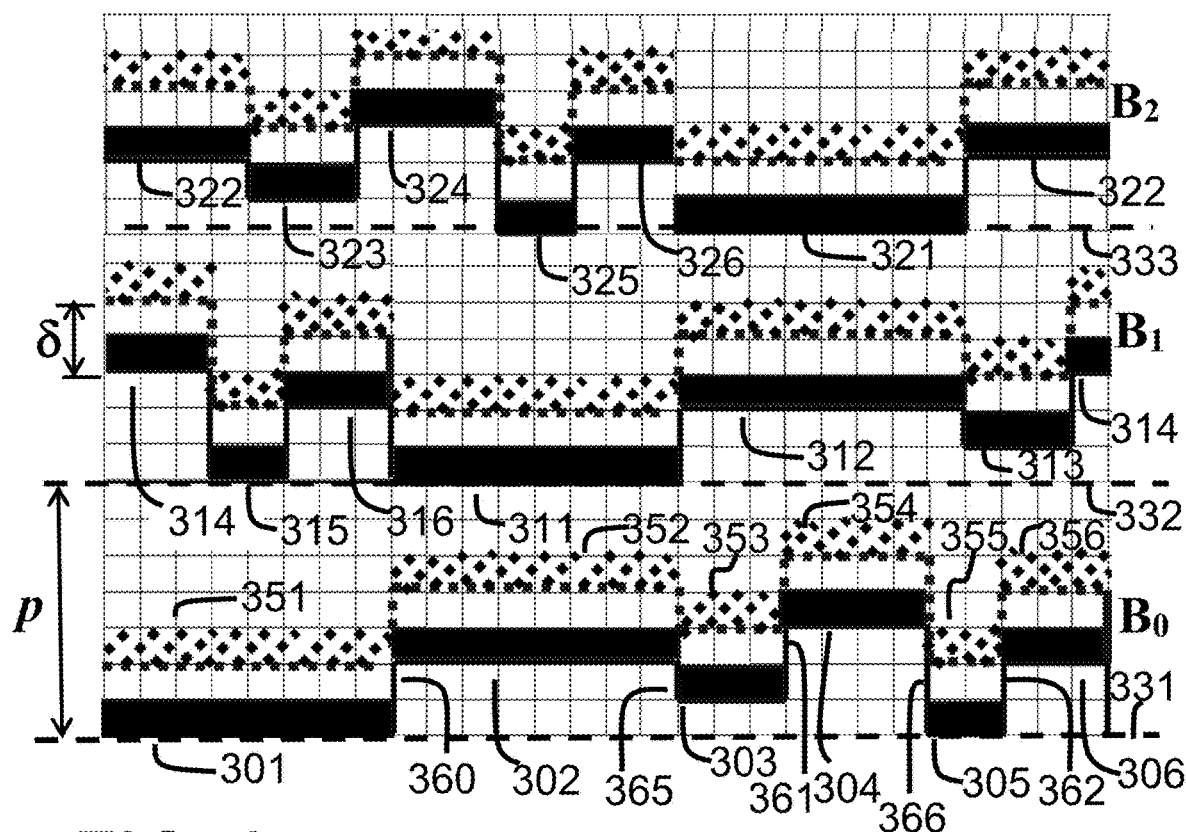
Figure 4:
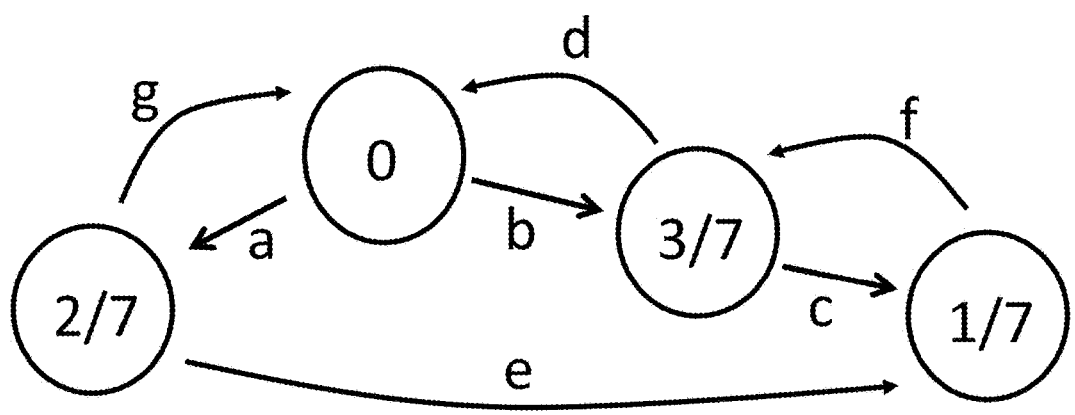
Figure 5A:
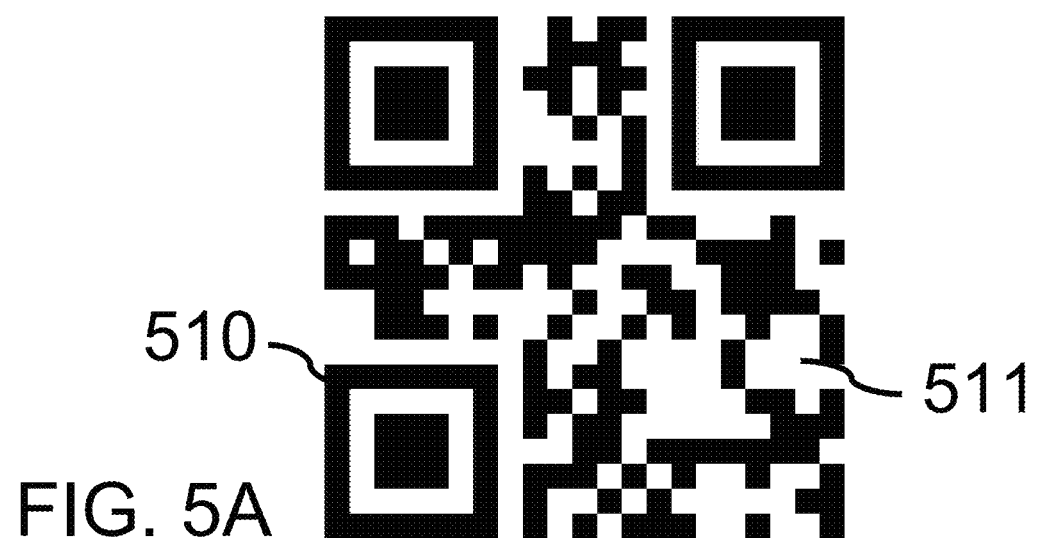
Figure 5B:
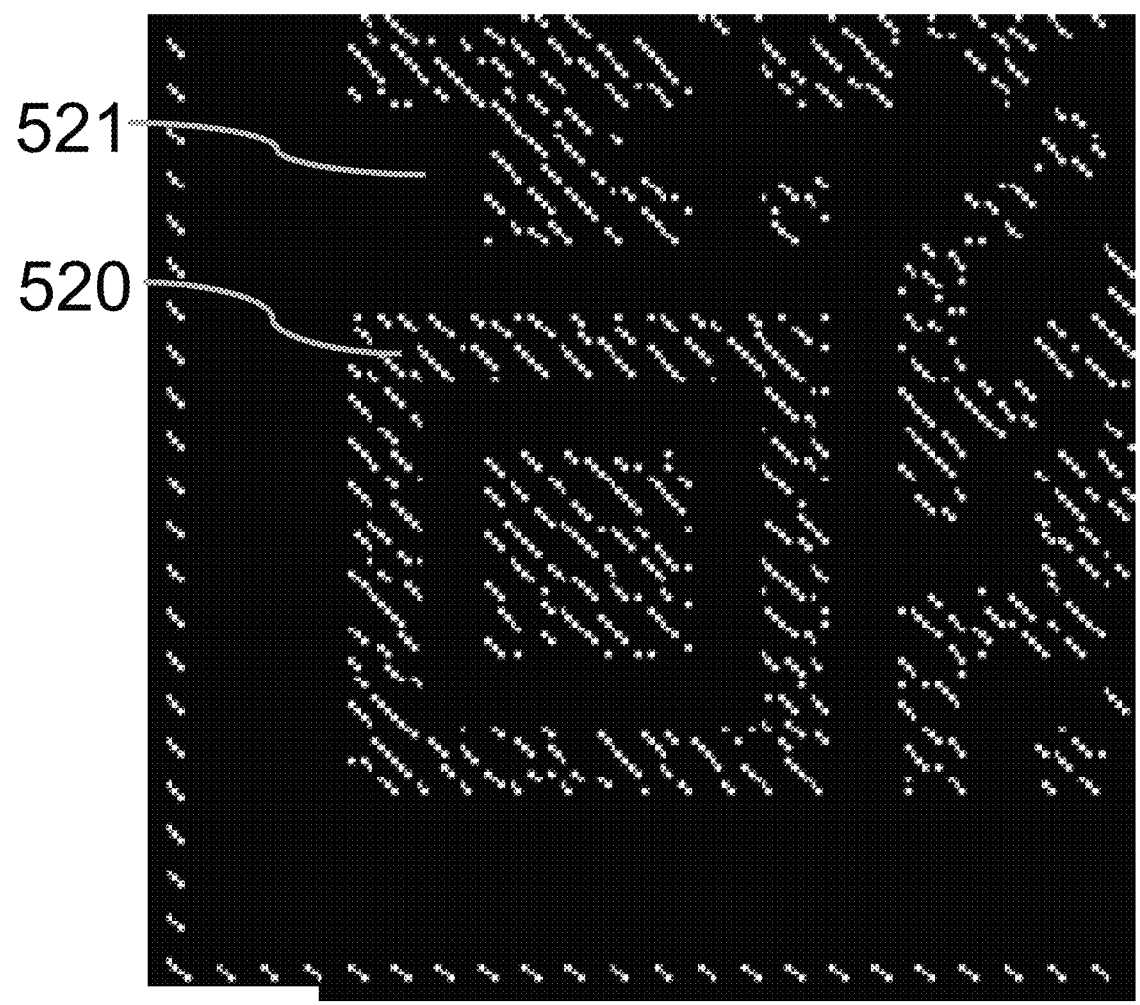
Figure 6:
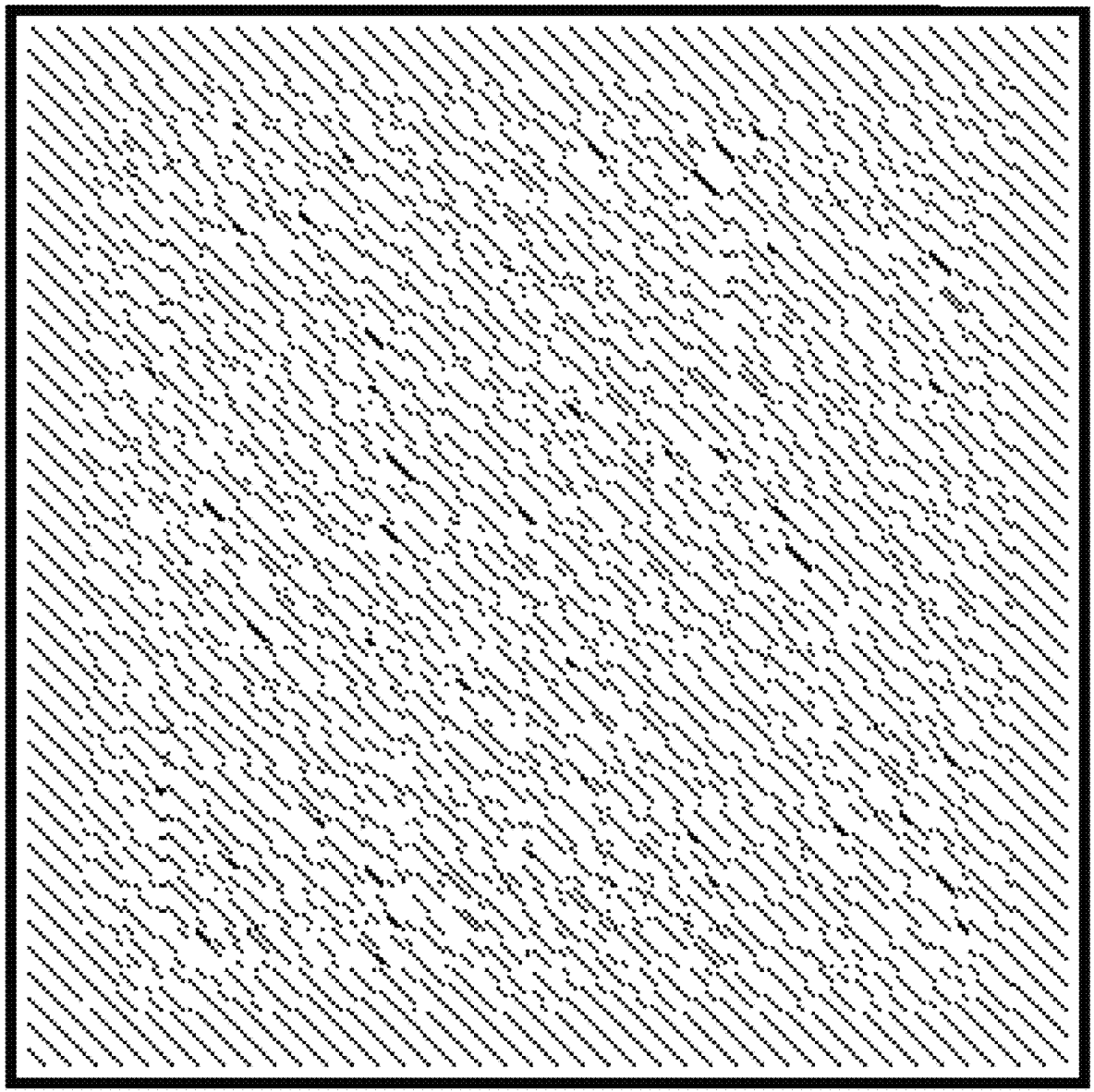
Figure 7:
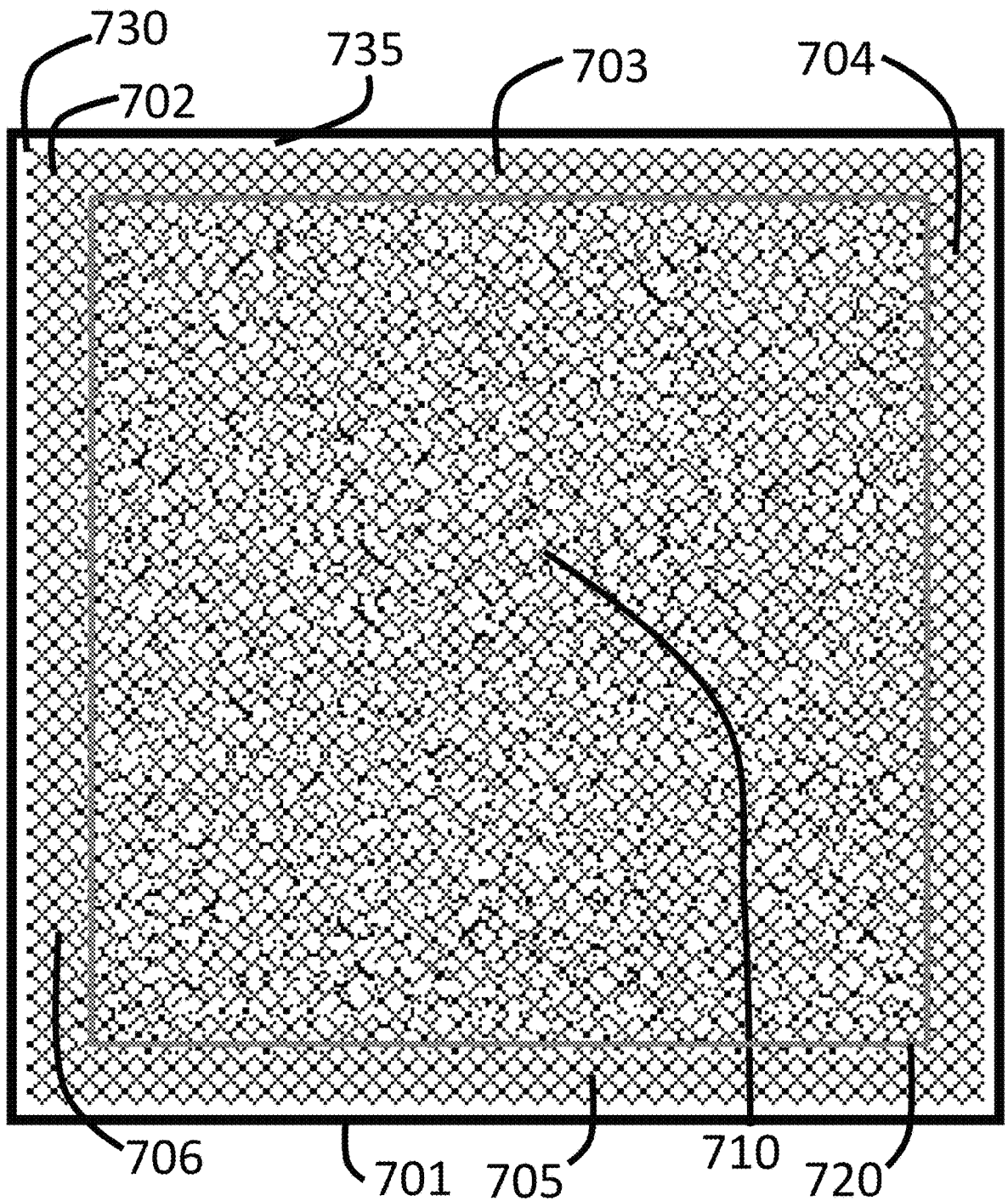
Figure 8:
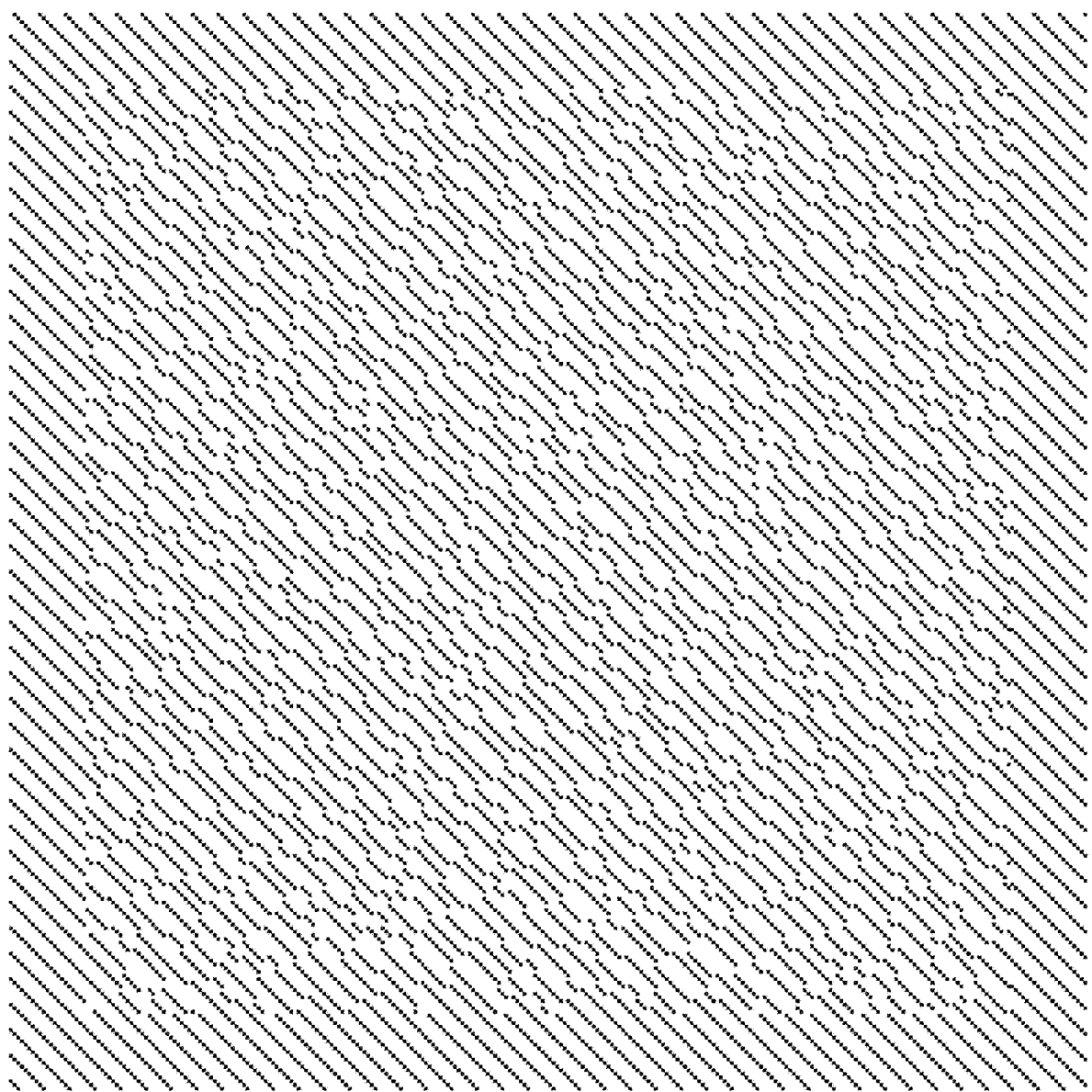
Figure 9:
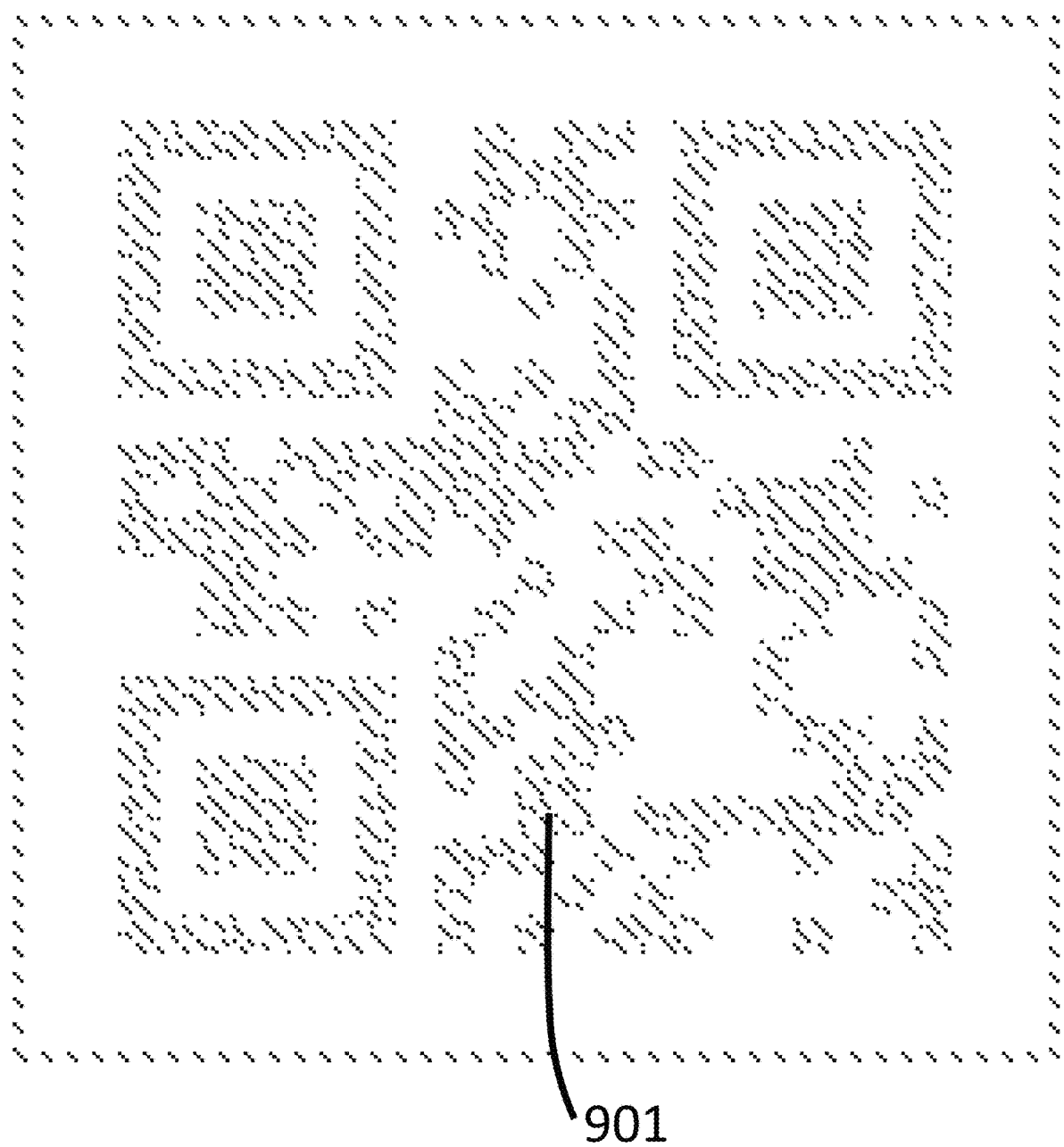
Figure 10:
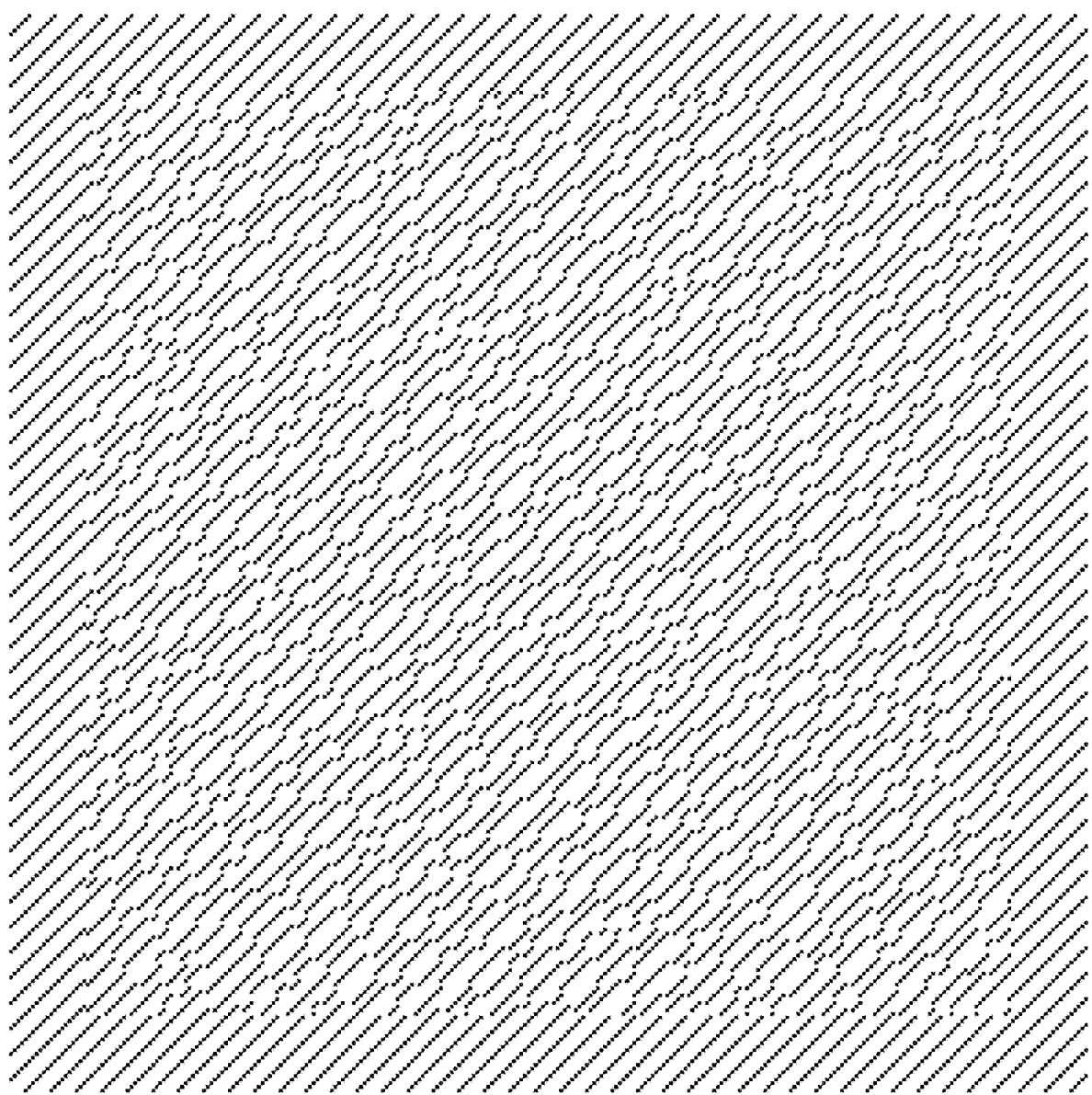
Figure 11:
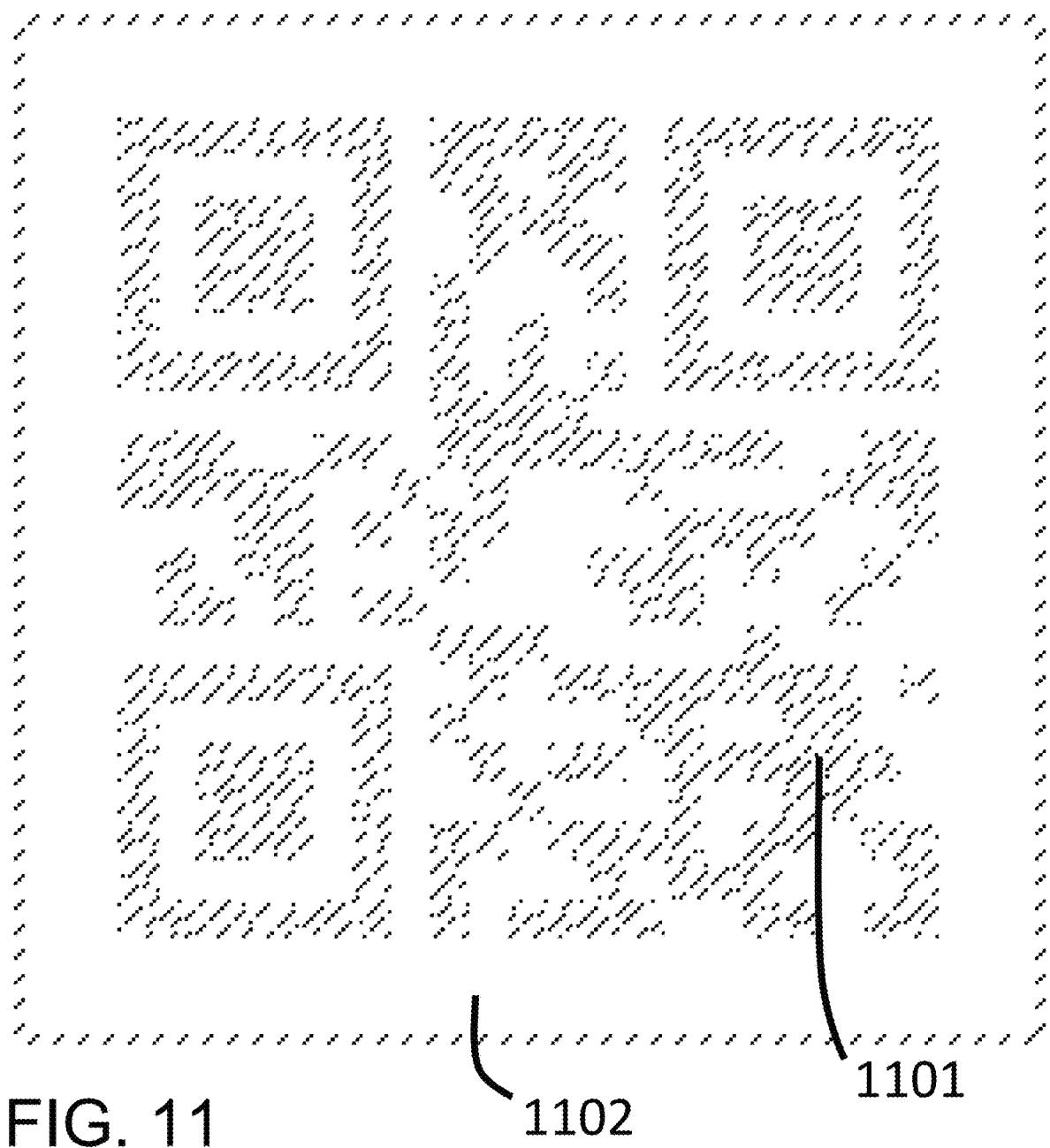
Figure 12:
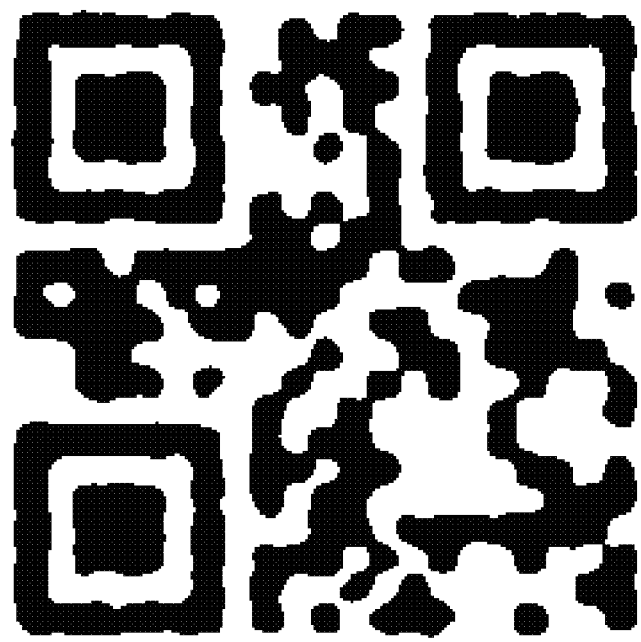
Figure 13:
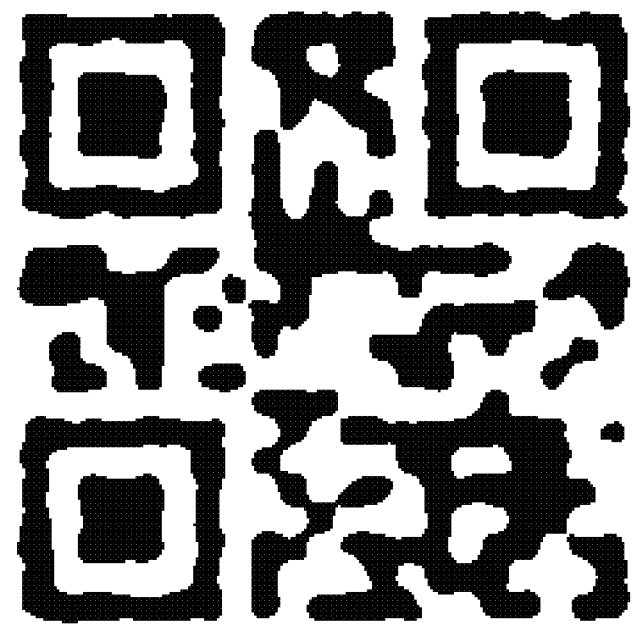
Figure 14A:
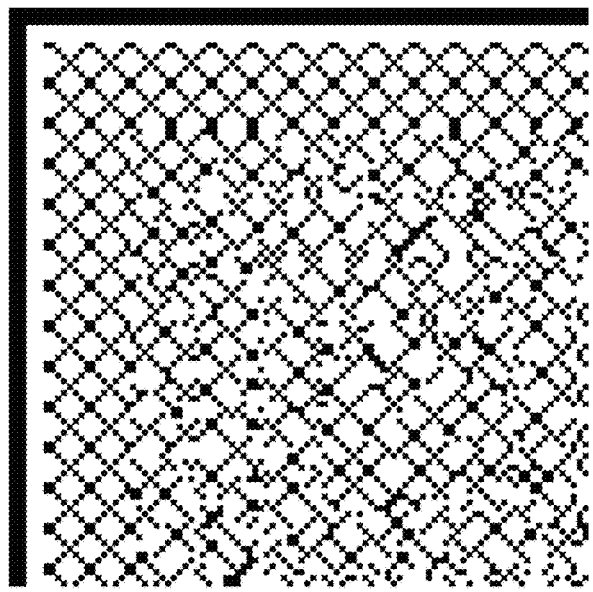
Figure 14B:
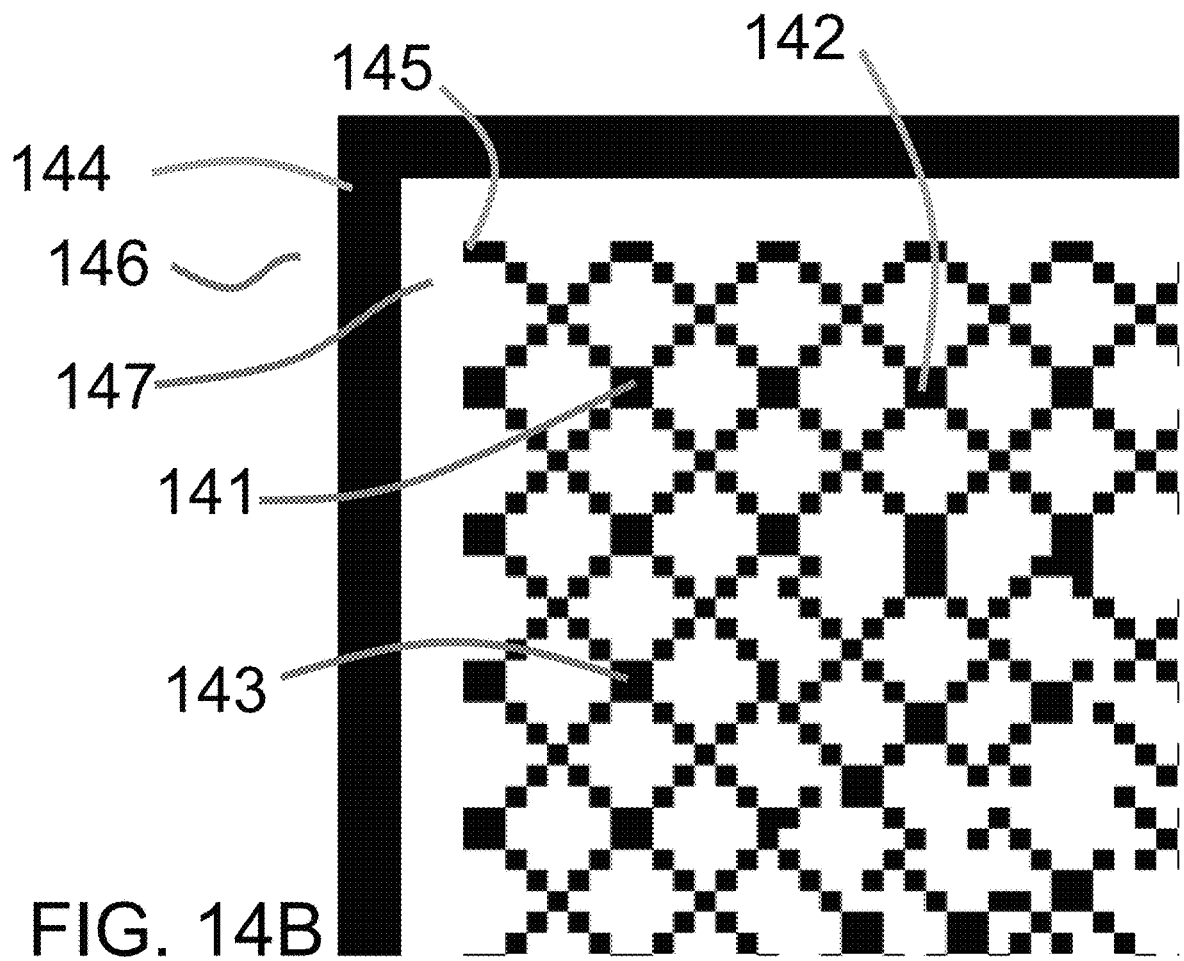
Figure 15A:
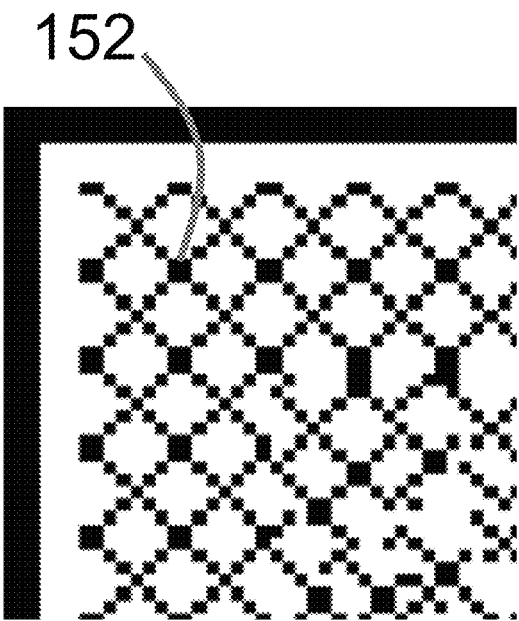
Figure 15C:
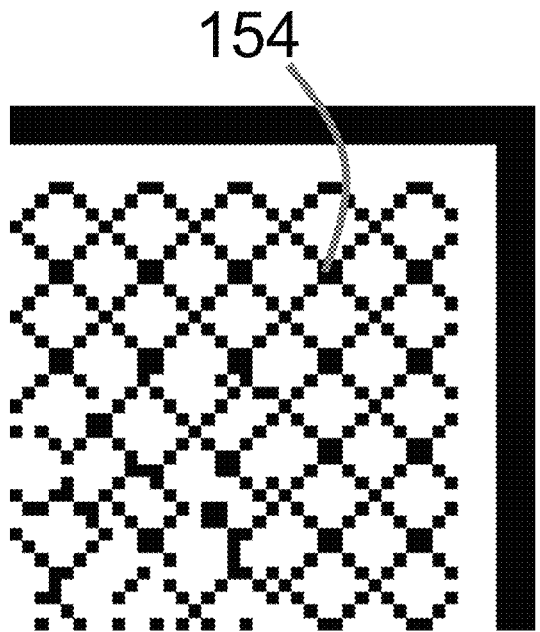
Figure 15B:
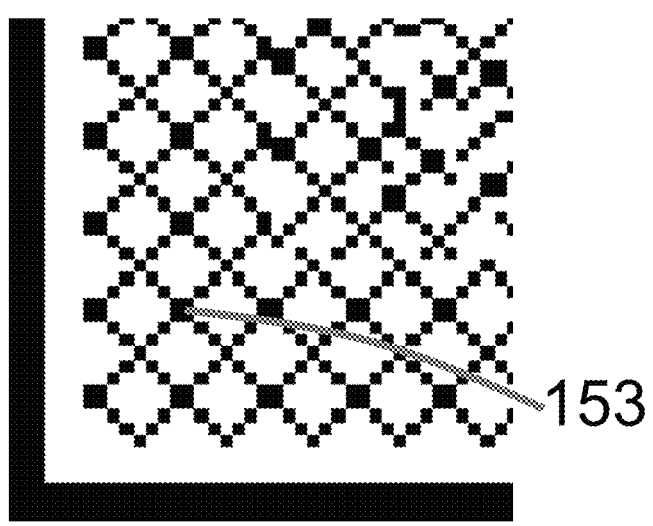
Figure 16A:
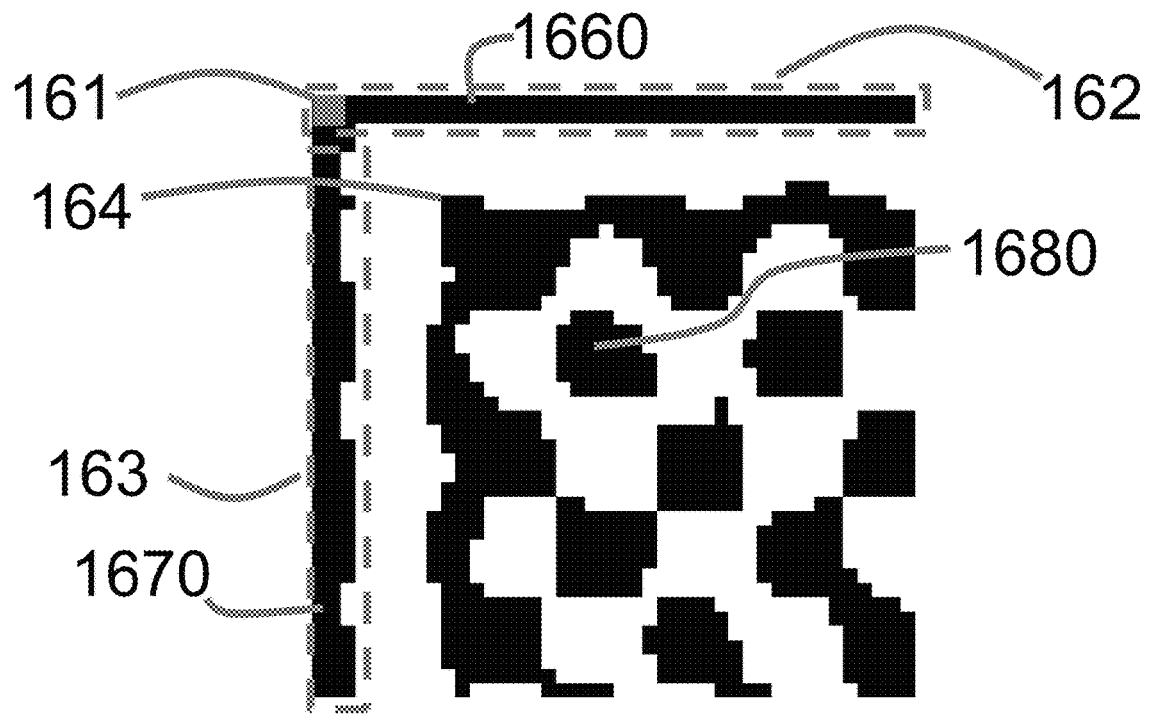
Figure 16B:
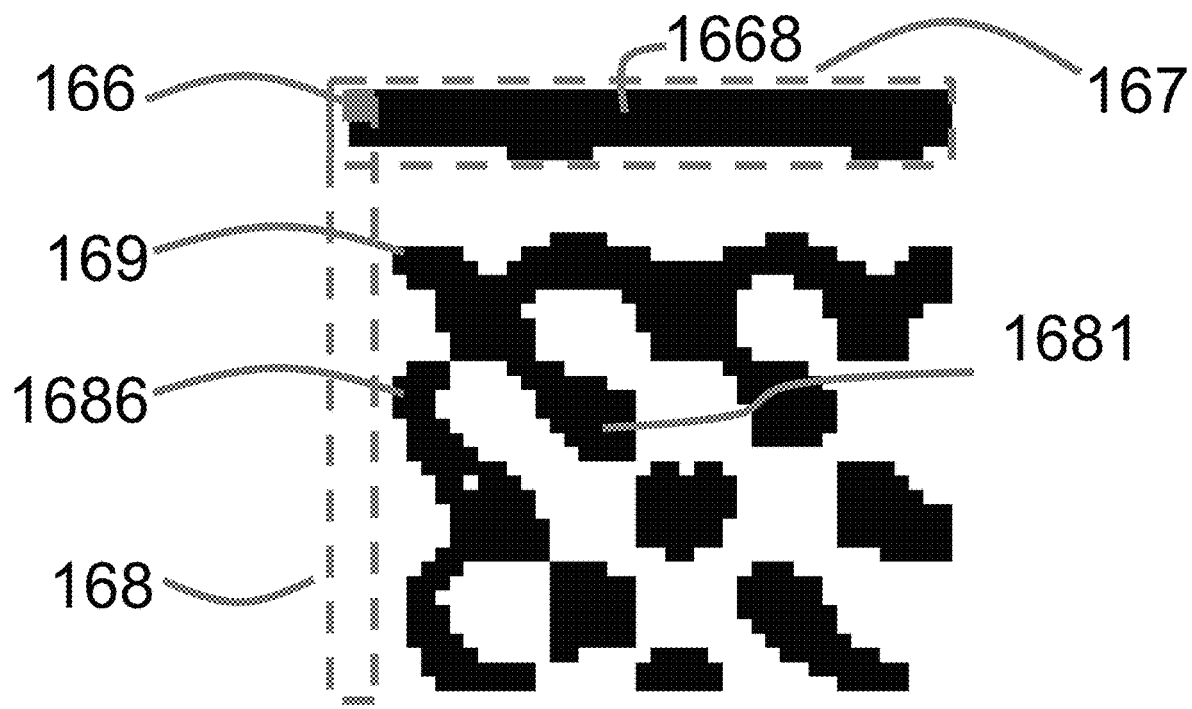
Figure 17:
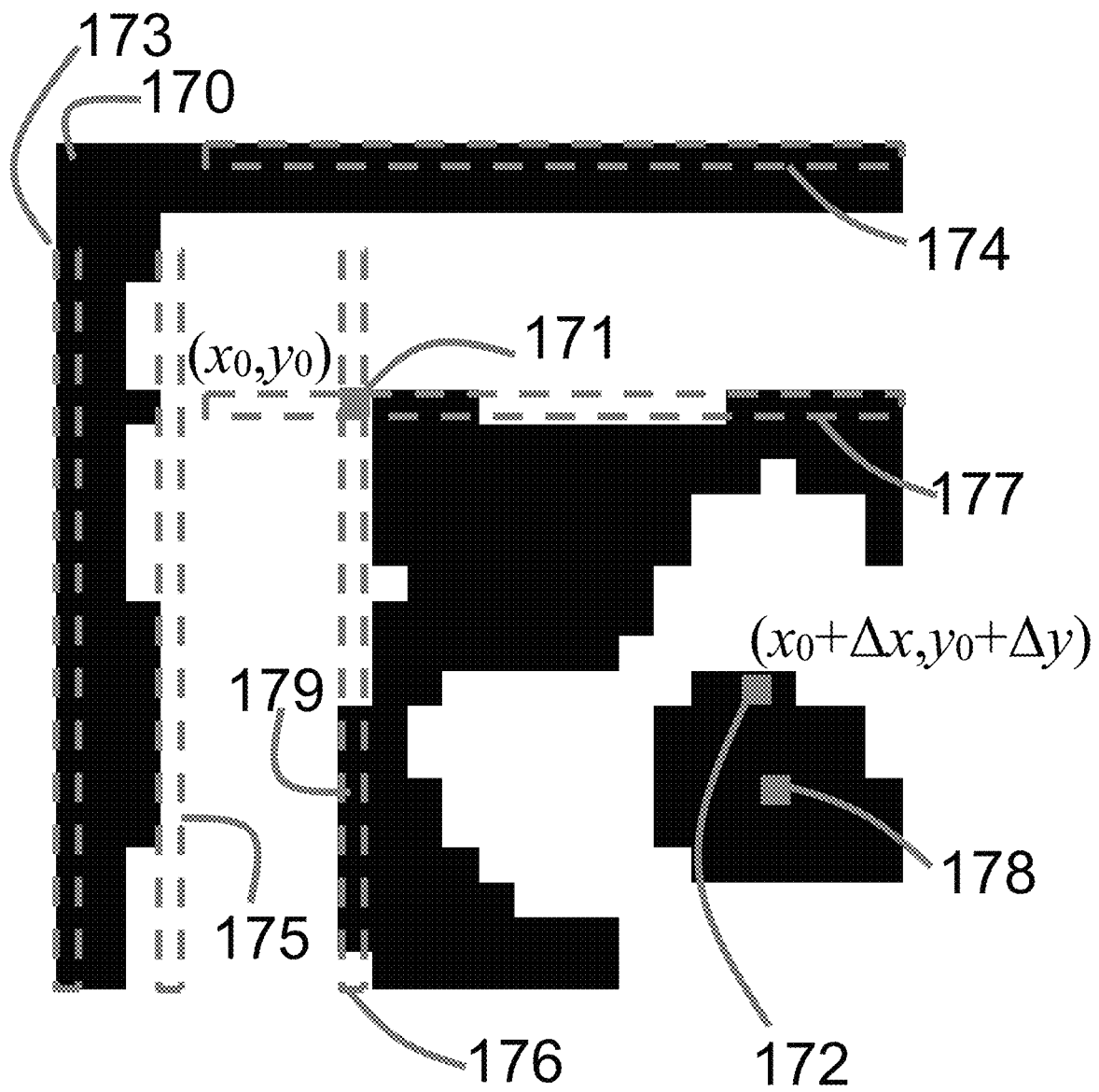
Figure 18A:
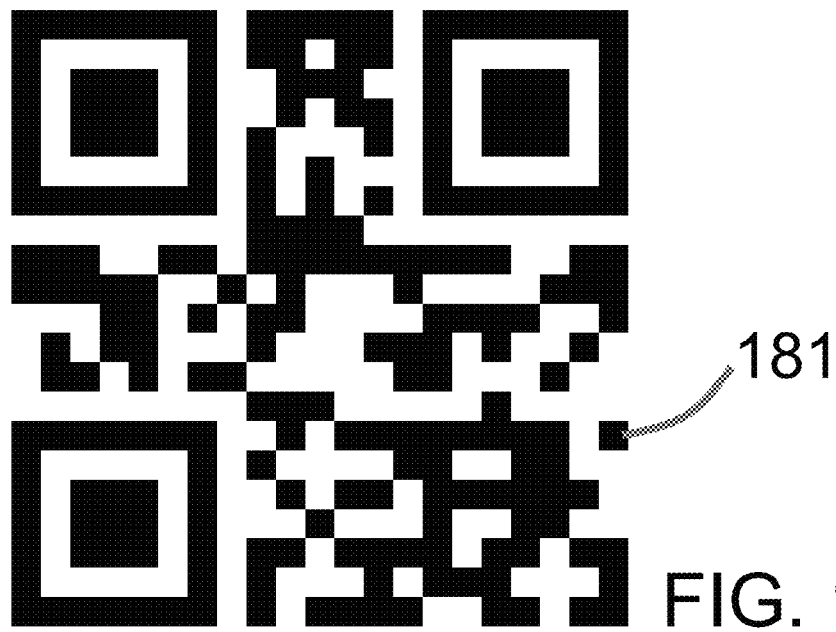
Figure 18B:
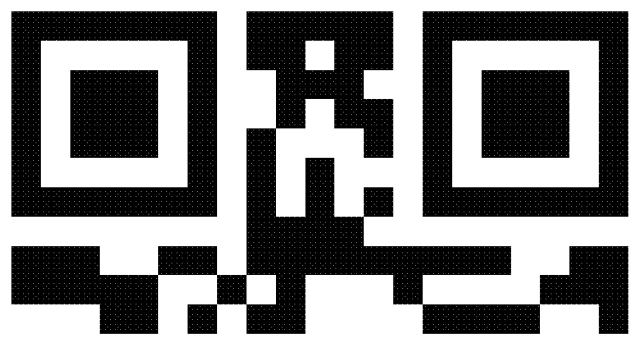
Figure 18C:
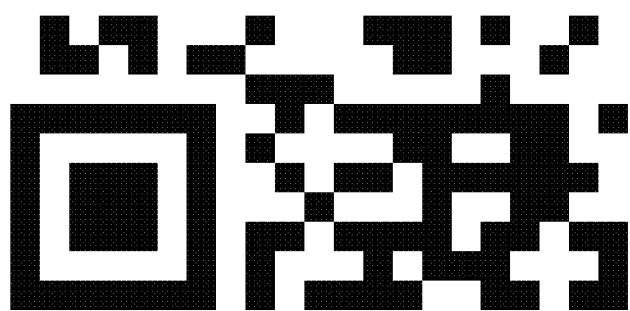
Figure 19A:
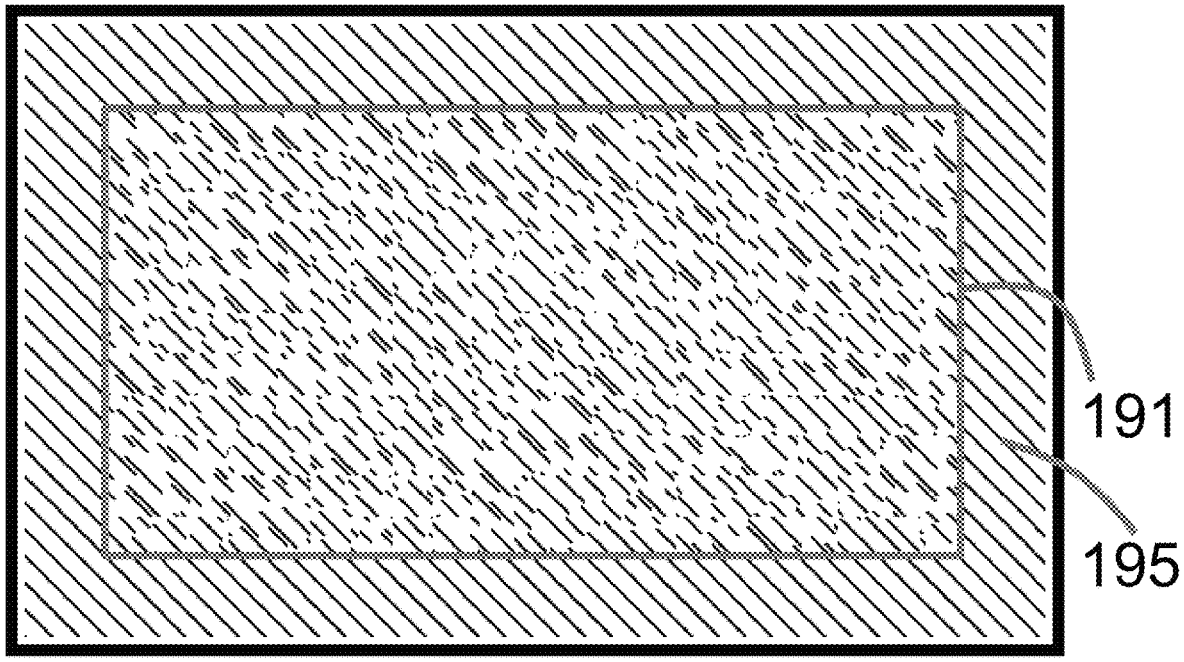
Figure 19B:
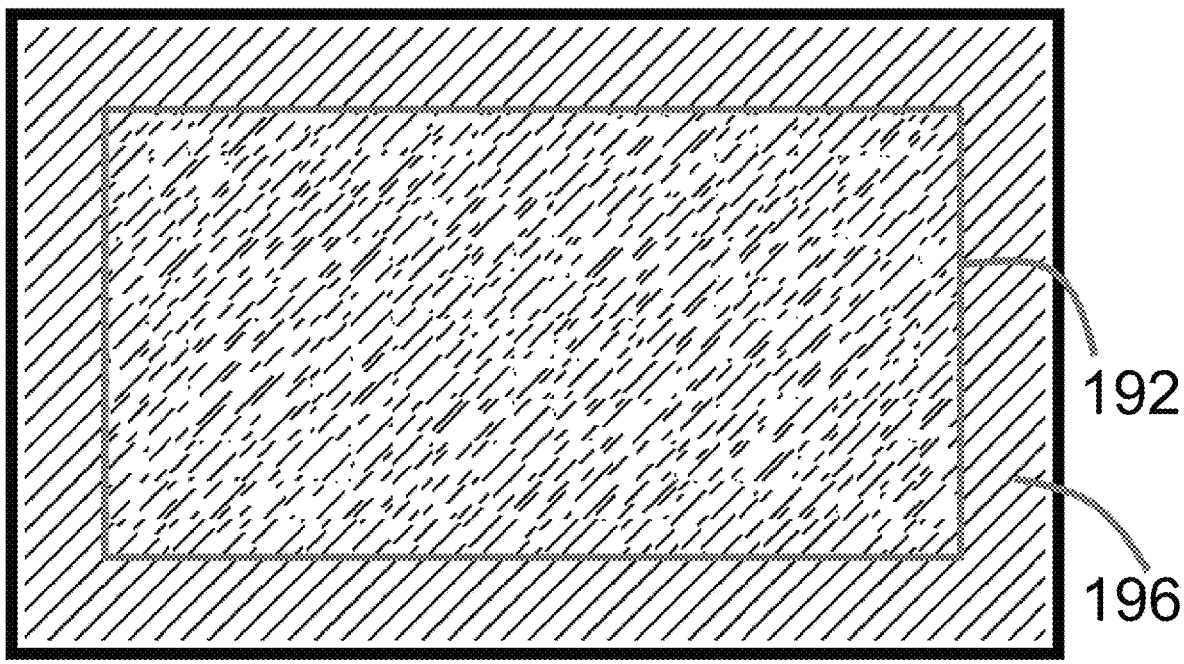
Figure 20:
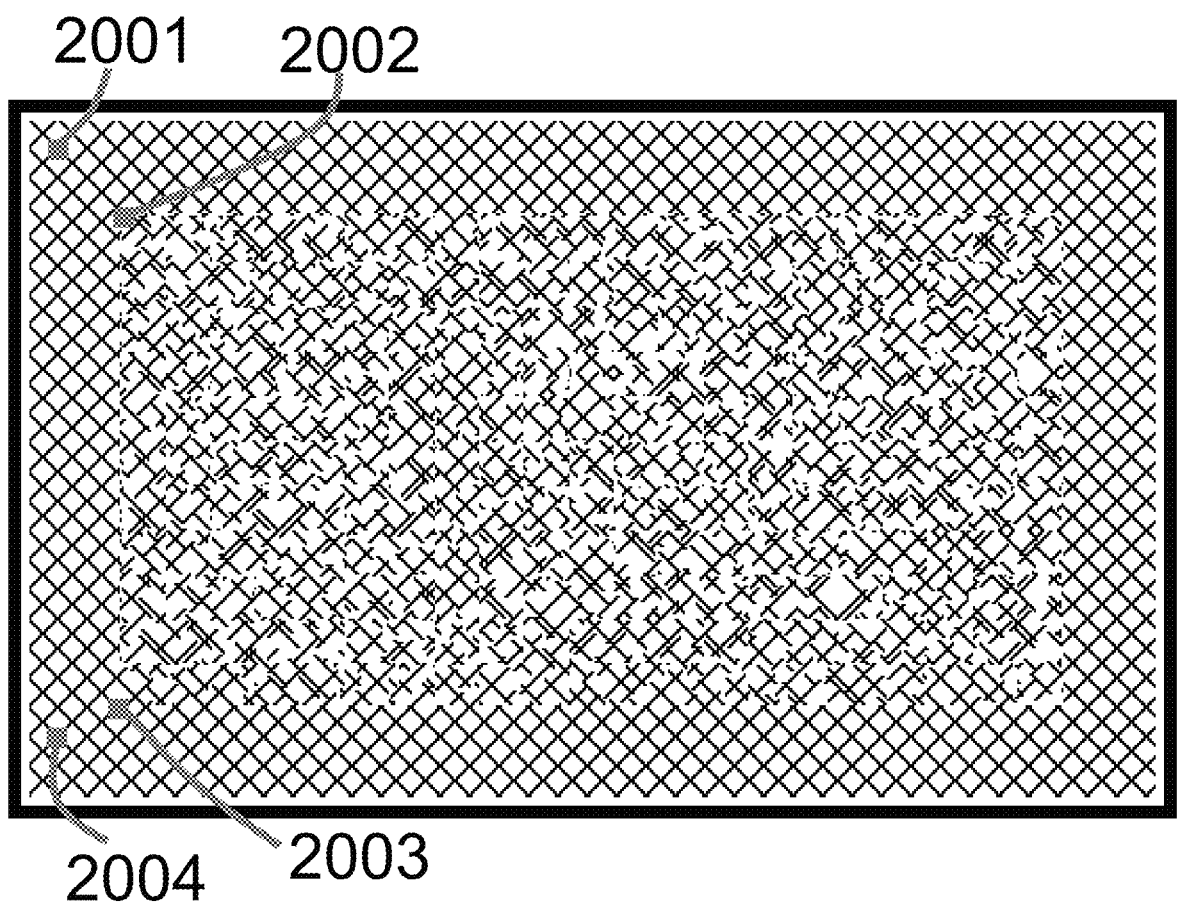
Figure 21A:
Figure 21B:
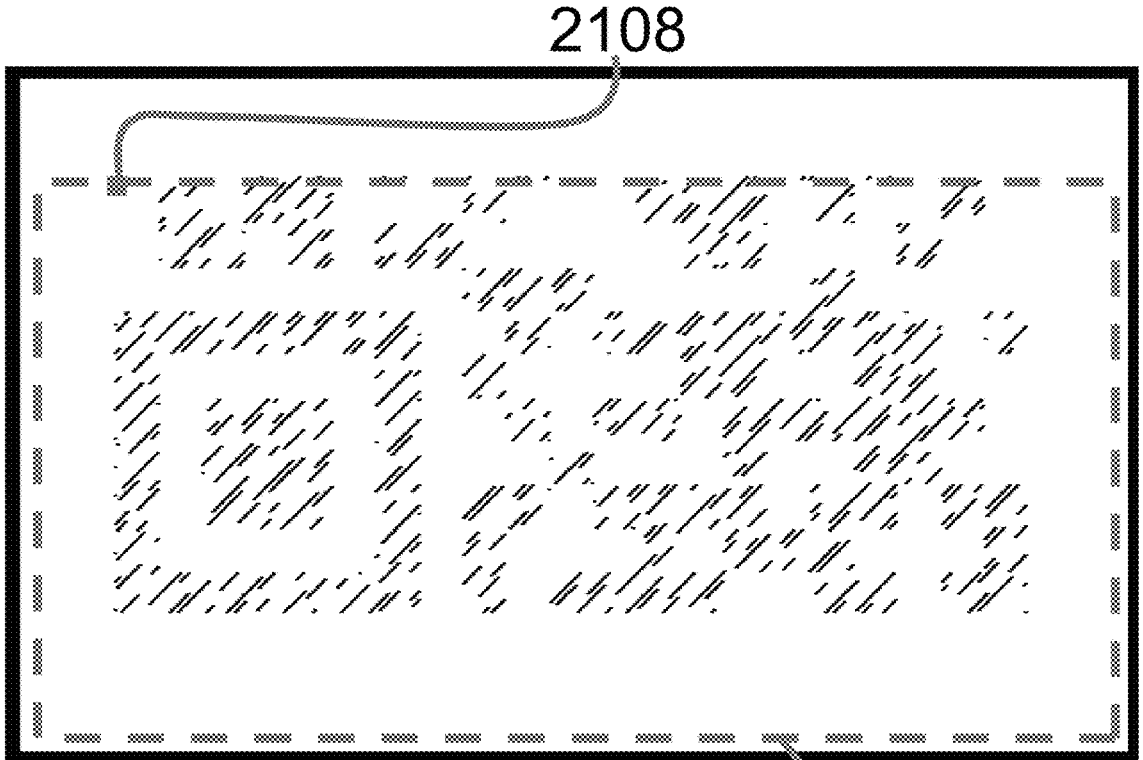
Figure 22A:
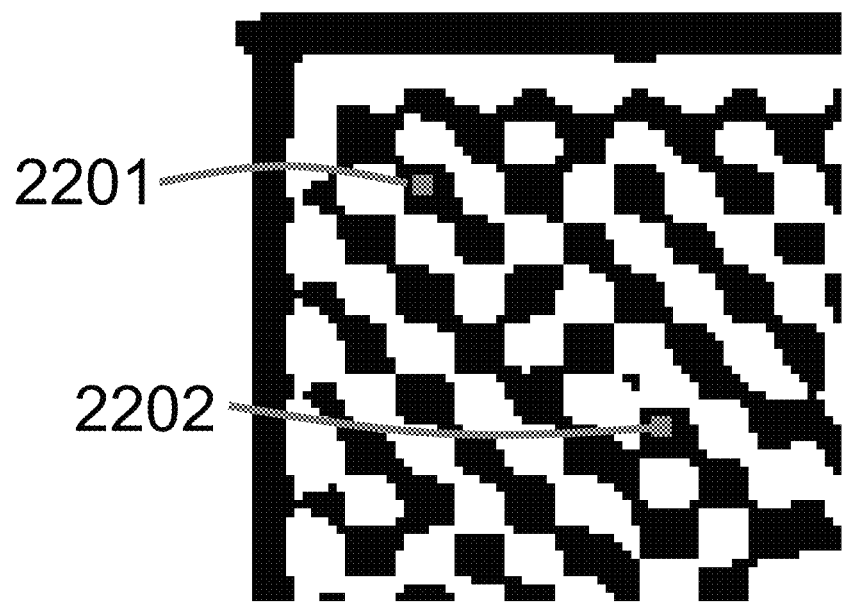
Figure 22B:
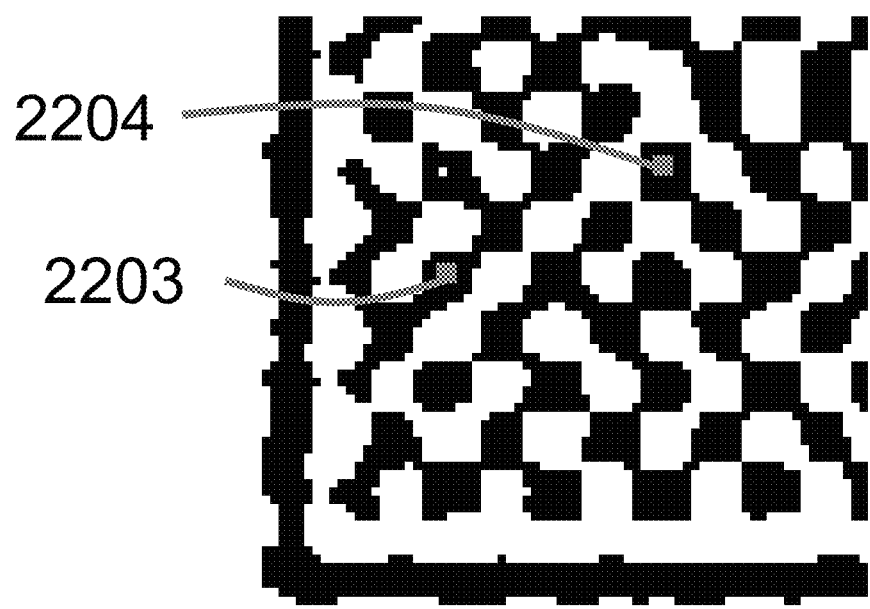
Figure 23B:
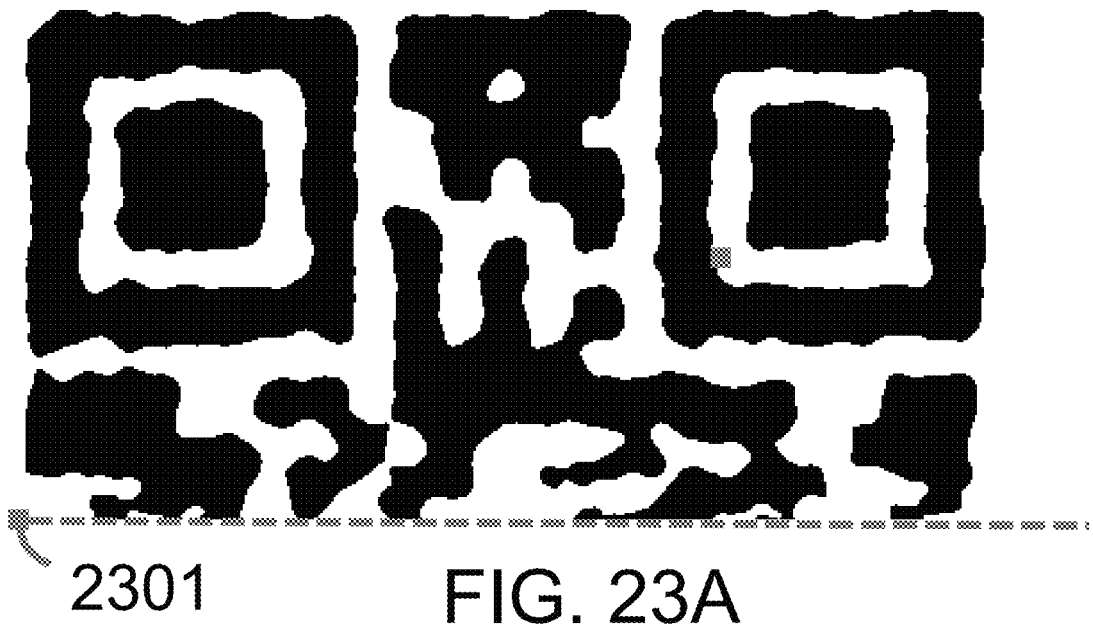
Figure 23B:
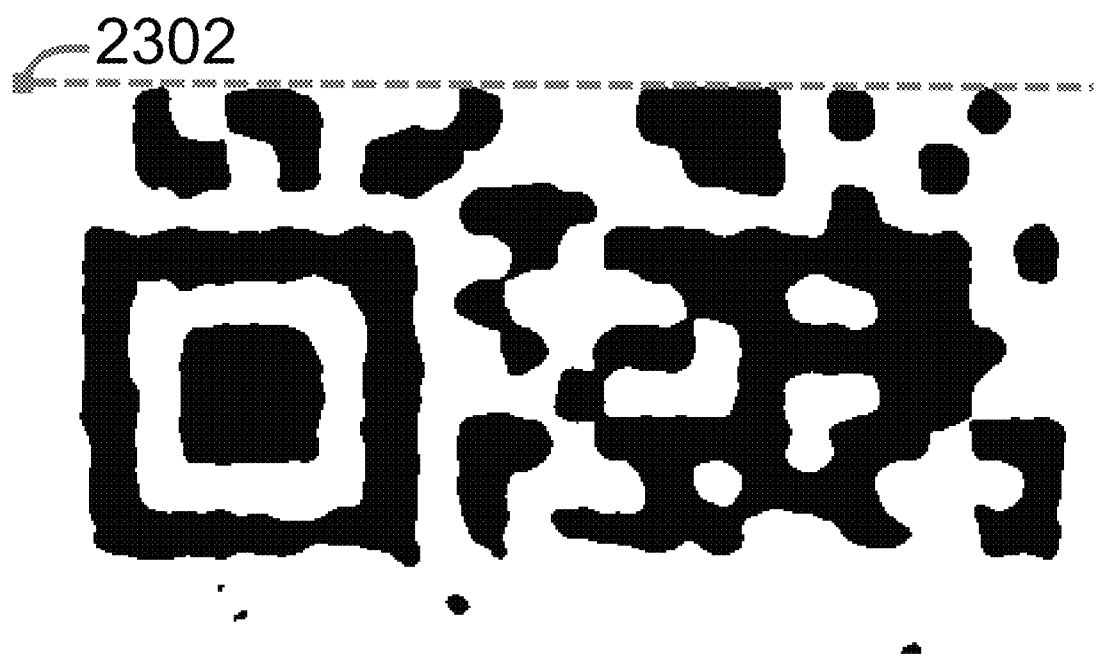
Figure 24:
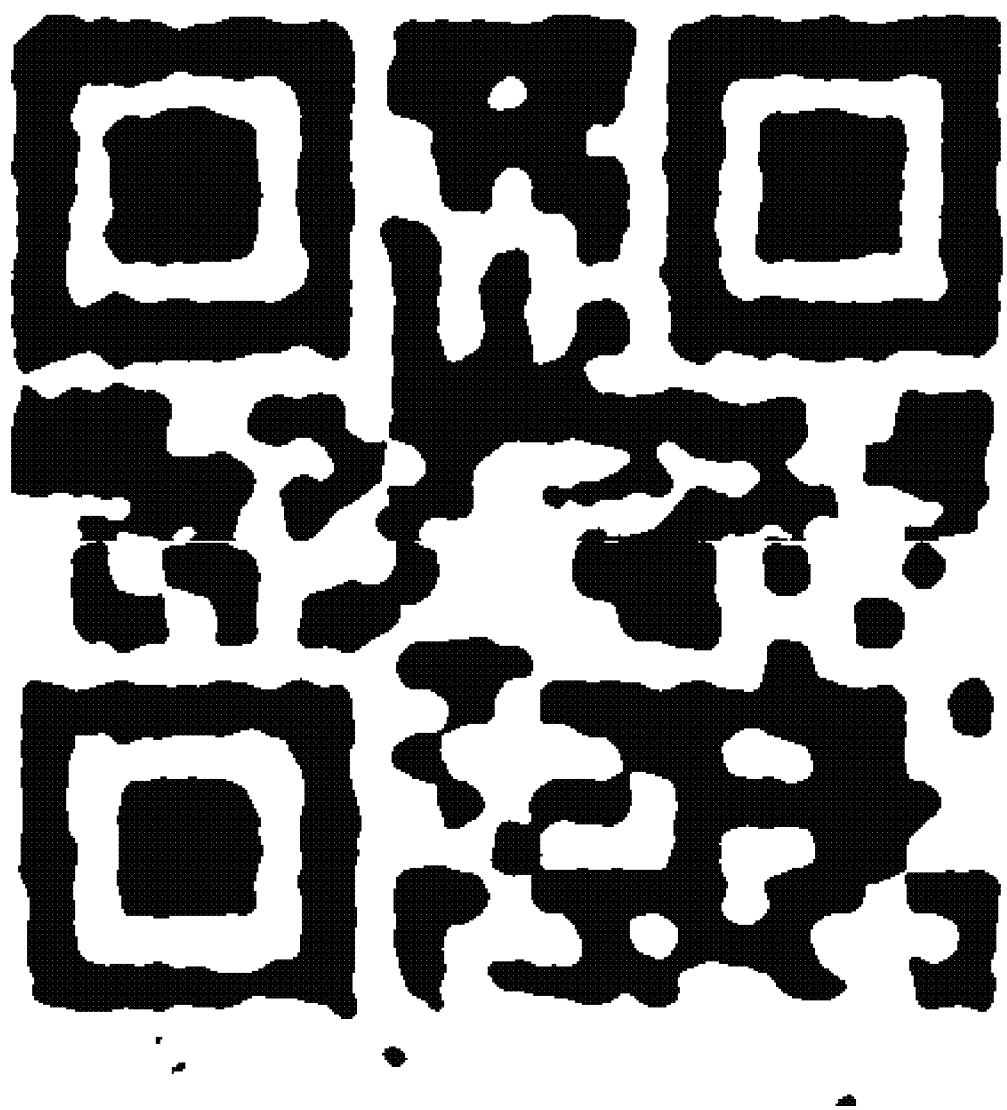
Figure 25:
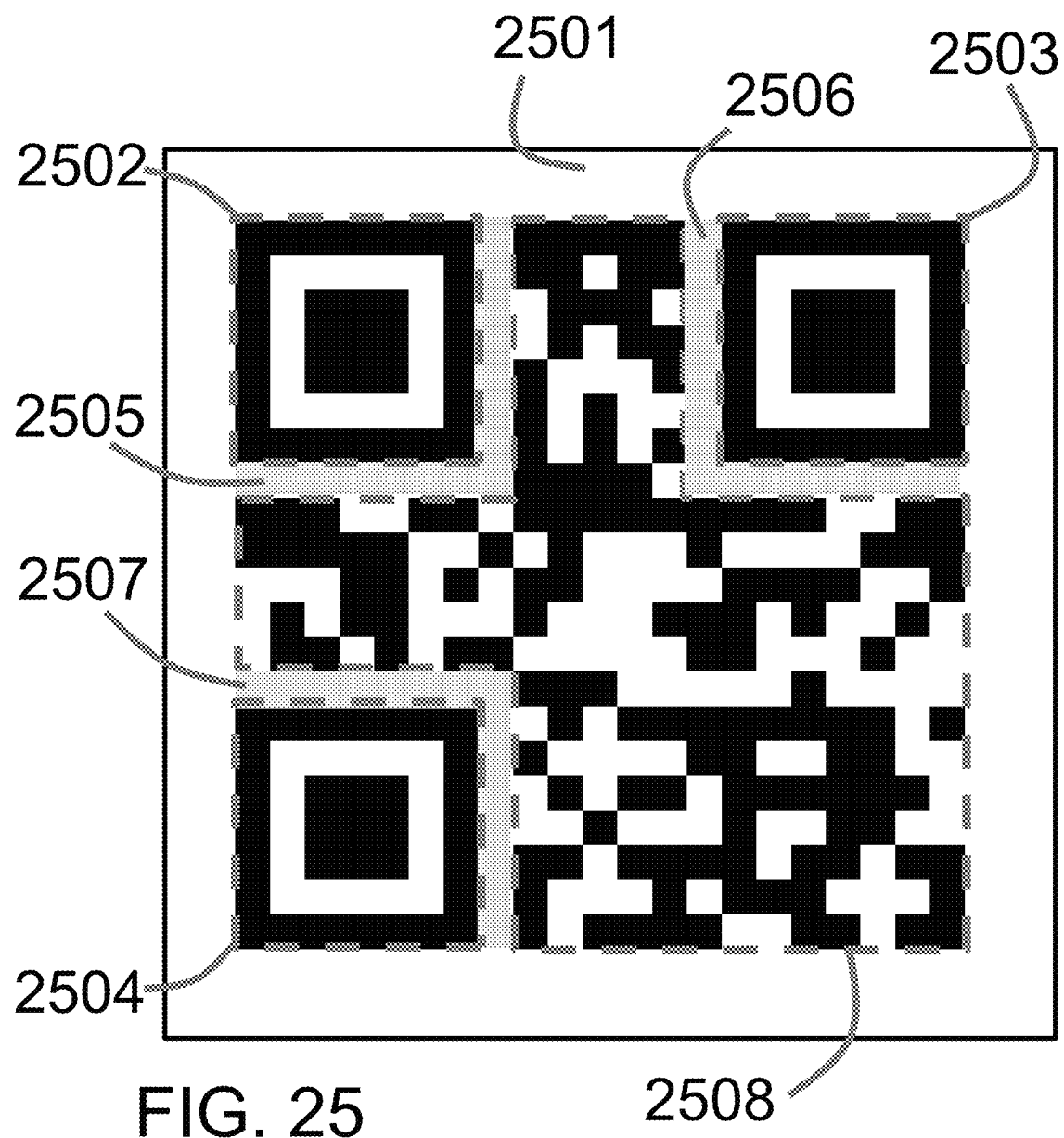
Figure 26:
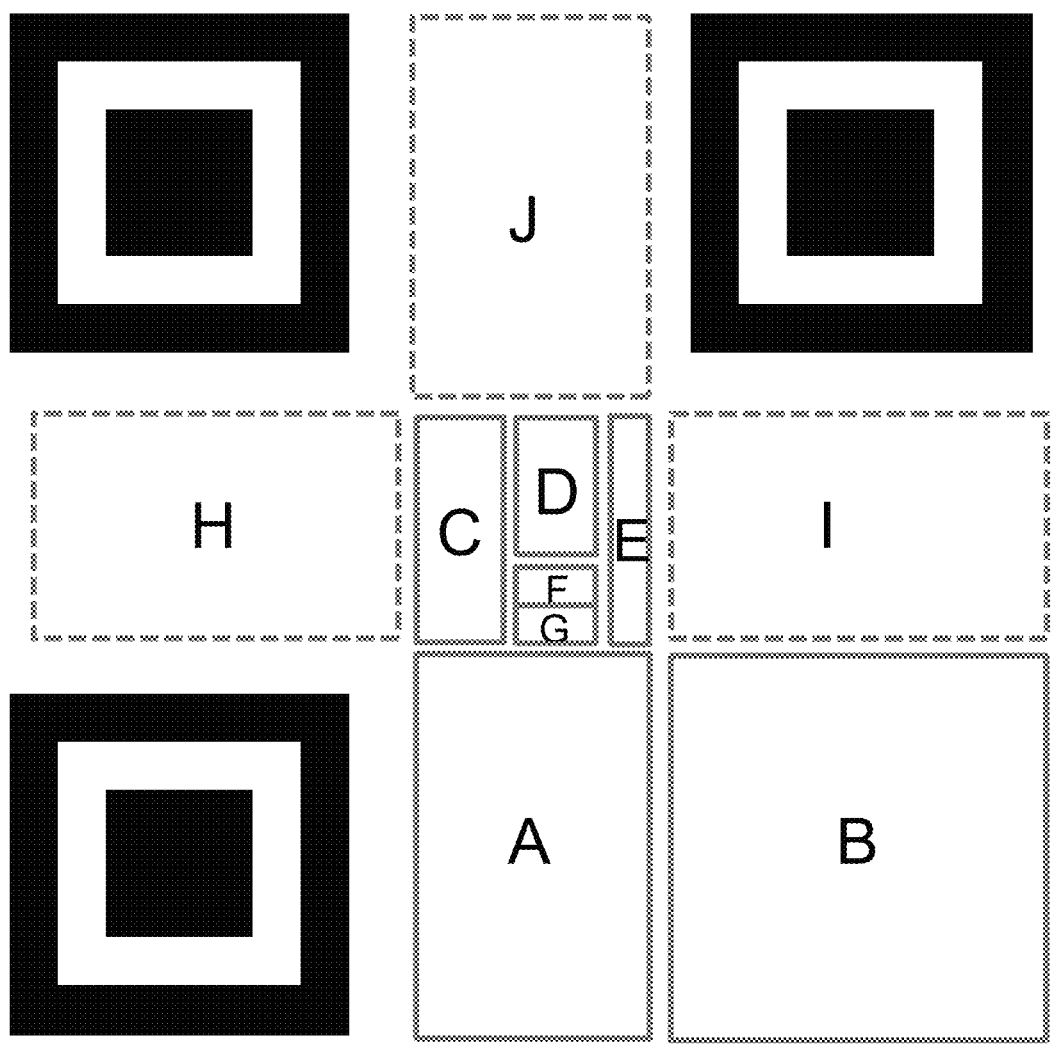
Figure 27A:
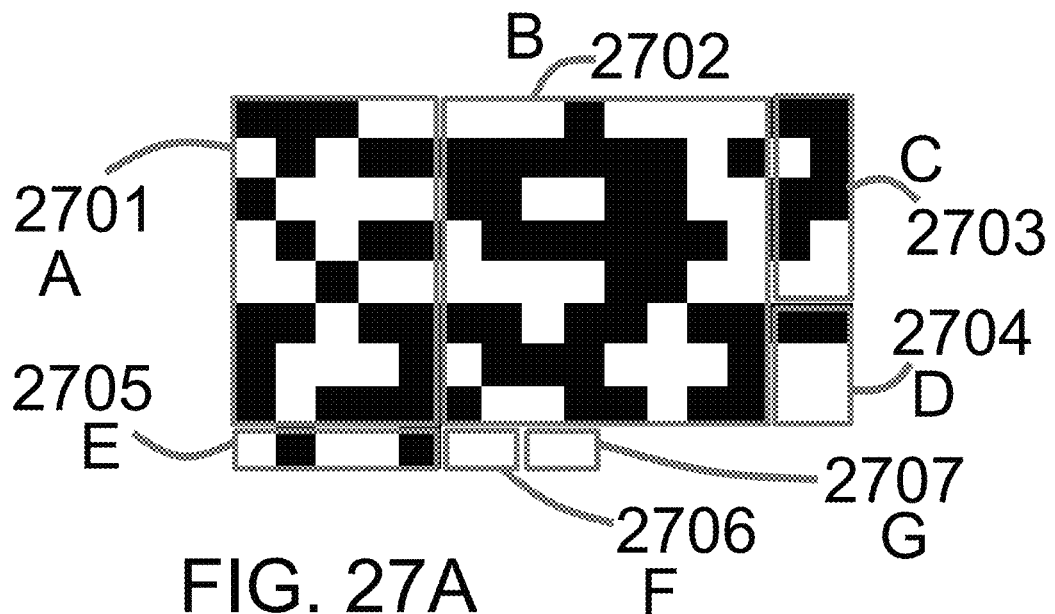
Figure 27B:
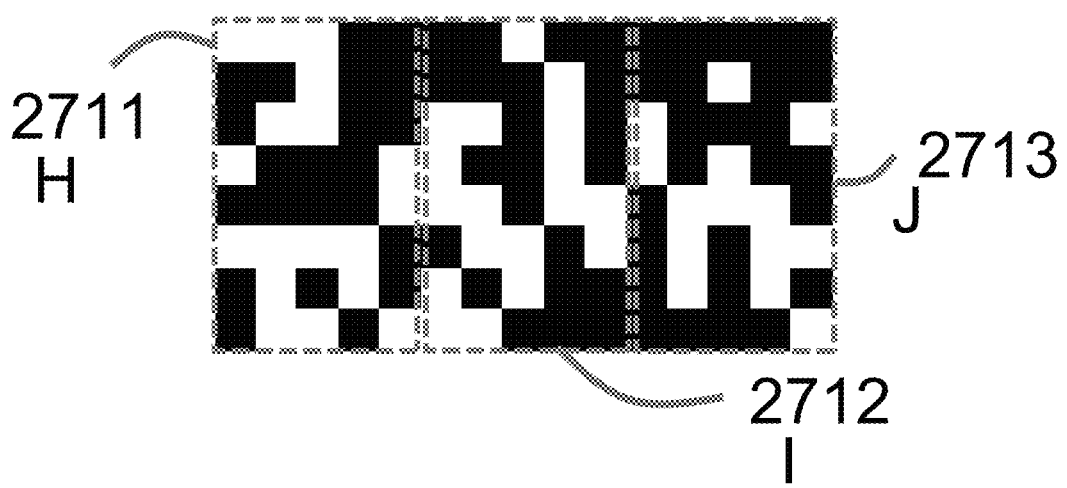
Figure 28:
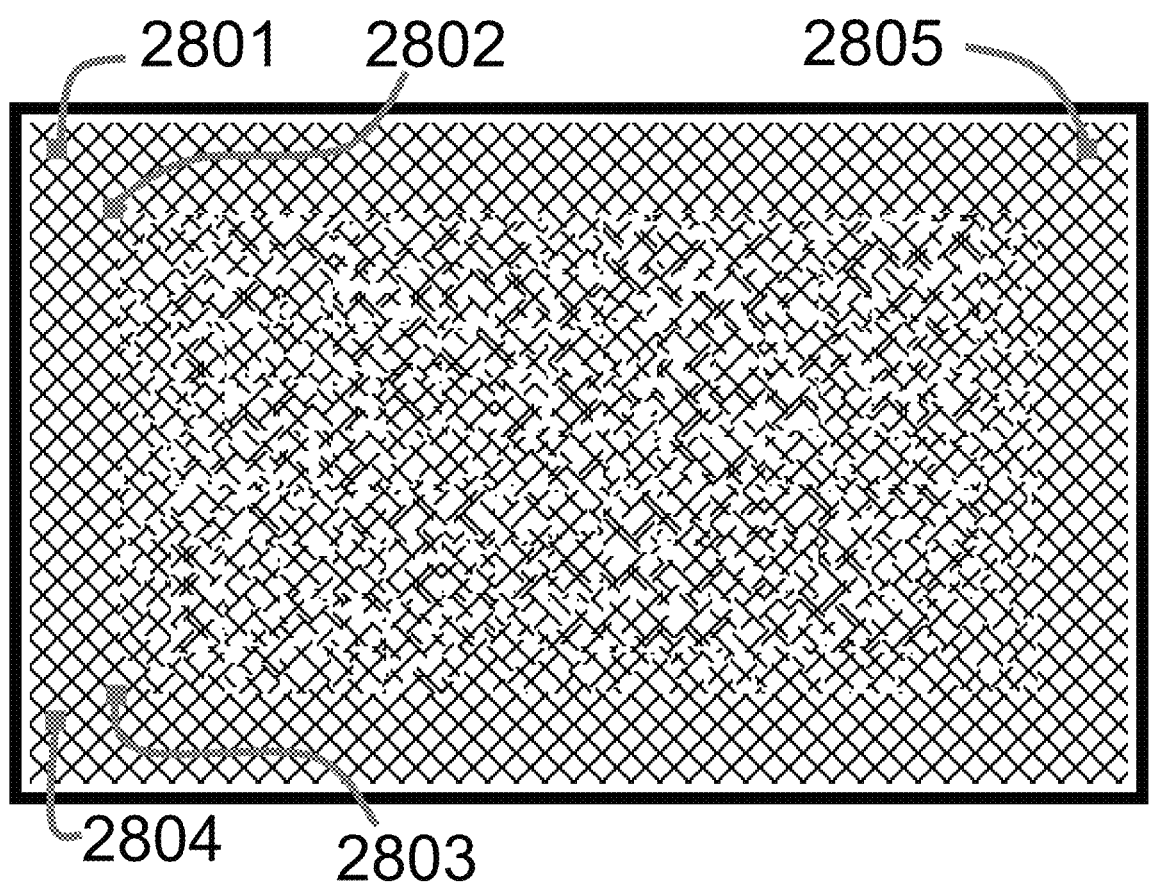
Figure 29A:
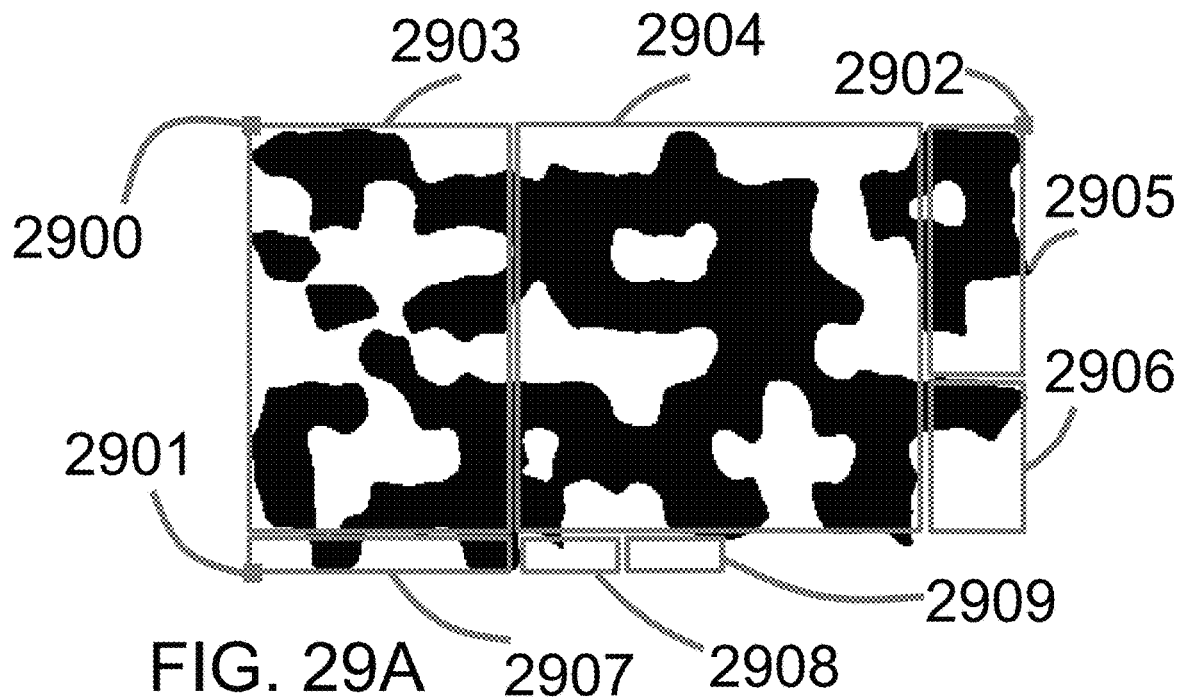
Figure 29B:
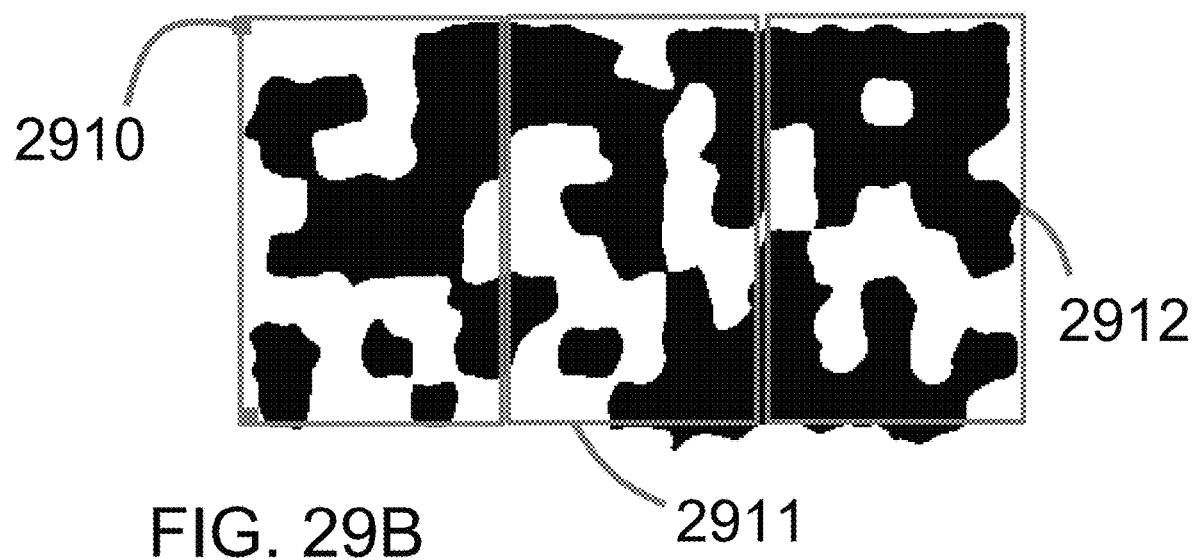
Figure 30:
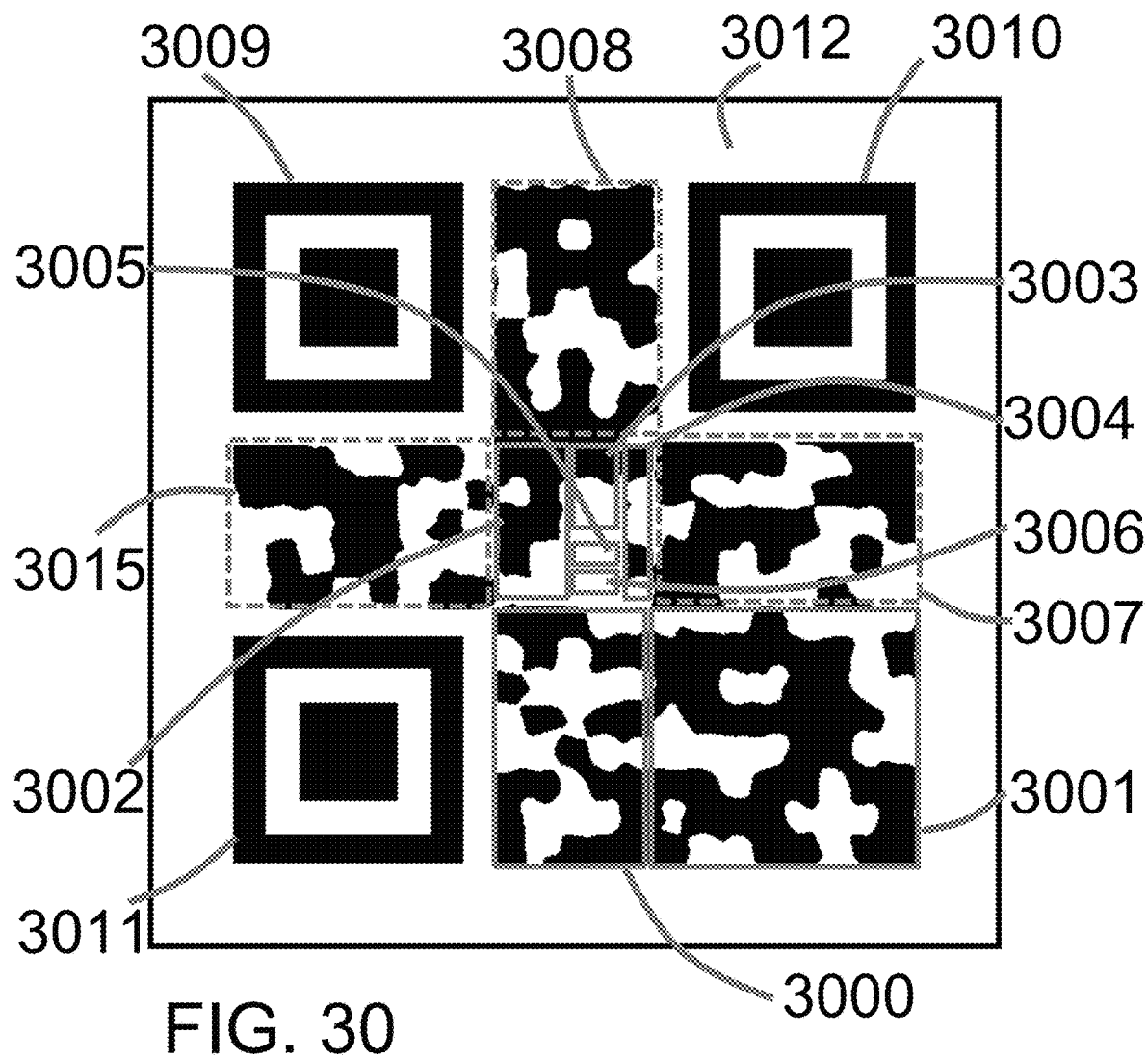
Figure 31:
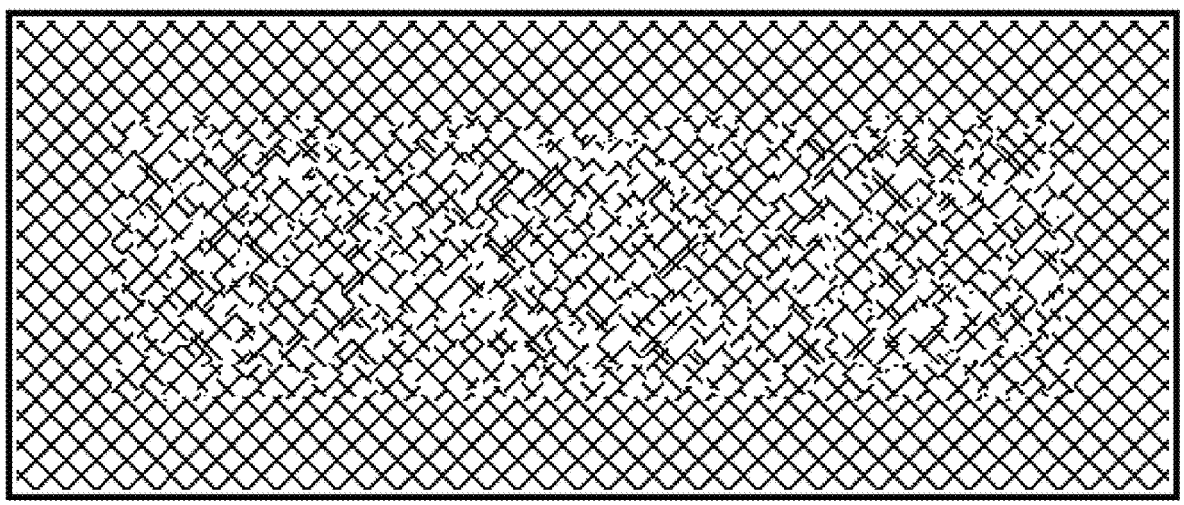
Figure 32A:
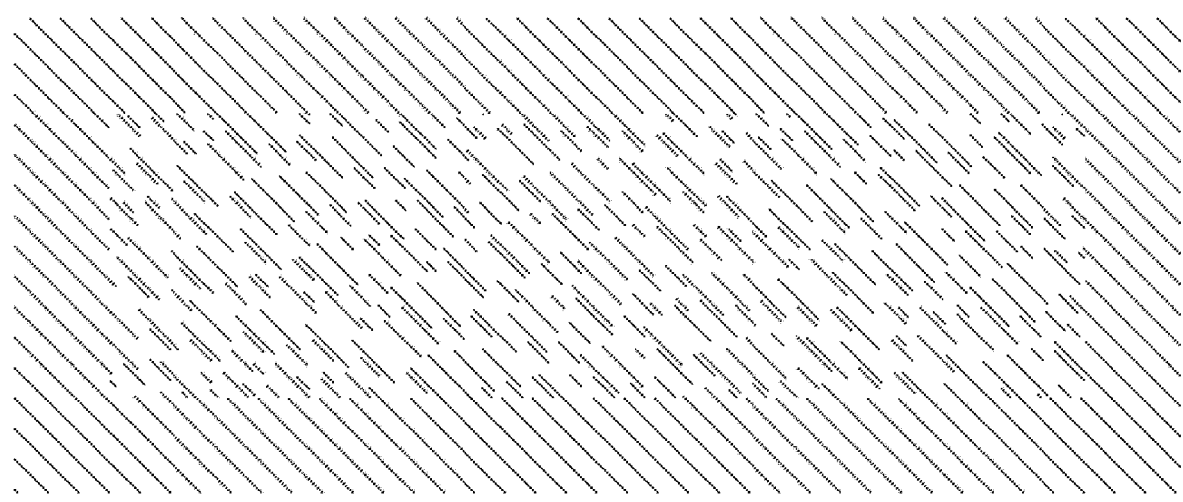
Figure 32B:
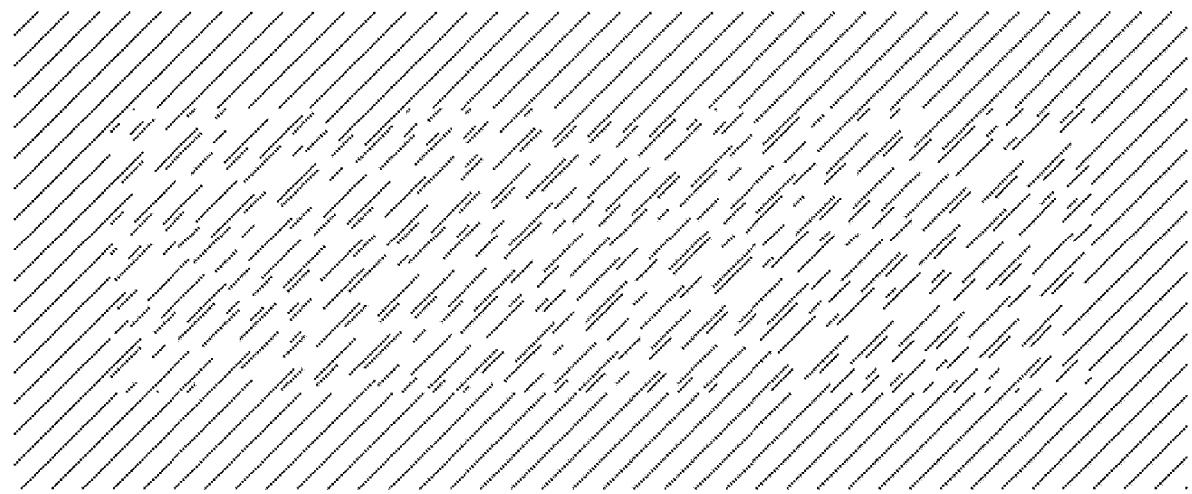
Figure 33A:
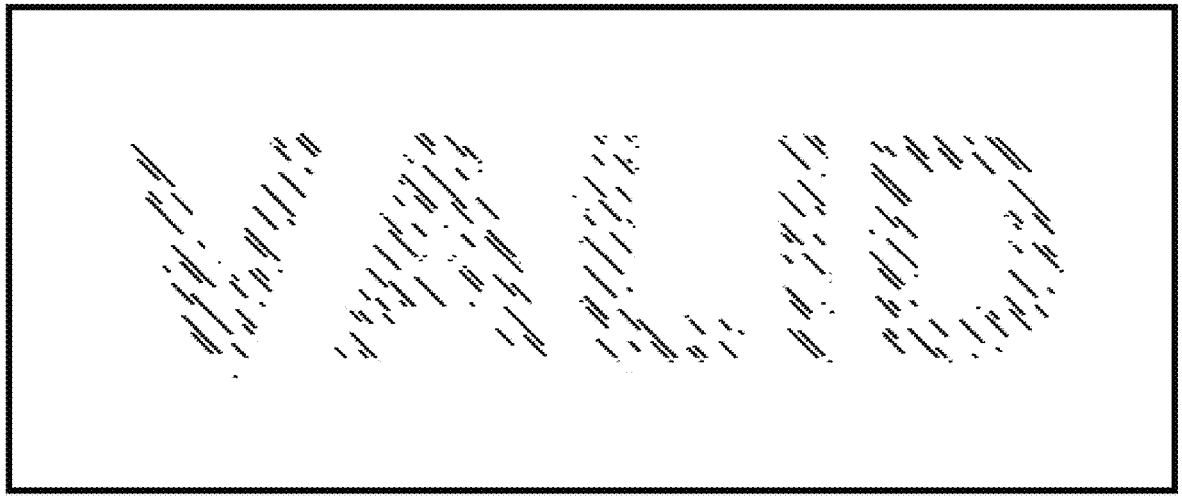
Figure 33B:
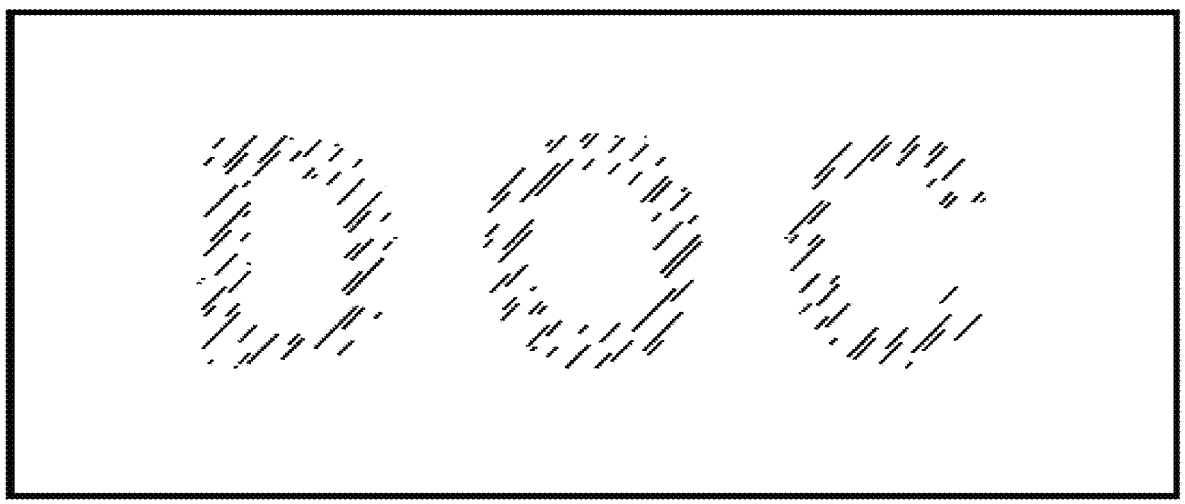
Figure 34:
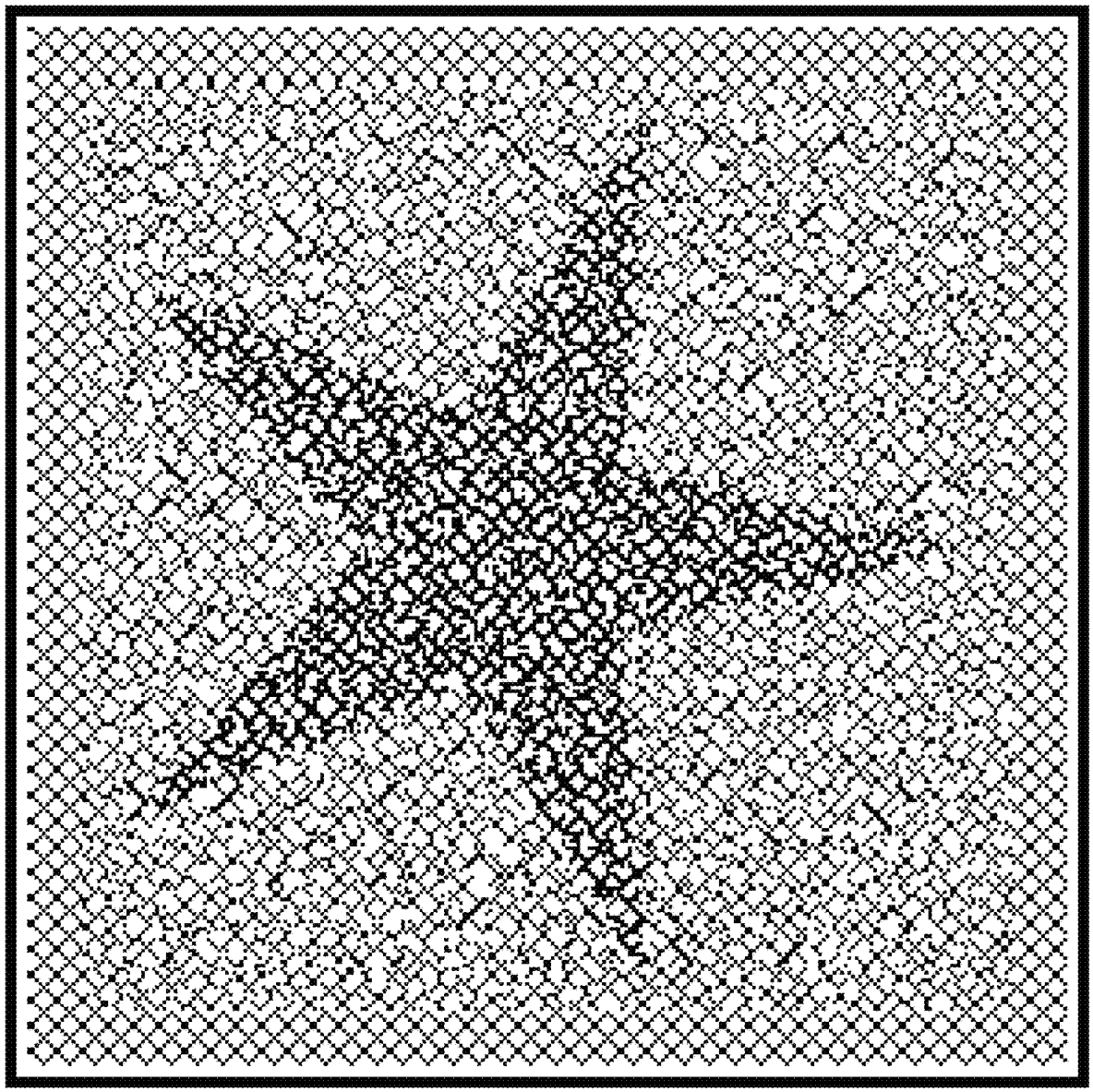
Figure 35:
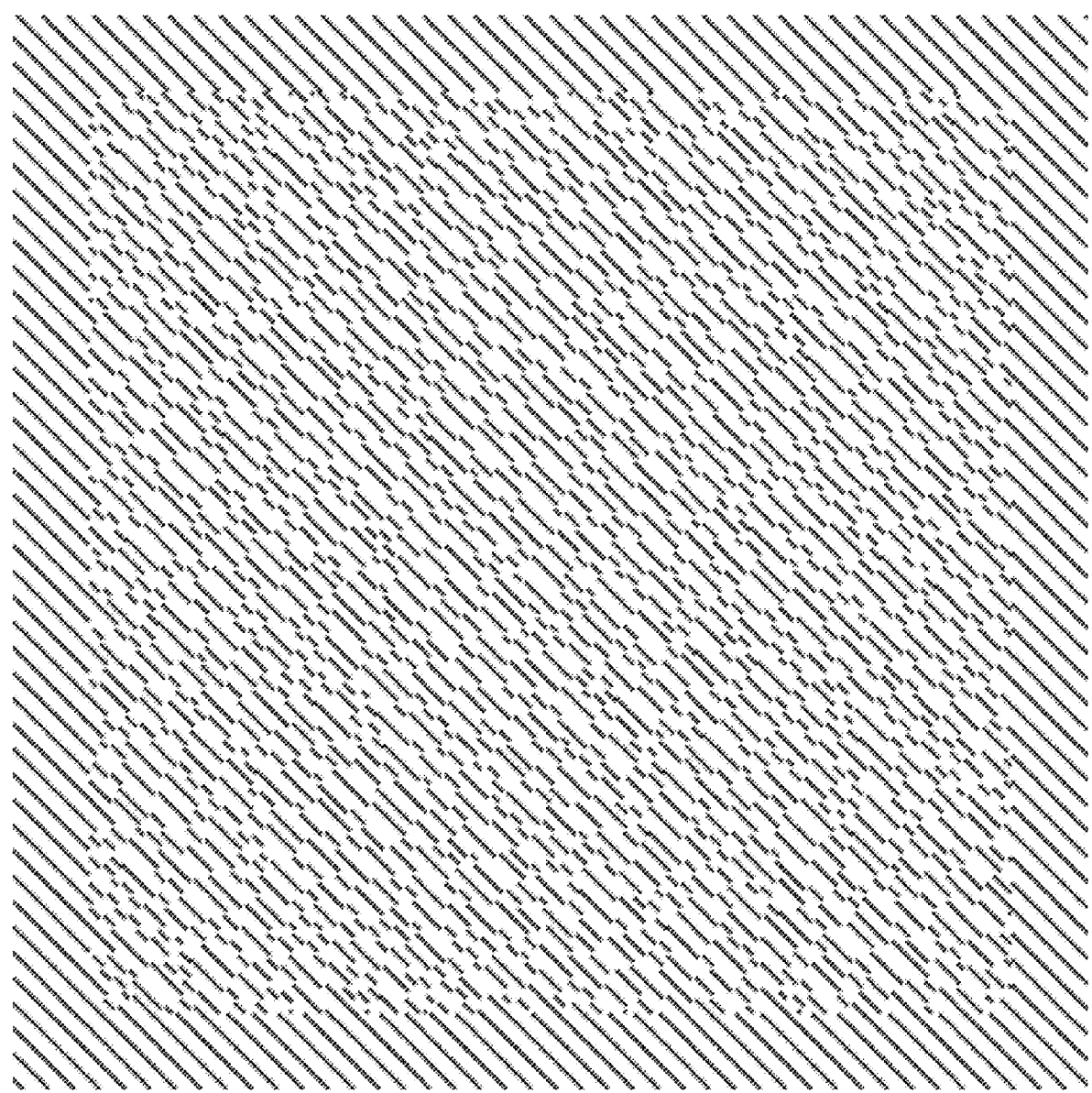
Figure 36:
Figure 37:
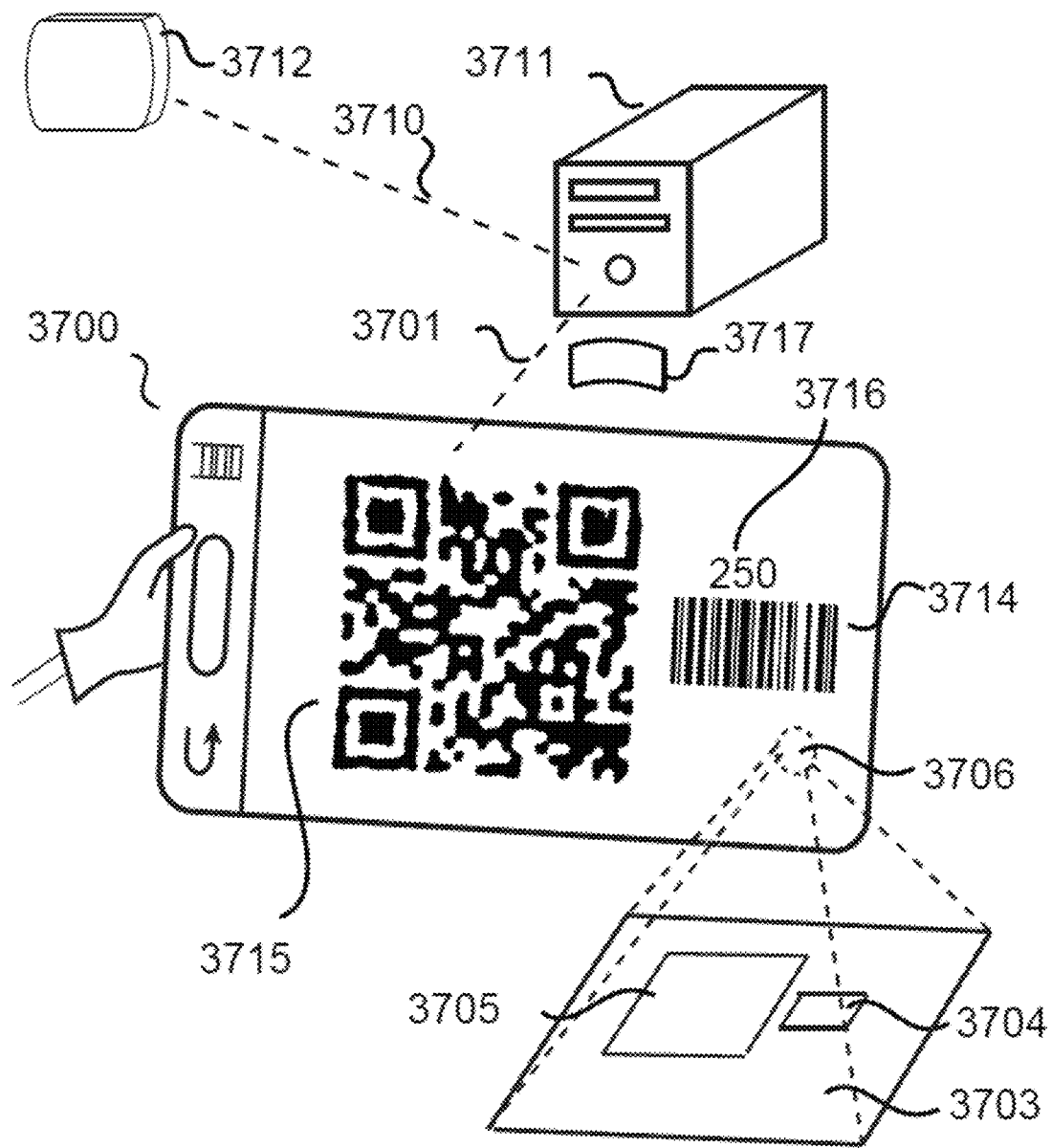
Figure 38:
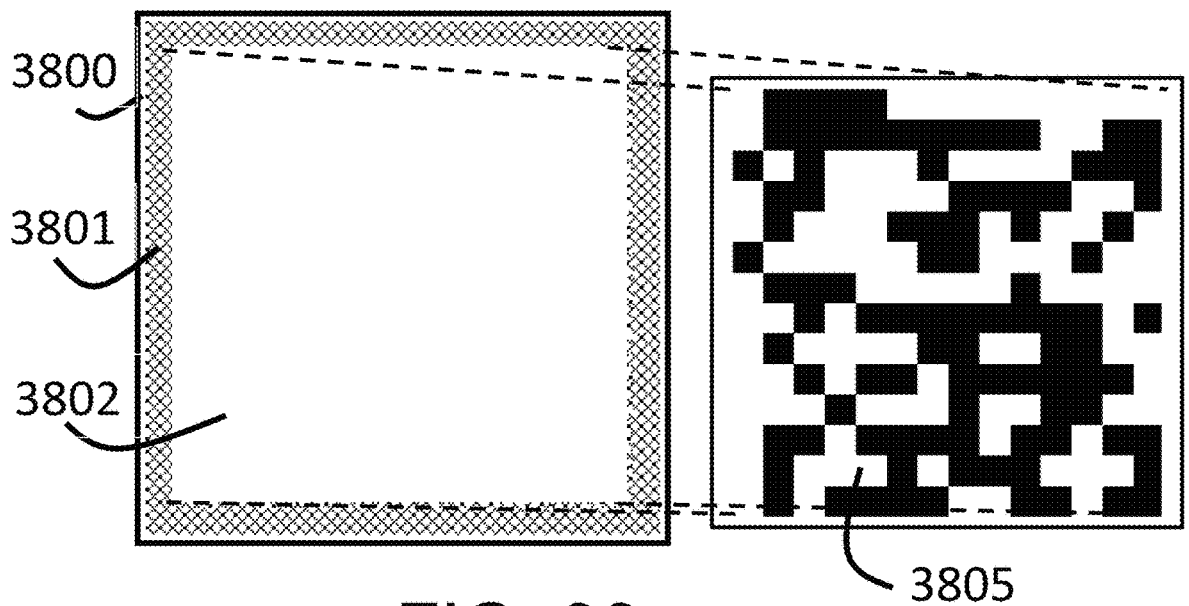
Figure 39:
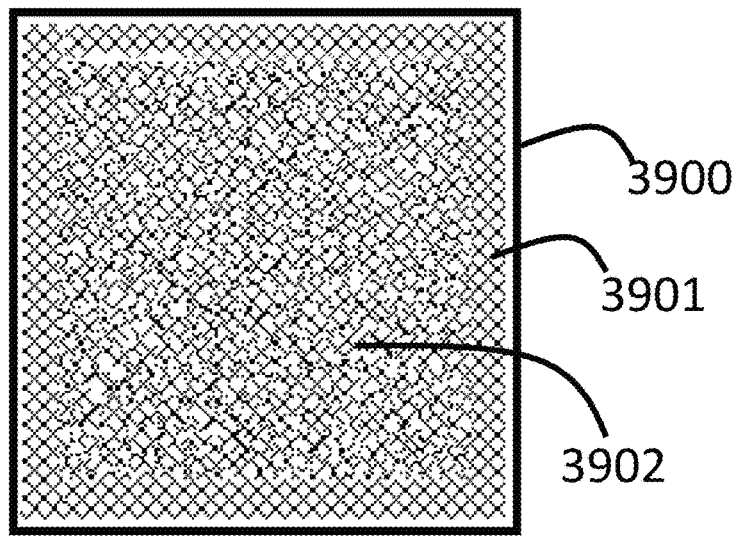

FIG. 2B shows a portion of the hidden layer, with its black parts 290, 291 and 292 and its transparent line segments 230', 270' and 280';

FIG. 3 shows schematically another example of a part of a visible layer in horizontal space, where within a same band $B_i$ the transition between a black and a stippled segment occurs at a transition between a black 2D code area (K) and a white 2D code area (W) and where the transition between a stippled segment and a black segment occurs at a transition between a white 2D code area (W) and a black 2D code area (K);

FIG. 4 shows a state machine indicating the possible phase transitions between successive segments, where the state's fraction number gives the relative vertical location (or phase) of the current line segment within a horizontal band and where the arrow from one state to another state gives the transition probability;

FIG. 5A shows an example of a QR-code;

FIG. 5B shows an enlargement of the bottom left part of that QR-code instance, after recovery, where the 2D code background is black (521) and where the foreground regions are covered by scattered white line segments (520);

FIG. 6 shows a visible layer hiding a first QR-code with scattered oblique line segments having an orientation of −45 degrees;

FIG. 7 shows a composite visible layer obtained by the union of two scattered oblique line segment visible layers, one with scattered line segments at minus 45 degrees and the second with scattered line segments at +45 degrees;

FIG. 8 is the inverse intensity image of a hidden layer generated with the same key as the first layer shown in FIG. 6, with scattered line segments at −45 degrees;

FIG. 9 is the inverse intensity image of the partially revealed 2D code obtained by the superposition of the hidden layer represented as inverse intensity image in FIG. 8 and of the composite visible layer of FIG. 7;

FIG. 10 is the inverse intensity image of a hidden layer generated with the same key as the second visible layer that is part the composite visible layer of FIG. 7, with scattered line segments at +45 degrees;

FIG. 11 is the inverse intensity image of the partially revealed 2D code obtained by the superposition of the hidden layer represented as inverse intensity image in FIG. 10 and of the composite visible layer of FIG. 7;

FIG. 12 is the QR-code obtained from the partially revealed 2D code shown in FIG. 9, by Gaussian low-pass filtering and adaptive thresholding;

FIG. 13 is the QR-code obtained from the partially revealed 2D code shown in FIG. 11, by Gaussian low-pass filtering and adaptive thresholding;

FIG. 14A shows an enlargement of the top left part of the visible layer that is displayed in FIG. 7;

FIG. 14B shows a further enlargement of the top left part of FIG. 14A;

FIG. 15A shows the top left part of FIG. 7, with intersection 152 being the starting intersection of the cross-grating frame;

FIG. 15B shows the bottom left part of FIG. 7, with intersection 153 being the vertically ending intersection of the cross-grating frame;

FIG. 15C shows the right part of FIG. 7, with intersection 154 being the horizontally ending intersection of the cross-grating frame;

FIG. 16A shows the top left part of one acquisition of a visible layer, after perspective correction;

FIG. 16B shows the top left part of another acquisition of a visible layer, after perspective correction;

FIG. 17 shows the top left part of FIG. 16A, enlarged;

FIG. 18A shows an example of a QR-code;

FIG. 18B shows the top part of the QR-code shown in FIG. 18A;

FIG. 18C shows the bottom part of the QR-code shown in FIG. 18A;

FIG. 19A shows a visible layer hiding the part of the QR-code shown in FIG. 18B;

FIG. 19B shows a visible layer hiding the part of the QR-code shown in FIG. 18C;

FIG. 20 shows the composite visible layer obtained by the union of the two visible layers shown in FIGS. 19A and 19B;

FIG. 21A shows the upper part of the partly recovered QR-code by superposing the hidden layer at one orientation with the acquired perspectively corrected, rectified and possibly scaled composite visible layer;

FIG. 21B shows the lower part of the partly recovered QR-code obtained by superposing the hidden layer at the second orientation with the acquired perspectively corrected, rectified and possibly scaled composite visible layer;

FIG. 22A shows for the half-size hidden spatial code the upper left part of the acquired perspectively corrected, rectified and possibly scaled composite visible layer;

FIG. 22B shows for the half-size hidden spatial code the lower left part of the acquired perspectively corrected, rectified and possibly scaled composite visible layer;

FIG. 23A shows the recovered upper part of the QR-code that is hidden in the visible layer of scattered segments shown in FIG. 20;

FIG. 23B shows the recovered lower part of the QR-code that is hidden in the visible layer of scattered segments shown in FIG. 20;

FIG. 24 shows the recovered QR-code obtained by the assembly of the upper part shown in FIG. 23A and the lower part shown in FIG. 23B;

FIG. 25 shows the same QR-code as in FIG. 18A, with quite zone 2501, positioning markers 2502, 2503, 2504, information zone 2508 and spacing zones 2505, 2506, 2507;

FIG. 26 shows a possible segmentation of the information zone into a number of chunks;

FIG. 27A shows the assembly of chunks that will be hidden in the first half-size visible layer (angle $\theta_1$, e.g. −45°);

FIG. 27B shows the assembly of chunks that will be hidden in the second half-size visible layer (angle $\theta_2$, e.g. +45°);

FIG. 28 shows the resulting composite half-size visible layer hiding the assemblies of chunks shown in FIGS. 27A and 27B;

FIG. 29A shows a first set of recovered assemblies of chunks obtained by superposing the acquired perspectively corrected rectified and scaled half-size visible layer with a corresponding half-size hidden layer (angle $\theta_1$, e.g. −45°);

FIG. 29B shows the second set of recovered assemblies of chunks obtained by superposing the acquired perspectively corrected and rectified half-size visible layer with a corresponding half-size hidden layer (angle $\theta_2$, e.g. 45°);

FIG. 30 shows the recovered full QR-code obtained by reassembling the first and second set of chunks according to their initial layout;

FIG. 31 shows a composite visible layer with scattered line segments hiding the word "VALID" as well as the word "DOC";

FIG. 32A shows a hidden layer with scattered line segments at orientation −45°, generated with the same key as the first visible layer of FIG. 31;

FIG. 32B shows a hidden layer with scattered line segments at orientation +45° generated with the same key as the second visible layer of FIG. 31;

FIG. 33A shows the partially recovered inverse intensity image of the superposition of the composite visible layer of FIG. 31 and of the hidden layer of FIG. 32A;

FIG. 33B shows the partially recovered inverse intensity image of the superposition of the composite visible layer of FIG. 31 and of the hidden layer of FIG. 32B;

FIG. 34 shows a composite visible layer with scattered segments hiding a 2D code, which displays a graphical element such as a star;

FIG. 35 is the hidden layer with scattered segments generated with the same key as the first visible layer of FIG. 34;

FIG. 36 shows the 2D code recovered by superposition of the composite visible layer (FIG. 34) and of the hidden layer (FIG. 35) after Gaussian low-pass filtering, thresholding and image inversion;

FIG. 37 shows a distributed computing system comprising a smartphone 3700 connected by a network 3701 with a computing tracking server 3711, the smartphone performing the acquisition 3706 of a visible layer 3705 made of scattered line segments printed on a document 3703, recovering the hidden information, displaying it 3715 or transferring it 3717 to the computing tracking server 3711;

FIG. 38 shows a visible layer comprising a solid black frame 3800, a cross grating 3801, an empty active area 3802 and an example of a custom 2D code usable for synthesizing a visible layer of scattered segments;

FIG. 39 shows a composite visible layer having the same solid black frame 3900 and cross grating 3901 as in FIG. 38, with its active area 3902 filled with two orthogonally laid out layers of scattered segments hiding two custom codes.

DESCRIPTION OF THE INVENTION

The present invention aims at hiding 2D codes such as QR-codes into a visible layer made of randomly scattered line segments. The layout of the randomly scattered line segments is defined by one, or several vectors that are part of the key. With this key, the software is able to recover the hidden 2D code. Without the key, a potential intruder has no means of recovering a hidden 2D code or of synthesizing a visible layer with a hidden 2D code that can be recovered. In the same way as 2D codes, text or a set of symbols can be hidden within the visible layer and recovered by acquiring an image of that visible layer, and by superposing a hidden layer onto the perspectively corrected, rectified and possibly scaled visible layer image. Both the visible layer and the hidden layer of scattered segments are generated with the same key.

The disclosed method for creating the scattered line segments hiding the 2D code relies on the presence of a visible layer and of a hidden layer. The visible layer comprises the scattered line segments. These scattered line segments have a length and an offset that have been generated with random functions. Therefore, the visible layer of randomly scattered line segments looks fuzzy. The individual line segments are placed at random locations. Anybody receiving a document or valuable item that incorporates this visible layer sees the scattered line segments or a halftone image built on top of this scattered line segments, but cannot obtain the 2D code hidden into this visible layer.

The hidden 2D code, the text or the symbols are revealed by having a computing device with a camera such as a smartphone acquiring an image of the visible layer, applying to it a perspective correction, locating the top left cross-grating starting point, locating successive cross-grating frame border points, and applying a rectification transformation mapping the perspectively corrected image into a rectified image. The software module running in the computing device or smartphone superposes the rectified visible layer image with a hidden layer synthesized according to the key that was also used for synthesizing the visible layer.

In a preferred embodiment, the composite visible layer of scattered line segments is formed by the union of two visible layers of scattered line segments, one having orientation $\theta_1$ and the other having a different orientation, preferably the orthogonal orientation $\theta_2=\theta_1+90°$. Besides having different orientations, the two visible layers can be produced with the same key. As an alternative, each visible layer forming the composite visible layer can have its own specific key.

In a different embodiment, it is possible to hide a 2D code within a single visible layer, i.e. a single layer of scattered line segments having a given orientation $\theta$, preferably $\theta=-45°$ (e.g. FIG. 6). In that case, the cross-grating frame surrounding the single layer of scattered line segments can be created by performing a union of the single visible layer with a second non-scattered line grating of orientation $\theta+90°$, placed only in the border areas defined for the cross-grating (FIG. 7, 703, 704, 705, 706). A cross-grating frame 3801 with an empty active area 3802 is shown in FIG. 38.

Preliminary Explanations and Vocabulary

The hidden layer generated within a smartphone is made of transparent scattered line segments. Regarding the figures of the present disclosure, due to dot gain at the borders of the black areas, thin transparent (or white) segments on a black background cannot be easily reproduced. We therefore prefer to represent layers of scattered transparent segments as inverse intensity images, with the scattered segments printed black on a white background, see FIG. 8 or FIG. 10. The same considerations apply to figures showing partially revealed 2D codes, e.g. FIG. 9 or FIG. 11.

A layer with scattered line segments hiding a 2D code is called "visible layer". The union of two layers (e.g. FIG. 7) each one with scattered line segments hiding its own 2D code or part of a 2D code is called "composite visible layer", or simply "visible layer". The context makes it clear if a "visible layer" is a single layer of scattered line segments of orientation θ or if it is the union of two layers of scattered line segments, the first one at orientation $\theta_1$ and the second at orientation $\theta_2$.

A scattering function is the function generating a sequence of scattered line segments (FIG. 3), defined each one by its length and its relative vertical position (also called "phase") or by its offset within a band (e.g. band $B_0$ delimited by dashed lines 331 and 332). In a preferred embodiment, the scattering function is a random function generating sequences of segments having a pseudo-random length as well as a pseudo-random offset within their band. In horizontal space, the scattered line segments are parts of bands $B_i$ (FIG. 3). The lowest band $B_0$ is called "base band". Random numbers are often produced by software random generators and are therefore also called "pseudo-random". In the present disclosure, the terms "pseudo-random" and "random" and used interchangeably.

The superposition of a visible layer hiding a 2D code and a hidden layer generated with the same key as the visible layer reveals partially the hidden 2D code, i.e. one obtains an image similar to the ones shown in FIG. 9 or FIG. 11. Examining such an image, a human being recognizes the presence of a QR code. However, to allow a software module to decode the QR code, further processing by low-pass filtering (e.g. Gaussian filtering) and thresholding is necessary.

A computing device connected to a camera or to a scanner has the same image acquisition and processing capabilities as a smartphone. Therefore the terms "smartphone" and "computing device" are used interchangeably.

Fundaments of the Proposed Method

The proposed method relies on a visible layer with scattered line segments which are either overlapping or disjoined from the scattered line segments of a hidden layer. The line segments are scattered according to a key, see Section "Pseudo-random scattering of line segments".

FIG. 1 gives an example of a part of the visible layer area that shows scattered line segments hiding a vertical black bar (K: 111) of width γ+δ. The white background (110,112) and the black bar are part of the 2D code. The area α on the left of the dashed vertical bar 120 corresponds to a first region of the scattering function and the area β on the right of the dashed vertical bar corresponds to a second region of the scattering function. The segments 100 and its neighbours on the top (e.g. 150, 160) and on the bottom (e.g. 105) are line segments having a vertical displacement period $d_V$. Let us assume that the initial phase $\Phi_{100}$ of segment 100 is zero.

Then we define a fraction of unity $\Phi_{WK}$ that indicates the placement of the line segment on a transition from white to black. Line segment 101 has therefore phase $\Phi_{101}=\Phi_{100}+\Phi_{WK}$. We also define a fraction $\Phi_{\alpha\beta}$ that defines the placement of the line segment on a transition from region α to region β. Line segment 102 has therefore phase $\Phi_{102}=\Phi_{100}+\Phi_{WK}+\Phi_{\alpha\beta}$. We further define a fraction $\Phi_{KW}$ that defines the placement of the line segment 103 on a transition between the black and the white areas of the 2D code. Its phase is $\Phi_{103}=\Phi_{100}+\Phi_{WK}+\Phi_{\alpha\beta}+\Phi_{KW}$.

Let us give a numerical example. We assume that at a given resolution, the vertical period $d_V=7$ pixels. The initial phase $\Phi_{100}$ of segment 100 is zero. We define $\Phi_{WK}=3/7$ of period $d_V$, i.e. vertically 3 pixels. Therefore, segment 101 is at phase $\Phi_{101}=3/7$. We define $\Phi_{\alpha\beta}=2/7$. For a band period $d_V=7$, this corresponds to a vertical shift of 2 pixels. Therefore segment 102 is at phase $\Phi_{102}=3/7+2/7=5/7$. We define $\Phi_{KW}=-3/7$. For a band period of $d_V=7$, this corresponds to a vertical shift of −3 pixels (3 pixels down). Therefore, segment 103 is at phase $\Phi_{103}=5/7-3/7=2/7$. Note that in this simple didactical example, the transition from area α to area β is a straight vertical line (dashed line 120). In the general case however, the transition between an area α and an area β occurs at a pseudo-random location, e.g. in FIG. 3, transitions 360, 365, 361, 366 or 362.

FIG. 2A shows schematically the superposition of both the visible layer of scattered line segments "V" and the hidden layer of scattered line segments "H". Imagine that these two layers are superposed on top of a 2D code which has a black bar in foreground area "K" (211) and a white background in background area "W" (210, 212). FIG. 2B shows a portion of the hidden layer, with its actual black parts 290, 291 and 292 and its transparent line segments 230', 270' and 280'. Line segment 230' is the same as line segment 230 of FIG. 2A, line segment 270' is the same as line segment 270 of FIG. 2A and line segment 280' is the same as line segment 280 of FIG. 2A.

The hidden layer made of scattered line segments "H" is transparent inside the line segments and black (or dark) outside them, see FIG. 2B. When superposed on the visible layer in one of the 2D code white areas (W: 210, 212), the transparent lines of the hidden layer allow light to pass through the superposition of visible and hidden layers. However, when superposed with the visible layer in one of the 2D code black areas (K: 211), the visible layer black lines and the hidden layer transparent lines overlap. The superposition of the two layers yields, due to the overlap, black lines, e.g. 206, 207, 201, 202, 251 where the line segments are labelled "H,V". In addition, in the hidden layer, the areas 290, 291, 292 surrounding the transparent lines 230', 270', 280' are black. Therefore, the superposition of hidden and visible layers in area "K" yields a black surface.

In order to complete the explanation, let us follow in FIG. 2A successive scattered segment of the visible or hidden layer. The segments denoted "V" belong to the visible layer and are the same as the segments shown in black in FIG. 1. For example segment 100 of FIG. 1 and segment 200 of FIG. 2A are identical. Segments 101 and 201 are also identical. Hidden line segment 201 starts at phase $\Phi_{201}$ which is equal to phase Om (in our example: 3/7) of visible layer segment 101. The phase of visible segment 201 is the same as the phase of hidden segment 270. At the dashed boundary 220 between areas α and β, the phase increment is $\Phi_{\alpha\beta}$. The actual phase of line segments 202 and 221 of the hidden layer is $\Phi_{202}=\Phi_{221}=\Phi_{201}+\Phi_{\alpha\beta}$, in the present example 3/7+2/7=5/7. The phase $\Phi_{203}$ of visible segment 203 is the phase $\Phi_{202}$ of segment 202 plus phase $\Phi_{KW}$, here $\Phi_{KW}=-3/7$. Therefore, $\Phi_{203}=5/7-3/7=2/7$.

Since the visible layer segment 203 is at phase $\Phi_{203}=2/7$ and the hidden layer segment is at phase $\Phi_{221}=5/7$, in region "W" (210, 212), visible ("V") and hidden ("H") layer segments are disjoint. Light passes through the transparent hidden segments ("H") and highlight regions 210 and 212, which form the white regions of the 2D code. In contrast, in region "K", the hidden transparent segments ("H") are superposed with the visible black segments ("V"), see e.g. 206, 207, 201, 202, 251. Light cannot traverse the superposition. Regions "K" of the superposition are very dark. These regions form the black regions of the 2D code to be revealed.

Pseudo-Random Scattering of Line Segments

Generally, the scattered line segments of visible and hidden layers have an oblique orientation, with θ giving the angle between the line segments and the horizontal. However, the preferred way of generating these scattered line segments consists in first conceiving conceptually the scattered line segments within a horizontal band, shown for example as band $B_0$ in FIG. 3. Then, when creating the visible and/or hidden layers, a rotation is applied in order to bring the horizontal band into the layout of the oblique band having orientation θ.

The pseudo-random distribution of the line segments of both the visible and the hidden layers is achieved by the following features. A key comprising numbers and at least one vector specifies the following elements:
 (a) the line segment orientation of the visible layer and of the hidden layer given by angle θ;
 (b) a horizontal or vertical distance $d_h$ or $d_v$ between successive bands at orientation θ, from which the repetition period p of the bands is calculated: $p=d_h \cdot \sin\theta$ or $p=d_v \cdot \cos\theta$;
 (c) on white areas of the 2D code, an offset δ between visible layer segments and hidden layer segments (FIG. 3, look for δ);
 (d) a succession of line segments of various lengths placed at different vertical offsets within each horizontal band of the horizontal band space, described by a scattering vector S;
 (e) for a current band $B_j$, a length displacement $u_j$ specifying the amount of pixels by which the succession of line segments is cyclically shifted, in respect to the succession of line segments of the base band. All displacements from first base band $B_0$ to second band $B_1$ until last band $B_{n-1}$, are stored in a sequence shift vector $U=[u_1, u_2, \ldots, u_{n-1}]$, where n is the number of bands vertically. These length displacements are preferably integer pseudo-random numbers between 1 and w−1, where w is the width of the base band $B_0$.

FIG. 3 shows an example of the layout of the hidden and visible layers in the horizontal band space. In FIG. 3, pixels are represented by small squares. This layout is purely virtual: at each position, thanks to the numbers forming the key, the base layer synthesizing software module knows if a pixel is located on a black, dashed or a white pixel location. The pixels located between two dashed lines (e.g. 331 and 332, or 332 and 333) form a band (e.g. $B_0$, $B_1$, $B_2$). Within each band, the key specifies the scattering behaviour of the black line segments, e.g. for band $B_0$: 301, 302, 303, 304, 305, 306, or for band $B_1$: 314, 315, 316, 311, 312, 313, 314.

In FIG. 3, in respect to the hidden layer, the black line segments represent transparent lines. In respect to the visible layer, they represent black visible segments in areas where the 2D code is black. When the 2D code is white, the black visible line segments follow the stippled line segments, for example in band $B_0$ of FIG. 3, line segments 351, 352, 353, 354, 355 and 356. And when there is a transition from a 2D code black area to a 2D code white area, there will be a transition between pixels shown as black in FIG. 3 and pixels shown as stippled. Therefore, the white to black and black to white transitions in the 2D code create additional transitions between line segments, not shown in FIG. 3, but shown for example in FIG. 2A, where at the boundary between areas "W" and "K" of the 2D code, there is a transition, i.e. a phase difference. Consider for example the transition between visible "V" segment 205 and visible "V" segment 206, that within area "K" overlaps hidden segment "H". Shortly stated, in areas "W" of the 2D code, "H" and "V" segments are disjoint whereas in areas "K" of the 2D code, "H" and "V" segments overlap.

The section of the key specifying the successions of the pseudo-random scattered line segments is formed by a vector containing at each entry one pair of numbers, in total k pairs of numbers, each pair representing a segment $S_I$, specified by its length $L_I$ and its band phase $\Phi_I$. The sequence $S=[S_0; S_1; \ldots; S_{k-1}]$ forms this part of the key and can be expressed as $$S=[L_0,\Phi_0;L_1,\Phi_1;\ldots;L_{k-1},\Phi_{k-1}] \quad (1)$$

Within a band, sequence S repeats itself cyclically from left to right: line segment $S_{k-1}$ is followed by line segment $S_0$. For example, the scattered black pixel line of band $B_0$ in FIG. 3, formed by the line segments 301, 302, 303, 304, 305, 306 is specified by the following sequence:

$$S=[8,0;8,2/7;3,1/7;4,3/7;2,0;3,2/7]; \quad (2)$$

In FIG. 3, segment 301 is 8 pixels long and has an offset of 0 pixel from the band border 331. Segment 302 is 8 pixels long and has phase 2/7 of the band period p, representing an offset from the band border of 2 pixels for a band period of p=7 pixels. Segment 303 is three pixels long and has a phase of 1/7, meaning an offset of 1 pixel. Segment 304 is 4 pixels long and has a phase of 3/7 meaning an offset of 3 pixels. Segment 305 is 2 pixels long and has a phase of 0. Segment 306 is 3 pixels long and has a phase of 2/7 meaning an offset of 2 pixels. This sequence then repeats itself horizontally along the band located between band boundaries 331 and 332 (base band). Note that the sequence S can also be expressed by a list of pairs $[L_i, O_i]$ representing the length $L_i$ of the current segment and its offset $O_i$ in pixels where the offset $O_i$ is the phase $\Phi_i$ multiplied by the band period p, expressed in the horizontal space.

On the next vertical band $B_1$ located between band boundaries 332 and 333, the same sequence appears, but cyclically shifted to the right by a length displacement 241, in FIG. 3, $u_1=8$ pixels. Segment 314 of the new band corresponds to segment 304 of the previous band, segment 315 corresponds to segment 305, segment 316 corresponds to segment 306, segment 311 corresponds to segment 301, segment 312 corresponds to segment 302, and segment 313 corresponds to segment 303. The next vertical band $B_2$ located above band boundary 333 is conceived in a similar manner, with a sequence shift $u_2=16$ from the sequence of the base band $B_0$ delimited by boundaries 331 and 332.

FIG. 3 shows that the vertical offsets $O_j$ of the black line segments can vary between zero and 3 pixels. FIG. 3 also shows that the stippled segments are a fixed number of pixels δ above the black segment, here just two pixels above the black segments. This does not need to be always the case. For example stippled segment 352 could be at an offset of 5 instead of an offset of 4 as shown. It is important to have at least one pixel separation between black and stippled segments. This means that in the present example, there should be no stippled segment on the last pixel line beneath the top separation 332. The reason is the presence of black segments at phase 0, on the lowest pixel line of band $B_1$.

Pseudo-randomly distributed vertical offsets for successive line segments can be generated by considering a state machine as shown in FIG. 4. State 0 corresponds to a segment phase of zero, e.g. segment 301. State 2/7 corresponds to a segment phase of 2/7, e.g. segment 302. State 3/7 corresponds to a segment phase of 3/7, e.g. segment 304. The arrows indicate the transition probabilities between the states. In the present example, we define the following transition probabilities, called P (state_m→state_n). Other transition probabilities could work as well.

Transition from state 0 to states 2/7 and 3/7: P(0→2/7)=a=75%; P(0→3/7)=b=25%
Transition from state 3/7 to states 1/7 and 0: P(3/7→1/7)=c=25%; P(3/7→0)=d=75%
Transition from state 2/7 to states 0 and 1/7: P(2/7→0)=g=80%; P(2/7→1/7)=e=20%
Transition from state 1/7 to state 3/7: P(1/7→3/7)=f=100%

In order to avoid having line segments from one band touching line segments from its neighbouring bands, other transitions are considered to be forbidden and have therefore a zero probability to occur.

Although the line segments shown in FIG. 3 have a thickness of one pixel, some of them could have a thickness of two pixels, allowing the creation of halftone shapes, see Section "Hiding a 2D code within a graphical halftone image".

Generation of a Visible Layer Made of Scattered Line Segments Having Orientation θ

On the synthesized visible layer both the scattered line segments as well as the bands have an orientation defined by angle θ which is one of the parameters of the key defining the layout of the scattered line segments. The software module responsible for the generation of the visible layer scans its pixmap pixel by pixel and scanline by scanline, and performs at each pixel position (x,y) of the visible layer a back-rotation of angle θ into the horizontal virtual layer containing the horizontal bands. From its current back-rotated position $y_b$, it calculates the current band number j=floor($y_b$,p), where the "floor" operator is the rounded down result of the division $y_b$/p. It gets from the sequence shift vector U the current sequence shift $u_j$=U[j]. With a modulo w subtraction of $u_j$ from the current back-rotated horizontal position ($x_b$), it obtains the horizontal position $x_0$=mod($x_b$−$u_j$,w) within the base band tile $B_0$ of width w pixels. The vertical position within the base band is given by $y_0$=mod($y_b$,p), where p is the band period. With the horizontal base band tile position $x_0$, it deduces the current segment $S_1$ within segment sequence S and its associated offset $O_i$. If the $y_0$ value of the back-rotated and sequence shift-compensated value position ($x_0$, $y_0$) is between the vertical positions $O_i$+δ and $O_i$+δ+τ, then pixel position (x,y) of the visible layer is part of a stippled line segment (e.g. FIG. 3, 351) and should in case of a white 2D code area be set to black, otherwise it is part of the space between stippled line segments and should be set to white. Note that τ is the thickness of the line segments and that δ is the constant offset between visible layer segments and hidden layer segments in the white parts of the 2D code. In the example of FIG. 3, τ=1 and δ=2.

Expressed graphically with FIG. 3, let us consider first the case where current position (x,y) within the visible layer corresponds to a white position within the 2D-code (FIG. 1, 110 or 112). In this case, if the back-rotated and sequence shift compensated position ($x_0$,$y_0$) falls within the stippled line segments 351, 352, 353, 354, 355, or 356, the pixel in the original visible layer should be marked as black otherwise they should be left white. This case occurs in the white regions "W" (210 and 212 of FIG. 2A), where scattered lines of visible and hidden layers are disjoint.

Now consider the case where current position (x,y) within the visible layer corresponds to a black position within the 2D code (FIG. 1, 111). If the back-rotated and sequence shift compensated position ($x_0$,$y_0$) falls within the black line segments of 301, 302, 303, 304, 305, or 306, of FIG. 3, the pixel in the original visible layer should be marked as black, otherwise it should be left white. That case corresponds to the black area "K" (211) of FIG. 2A, where scattered lines of visible and hidden layers are superposed (line segments "H,V").

Note that for performing the steps mentioned in the present section, one may choose to have large black areas and small white areas. In that case, before synthesizing the visible layer, we invert the image of the 2D code that is to be hidden into the visible layer. Black and white of the 2D code are exchanged. Then we proceed with the steps mentioned in the present section. This yields a superposition of visible and hidden layer where all the 2D code background is black (FIG. 5B, 521) and where the foreground regions are covered by scattered white line segments (FIG. 5B, 520).

Generation of the Hidden Layer Made of Scattered Line Segments Having Orientation θ

The generation of the hidden layer is carried out similarly to the generation of the visible layer, but only one case is considered, i.e. the hidden layer does not depend on white or black areas of the underlying 2D-code. After back rotation and compensation of the sequence shift, only the black lines segments of FIG. 3 are considered as active line segments. The active line segments of the hidden layer are transparent. Their surrounding areas are black. Similarly to the visible layer, the hidden layer is traversed pixel by pixel and scanline by scanline. Back-rotation and sequence shift compensation are applied. If the back-rotated and sequence shift compensated position ($x_0$,$y_0$) falls within the black line segments 301, 302, 303, 304, 305, or 306 of base band tile $B_0$, the pixel (x,y) in the hidden layer should be marked as active pixel or transparent pixel. If it does not fall within the black line segments of base band tile $B_0$, it should be marked as inactive pixel or black pixel.

Resulting Visible and Hidden Layers Made of Scattered Lines

As mentioned in Section "Generation of visible layer made of scattered line segments having orientation θ", a rotation operation is applied to obtain from the horizontal tiles (e.g. the $B_0$, $B_1$, $B_2$ tiles of FIG. 3) the oblique scattered line segments forming the visible layer. FIG. 6 shows as example the resulting visible layer hiding a first QR-code with scattered oblique line segments having an orientation of minus 45 degrees ($θ_1$=−45°). Oblique transitions (in FIG. 6, transitions at 45° orientation) from one scattered line segment to the next are due to variations in sequence offsets (e.g. in FIG. 3 transitions 360, 365, 361,366, 262) and to changes in corresponding regions of the 2D code, such as from white (FIG. 2, "W", 210) to black ("K", 211) areas or from black ("K", 211) to white ("W", 212) areas. In case of a change of region of the 2D code (W→K or K→W), in the visible layer, line segments shown as black segments (301, 302, 303, 304, 305, 306 in tile $B_0$ of FIG. 3 have a transition to line segments shown as stippled segments (351, 352, 353, 354, 355, 356) or vice-versa. Due to the pseudo-randomness of the scattered line segments, intruders cannot guess the content of the message that is hidden within the visible layer. Such a visible layer would be similar to FIG. 6 or to FIG. 7, but with very long sequences of scattered line segments, for example scattered line segments covering the whole length of a band. The reason is that intruders cannot distinguish transitions due to a change of region of the 2D code from transitions due to sequences of randomly scattered line segments.

It is possible to hide a second message superposed with the first message. This is achieved by applying again the procedure mentioned in Section "Generation of visible layer made of scattered line segments having orientation θ, but for hiding a second 2D code containing a second message hidden within scattered line segments laid out at a second angle, preferably $\theta_2=+45°$, yielding positively oriented scattered line segments.

The pixel by pixel union of the first visible oblique layer having orientation $\theta_1$ (e.g. $\theta_1=-45°$) and the second visible oblique layer having orientation $\theta_2$ (e.g. $\theta_2=+45°$) yields the composite visible layer shown in FIG. 7. In the example of FIG. 7, oblique scattered line segments at orientation $\theta_1=-45°$ hide the first QR-code and oblique scattered line segments at orientation $\theta_2=+45°$ hide the second QR-code.

The composite visible layer (e.g. FIG. 7) with intersecting scattered line segments at two different orientations can be printed or reproduced, depending on the resolution of the output device and of the acquisition device, as a square or a rectangle with a side of size between 24 mm and ⅛ mm. The resulting scattered segment intersections form a web of randomly positioned obliquely laid out cross-like patterns. Potential intruders cannot guess what such a densely packed array of scattered segments contains.

The composite visible layer can be reproduced on a substrate. This reproduction may involve printing with inks on paper, cardboard or plastic. Reproduction technologies comprise inkjet, thermal transfer, electrophotography, offset printing, 3D printing, gravure printing, heliogravure, flexography, mechanical engraving, laser engraving, injection molding and laser lithography. Alternately, the composite visible layer can be patterned on a plastic, glass, silicon or on a metal substrate. Patterning technologies comprise photolithography, nanolithography, nanoimprint lithography, or stencil lithography. The patterns generated on a substrate may then be reproduced on a master such as a nickel shim, a PDMS stamp, a polymer stamp, or a silicon stamp. Such stamps allow for the fabrication of many plastic or metal replicas by injection molding, roll-to-roll fabrication, hot embossing or thermal imprinting.

The hidden layer that has the ability of revealing the 2D code that is hidden within the visible layer is generated with the same key as the visible layer, but incorporates only transitions of successive line segments (in tile $B_0$ of FIG. 3, transitions 360, 365, 361,366, 262), as defined by the sequence S of the key, see Equation (1). There is a first hidden layer (inverse of FIG. 8) for revealing the first 2D code and a second hidden layer (inverse of FIG. 10) for revealing the second 2D code. The hidden layer incorporates no knowledge about the 2D code that it reveals. Therefore, several visible layers incorporating different messages can be revealed with the same hidden layer. These visible layers and their revealing hidden layer have in common the key that defines the transitions that are independent of "white" or "black" 2D code regions, i.e. the transitions that are shown in FIG. 3 between successive black or between successive stippled line segments. Corresponding visible and hidden layers also have a common orientation θ of their line segments.

The first hidden layer laid out at the first orientation $\theta_1$ (e.g. $\theta_1=-45°$) is the inverse intensity image of FIG. 8, i.e. a layer where the scattered line segments are transparent and their surrounding areas are black. When superposing the first hidden layer embedding the transparent scattered line segments and the visible layer with the scattered line segments (FIG. 7, black segments on white background), one obtains a first partially revealed 2D code, whose inverse intensity image is shown in FIG. 9. In this superposed layer, the QR code white regions (background) appear as black and the QR code black regions (foreground) appear as hatched with scattered white line segments, similarly to FIG. 5B.

The second hidden layer laid out at the second orientation $\theta_2$ (e.g. $\theta_2=+45°$) is the inverse of the layer shown in FIG. 10. It is generated in the same manner as the first hidden layer, but at this second angle $\theta_2$. The superposition of this second hidden layer and the visible layer with the scattered line segments (FIG. 7, black segments on white background forming cross patterns) yields the second partially revealed 2D code, whose inverse intensity image is shown in FIG. 11. Here also, the QR code white regions (QR-code background) appear as black and the QR code black regions (QR-code foreground) appear as hatched with scattered white line segments (similar to FIG. 5B).

Verification of the Synthesized Visible and Hidden Layers by Processing the Partially Revealed 2D Codes The correctness of the synthesized visible and hidden layers can be verified by applying processing operations to the partially revealed 2D codes in order to obtain decodable 2D codes. The hidden 2D code is recovered by carrying out the following operations. The partially revealed 2D codes (inverse intensity examples shown in FIGS. 9 and 11) are processed by a low pass filter, preferably a 2D Gaussian filter, and by applying a thresholding operation. In a preferred embodiment, the Gaussian filter has a standard deviation σ equal to the ⅓ of the band period, i.e. $\sigma=(⅓)p$. The threshold level is calculated according to Otsu's method, see [Otsu 1979]. The first resulting decodable 2D code is the one shown in FIG. 12 and the second resulting decodable 2D code is the one shown in FIG. 13. The fact that these two QR codes are decodable by a standard QR code scanner indicates that the visible and hidden layers were correctly generated. The corresponding decoded messages are "HERSCH-07071951" (FIG. 12) and "ROSSIER-1111979" (FIG. 13).

Synthesizing, Reproducing, Acquiring and Recovering the Hidden 2D Code

The goal is to protect an original document or valuable article against counterfeits or against tampering by having a message expressed by a 2D code hidden into a visible layer of scattered line segments that is embedded within the graphical design or within the background associated to that document or valuable article. The visible layer of scattered line segments (e.g. FIG. 7) is reproduced on the target device, or on a label that is securely attached to the target device. This visible layer incorporates the scattered line segments that are generated according to a key and according to the black and white regions of the hidden 2D code that encodes the hidden message that is secretly transferred from an emitting body to a receiving body. This hidden message can be revealed by a person or an apparatus having a smartphone or a computer with a camera. The smartphone (or the computer) acquires an image of the reproduced visible layer. The software module running in the smartphone (or in the computer) incorporates the same key as the one used for synthesizing the visible layer. With this key the software module is able to generate the hidden layer formed by scattered line segments that, when superposed in registration with the visible layer made of scattered segments yields the partially revealed 2D code. An inverse intensity image of a partially revealed 2D code is shown in FIG. 9 or in FIG. 11. A part of the partially revealed 2D code is shown in FIG. 5B. The partially revealed 2D code is characterized by scattered segments located in the foreground area of the 2D code (e.g. FIG. 5B, 501) or according to a different embodiment by scattered segments located in the background area of the 2D code.

Section "Verification of the synthesized visible and hidden layers by processing the partially revealed 2D codes" explains how to process the partially revealed 2D code in order to obtain the decodable 2D code from which the hidden message can be read. The steps of camera acquisition of the visible layer with the scattered line segments, perspective correction, rectification, optional scaling and superposition are detailed in the following sections.

Image Acquisition and Sharpness Verification

The image acquisition of the reproduced visible layer made of scattered segments is performed in a separate thread of the smartphone. Several images per second are acquired and their sharpness is checked. The person holding the smartphone is asked to center the acquired visible layer within a displayed frame. Blur occurs due to lack of focus or due to the movement of the smartphone. Generally, after a short time a sharp image appears. Sharpness is checked by the software by applying a formula such as the variance of the light intensity reflected from the base layer multigrating. The higher the variance, the sharper the acquired image. One can establish a variance threshold above which the acquired image area is considered to be sharp. To obtain a binary image independent of illumination, the acquired image is thresholded by an adaptive thresholding algorithm, see [Bradley & Roth 2007].

Perspective Correction

A captured image of a reproduced visible layer is first checked for sharpness. If it exhibits a sufficiently high sharpness, the image is further processed in order to remove the perspective distortion by applying a correction. Perspective correction has the goal of geometrically transforming the captured quadrilateral containing the visible layer with the scattered line segments surrounded by a rectangular thin dark frame (FIG. 7, 701), into a rectangular or square visible layer of known width to height ratio. The acquired image is adaptively thresholded, the quadrilateral bordering the base layer grating is detected and its contour is extracted [Suzuki and Abe 1985]. Then a polygonal approximation is performed with the Douglas and Peucker algorithm [Douglas and Peucker 1973]. Finally, one obtains a polygon with 4 vertices, i.e. a quadrilateral. The coordinates of the quadrilateral are the coordinates of the perspectively projected thin rectangular (or square) frame bordering the visible layer of scattered line segments. Thanks to these 4 vertices, one can calculate the coefficients of a perspective transformation matrix (also called projective transformation matrix) mapping the 4 vertices of the original thin rectangular (or square) frame bordering the reproduced visible layer into the vertices of the acquired quadrilateral, see [Hartley and Zisserman 2003, pages 32-36]. The aspect ratio of the original rectangular frame is prior knowledge, also useful for establishing the perspective transformation. With the inverse of this perspective transformation matrix, the perspectively distorted visible layer with the scattered line segments is transformed onto the corresponding rectangular (or square) visible layer of scattered line segments. In order to obtain the perspectively corrected visible layer, the software traverses the target rectangular (or square) area, scanline by scanline and pixel by pixel, finds by applying the perspective transformation matrix the corresponding location in the perspectively projected (distorted) grating, and copies its intensity, gray or color value into the current location of the perspectively corrected rectangular (or square) area.

Visible Layer Image Rectification by Applying a Rectification Transformation

Perspective distortion correction is not sufficiently accurate to provide from the acquired visible layer quadrilateral a perfectly rectangular or square rectified visible layer grating that can be superposed with its corresponding hidden layer of scattered line segments. There is a need to perform an additional image rectification operation. This rectification operation relies on the knowledge of the intersection coordinates of pairs of line segments forming the cross-grating bordering frame surrounding the active part of the visible layer.

The frame (FIG. 7, 703, 704, 705, 706) bordering the active part 710 of the composite visible layer of scattered line segments is formed by non-scattered intersecting line segments. This bordering frame is called "cross-grating frame" or simply "cross-grating". The cross-grating frame surrounds the active area 710 containing the scattered line segments of the composite visible layer. FIG. 14A shows an enlargement of the top left part of the visible layer which is displayed in FIG. 7. FIG. 14B shows a further enlargement of the top left part of FIG. 14A.

We define a starting position at an intersection point (FIG. 14B, 141) within the top-left part of the bordering cross-grating frame. We would like to find this cross-grating intersection point in the acquired and perspectively corrected visible layer image. For this purpose, we need to compensate for the inaccuracies of the extraction of the rectangular fine frame (frame 701 shown in FIG. 7) and localize the top left corner (FIG. 7: 730, FIG. 14B, 145) of the cross-grating. This procedure is called "cross-grating localization".

The acquisition and perspective correction yield variations in the location of the external rectangular thin frame (FIG. 7, 701). Different acquisitions on which the perspective correction is applied yield different positions of the rectangular thin frame 701, e.g. FIG. 16A where at the top left both the horizontal 1660 and vertical 1670 part of the external thin frame are present. In another perspectively corrected acquisition (FIG. 16B), at the top left, the horizontal part 1668 of the rectangular thin frame is inside and its vertical part is outside (not visible) of the resulting visible layer image. These variations are due to different acquisition conditions such as acquisition distances, acquisition orientations, lightning conditions, and/or differently printed visible layer images.

In order to locate the top-left position of the cross-grating (FIG. 14B, 145), we apply the cross-grating localization procedure. For this purpose, we analyse the top-left part of the acquired, perspectively corrected visible layer image (e.g. FIG. 16A) with horizontal 162 and vertical 163 flat kernels. The following cases arise:

(a) The most left or top position of the acquired and perspectively corrected image is a white area 146 outside the external rectangular thin frame 701;
(b) The most left or top position of the acquired and perspectively corrected image is a black area 144 inside the external rectangular thin frame 701;
(c) The most left or top position of the acquired and perspectively corrected image is a white area 147 between the external rectangular thin frame and the cross-grating of the visible layer image.

Accounting for these differences in acquired and perspectively corrected images, we search for the top-left pixel (FIG. 7: 730, FIG. 14B: 145) of the cross-grating frame.

Two examples of acquired and perspectively corrected images are given. In one acquisition, the top-left extremity (FIG. 16A, 161) of the external rectangular thin frame is present within the horizontal kernel (FIG. 16A, 162) that includes the top part 1660 of the rectangular thin frame. The top left extremity of the rectangular thin frame is also present inside the vertical kernel (FIG. 16A, 163). In a different acquisition, the calculated top left contour position (FIG. 16B, 166) is contained inside the horizontal kernel (FIG. 16B, 167) that includes the top part 1668 of the rectangular thin frame. It is also included inside the vertical kernel (FIG. 16B, 168) which however does not include the left part of the external rectangular thin frame. Nevertheless, by further shifting the vertical kernel to the right, it reaches the left-most pixels 1686 of the cross-grating. Further shifts to the right confirm that the cross-grating has been reached. Therefore, the intersection of the horizontal kernel 167 and vertical kernel 168 defines a top-left pixel (161, respectively 166) within the external thin frame. From that top-left pixel (161, respectively 166), by a translation according to a value known from the geometry of the visible layer, a top left pixel (164, respectively 169) of coordinate ($x_0$, $y_0$) of the cross-grating is reached.

The theoretical starting intersection point of the cross-grating (e.g. FIG. 14B, 141) is defined at a relative known ($\Delta x$, $\Delta y$) distance from the top left pixel 145 ($x_0$, $y_0$) of the cross-grating. In order to locate the starting intersection (e.g. FIG. 16A, 1680 or FIG. 16B, 1681) of the acquired and perspectively corrected cross-grating, we need first to find the effective location of the top left pixel (FIG. 17, 171) of the cross-grating frame.

For this purpose, let us give details of the cross-grating localization procedure. We define a vertical kernel of size $m_v \times n_v$ pixels and a horizontal kernel of size $m_h \times n_h$ pixels. In the acquired image of FIG. 17, the vertical kernel is of size 20×1 pixels (FIG. 17, 173) and the horizontal kernel is of size 1×20 pixels (FIG. 17, 174). We start by moving to the right the vertical kernel one pixel by one pixel and compute the percentage of black pixels in the kernel. If this percentage is larger than a predefined blackness coverage (e.g. 80%), we are still within the external rectangular thin frame. If this percentage is below a predefined blackness (e.g. a blackness coverage below 20%), we are within a white space area of the acquired and perspectively corrected image. In case the blackness coverage is between 20% and 80%, we further verify that the vertical kernel reached the starting location of the cross-grating by considering the next vertical kernel one pixel to the right and by computing its black pixel percentage. If this black pixel coverage is lower than 20% (FIG. 17, 175), we did not reach the cross-grating of the visible layer but rather the white area between the thin frame and the cross-grating of the visible layer. We therefore continue moving the vertical kernel one pixel by one pixel to the right until we are reaching locations of the cross-grating within the visible layer (FIG. 17, 176). These locations are reached when (a) the black pixel coverage does neither imply a black nor a white surface, and (b) the next additional kernel to the right is also neither a white surface nor a black surface. We apply the same procedure for the horizontal kernel by moving the upper kernel (FIG. 17, 174) down one pixel by one pixel, computing at each location its black surface coverage (percentage of black pixels) and by verifying if we are reaching the upper part of the cross-grating of the visible layer (FIG. 17, 177). The cross intersection of the vertical and horizontal kernels gives the effective location of the upper-left pixel of the cross-grating of the visible layer (FIG. 17, 171). We then calculate the theoretical location of the starting cross-grating intersection position 172 of the cross-grating frame with a relative ($\Delta x, \Delta y$) displacement from the upper-left pixel location (FIG. 17, 171).

After having calculated the theoretical location of the starting cross-grating position 172, we compute its corresponding effective location 178 by a search kernel moving according to pixel-wise displacements around the theoretical position in positive and negative directions by half the search kernel dimension (e.g by half the band period p). The location where the averaging kernel gives a minimum is the effective coordinate of the position at the starting intersection point (FIG. 17, 178).

After having found the position of the starting cross-grating intersection point (FIG. 14B, 141), we consider establishing a table whose entries have two positions, the theoretical position ($x_i, y_i$) according to the geometry of the considered cross-grating within the composite visible layer (e.g. FIG. 14B) and its actual position ($x_i', y_i'$) (e.g. FIG. 17). With this table of geometrically correct intersections and actual intersections, we define a linear or non-linear transformation that transforms the acquired, perspectively corrected composite visible layer into a layer as close as possible to the geometrically correct layer obtained when creating in memory of a computer the composite visible layer of scattered line segment image (see Section "Generation of a visible layer made of scattered line segments having orientation θ").

In order to create that table of geometrically correct and actual intersection locations, we need to obtain the actual intersection locations ($x_i', y_i'$). We start with the actual starting cross-grating intersection point (FIG. 17, 178). We add the geometrically correct distance to reach one of the next intersection points, horizontally as well as vertically. In the horizontal direction, in case that every second intersection is considered, this distance from the current actual intersection is twice the horizontal period of successive non-scattered line segments. In the vertical direction, similar considerations apply. Expressed in formal terms, the theoretical coordinates ($x_i, y_i$) of the next considered intersection are obtained by moving from the previous actual intersection ($x_{i-1}', y_{i-1}'$) by vector [($x_i, y_i$)−($x_{i-1}, y_{i-1}$)], where ($x_i, y_i$) is the new geometrically correct position and ($x_{i-1}, y_{i-1}$) is the previous geometrically correct position. After calculating the theoretical position ($x_i, y_i$) of the next considered intersection, the software searches for the actual intersection. From the geometrically correct position, the kernel moves by pixel-wise displacements around this position in positive and negative directions by half the kernel size (e.g. half the band period p). The location where the averaging kernel gives a minimum is the effective coordinate ($x_i', y_i'$) of the considered new intersection of two black cross-grating lines. This process continues until effective coordinates of representative intersection points are found within all parts of the cross-grating frame (FIG. 7, 702, 703, 704, 705, 706) surrounding the active scattered segment area 710 of the composite visible layer. The active area with the scattered segments has boundary 720. Exterior to boundary 720 is the cross-grating with the non-scattered intersecting line segments. Successive representative intersections can have a distance of one, two (e.g. FIG. 14B, 141→142 and 141→143), 4, 8, 16 or more intersections, depending on the resolution and the size of the considered visible layer.

After establishing correspondences between theoretical and effective locations of line grating intersections, one can deduce a rectification transformation mapping the effective to the theoretical locations. Such a mapping maps positions on the acquired perspectively corrected visible layer to their improved positions. For example, one can derive a linear transformation M mapping effective locations $(x_0',y_0')$, $(x_1',y_1')$, ..., $(x_n',y_n')$ to improved (or desired) locations $(x_0,y_0)$, $(x_1,y_1)$, ..., $(x_n,y_n)$. Here are the corresponding equations, where the unknown transformation matrix M is given by its 4 coefficients a, b, c and d:

$$\begin{bmatrix} x_0 & x_1 & \ldots & x_n \\ y_0 & y_1 & \ldots & y_n \end{bmatrix} = \begin{bmatrix} a & b \\ c & d \end{bmatrix} \cdot \begin{bmatrix} x_0' & x_1' & \ldots & x_n' \\ y_0' & y_1' & \ldots & y_n' \end{bmatrix} \quad (3)$$

In short form, we have $$H = M \cdot F \quad (4)$$

where F is the matrix with the effective positions $(x_0',y_0')$, $(x_1',y_1')$, ..., $(x_n',y_n')$ and where H is the matrix with the geometrically correct positions $(x_0,y_0)$, $(x_1,y_1)$, ..., $(x_n,y_n)$. The coefficients of matrix M are found by minimizing a distance metric, for example the sum of square differences between geometrically correct locations and improved locations:

$$M = \mathrm{argmin} \Sigma \|H - MF\|^2 \quad (5)$$

This can be done by applying the pseudo-inverse operation $(\ )^+$ to matrix F:

$$M = HF^+ \quad (6)$$

and one obtains the linear transformation matrix $$M = \begin{bmatrix} a & b \\ c & d \end{bmatrix}.$$

The final rectified visible layer image is obtained by applying transformation M to the acquired perspectively corrected visible layer image. This may be carried out by traversing the rectified visible layer space, scanline by scanline, and pixel by pixel, and at each pixel location applying the inverse transformation $M^{-1}$, localizing the nearest pixel center on the non-rectified perspectively corrected base layer multigrating image and copying its intensity or color to the current pixel location of the composite rectified visible layer image.

Recovering and Decoding the Hidden Message

The hidden message is obtained by superposing one of the hidden layers of scattered line segments (e.g. either the hidden layer shown in inverse intensity mode in FIG. 8 or the one shown in inverse intensity mode in FIG. 10) and the corresponding composite rectified visible layer of scattered segments. In the process of acquisition, perspective correction, and rectification of the scattered segment visible layer, slight deformations may occur. Such deformations may require an additional scaling operation. Its goal is to obtain the best possible superposition between acquired visible layer and hidden layer. For scaling purpose, in vertical orientation, the actual vertical difference is calculated between starting cross-grating intersection located at the top-left (FIG. 15A, 152) and cross-grating intersection at the bottom-left (FIG. 15B, 153). In the horizontal direction, the actual horizontal difference is calculated between cross-grating starting intersection located at the top-left (FIG. 15A, 152) and the cross-grating intersection located at the top right (FIG. 15C, 154). By dividing the geometrically correct theoretical difference by the actual difference, one obtains a horizontal and vertical scaling factor by which the actual visible layer is to be scaled in order to come closer to the geometrically correct visible layer.

For an optimal superposition of the visible and hidden layers, the software can move the hidden layer on the top of the acquired, perspectively corrected, rectified and possibly scaled visible layer pixel by pixel for a small distance (e.g. 1 or 2 pixels) in the horizontal and vertical direction. We start by superposing the perspectively corrected, rectified and possibly scaled composite visible layer image with the hidden layer, using the cross-grating starting point (FIG. 17, 178) for registration of the two superposed layers. We then define a searching area by displacing the hidden layer on top of the acquired perspectively corrected and rectified composite visible layer image in positive and negative directions by one or two pixels. This superposition operation is carried out only on the surface of the cross-grating frame bordering the active part of the composite visible layer (e.g. FIG. 7, 703, 704, 705, 706). When the composite visible layer and the hidden layer are in exact superposition registration, the area of the cross-grating frame should become black, i.e. its intensity should be close to zero. The average intensity within the cross-grating frame represents a metric of the superposition accuracy. After selecting the superposition of the cross-grating frame yielding the lowest intensity, the superpositions of the composite visible and the hidden layers are calculated by a simple binary multiplication of the visible and hidden layer intensities (assuming black to be 0 and white to be 1). The resulting composite visible and hidden layer superpositions are similar to the partially revealed 2D codes (FIG. 5B) obtained when verifying the correctness of the generated visible and hidden layers of scattered segments. These partially revealed 2D codes are shown for the superposition of the composite visible and the first hidden layer as the inverse intensity image of FIG. 9 and for the superposition of the composite visible and the second hidden layer as the inverse intensity image of FIG. 11.

The so-obtained partially revealed 2D codes are further processed by applying a Gaussian low-pass filter, as described in Section "Verification of the synthesized visible and hidden layers by processing the partially revealed 2D codes". The last step consists in applying a thresholding function to the resulting low-pass filtered superposition image, for example with Otsu's method [Otsu 1979]. Otsu's method finds the threshold that minimizes the intra-class variance of the two classes of pixels (gray pixels that become white and gray pixels that become black) or equivalently maximizes the inter-class variance. After thresholding, the resulting bilevel 2D code image resembles the one shown in FIG. 12 in case of superposition of the composite visible layer with the first hidden layer and shown in FIG. 13 in case of superposition of the composite visible layer with the second hidden layer.

In the general case, two hidden 2D codes are successively recovered by the superposition of the perspectively corrected and rectified composite visible layer with successively two hidden layers, each one having the same key as its corresponding single visible layer being part of the composite visible layer. One may also recover a single hidden code by the superposition of a perspectively corrected and rectified non-composite single visible layer of scattered segments produced with a given key and a hidden layer produced with that same key, both having a same orientation.

This 2D code image resulting from superposition, low pass filtering and thresholding is the input to a standard code decoder, such as the software ZXing decoder, an open-source, multi-format 1D/2D barcode image processing library. The decoder software module yields the message in clear form.

"Half-Size" Hidden 2D Code

On some devices such as fiscal stamps, space is scarce. There is a need to reduce the size of the visible layer that is reproduced on such devices. It is possible to reduce the size of the printed or patterned visible layer by hiding a single 2D code instead of hiding two 2D codes. We synthesize a half-size visible layer by dividing the 2D code (FIG. 18A) into two pieces (FIGS. 18B and 18C), synthesizing for each piece the visible layer made of scattered line segments at its specific orientation (FIGS. 19A and 19B) and creating the composite visible layer (FIG. 20) by the pixel by pixel union of the two visible layers (FIGS. 19A and 19B).

For the recovery of the hidden 2D code, the smartphone performs acquisition, perspective correction, cross-grating localization, rectification and optionally scaling. The upper part of the hidden 2D code is recovered by the superposition with the hidden layer generated at line segment orientation $\theta_1$ (e.g. $\theta_1 = -45°$). The lower part is recovered by the superposition with the hidden layer generated at line segment orientation $\theta_2$ (e.g. $\theta_2 = +45°$). After having recovered the upper (FIG. 21A) and lower (FIG. 21B) parts of the 2D code, we reconstruct the full 2D code by placing upper (FIG. 23A) and lower (FIG. 23B) parts one below the other (FIG. 24). We can then decode the retrieved 2D code and obtain its message content.

Let us consider as 2D code example a QR-code. A QR-Code contains an odd number of modules, where a module is a single square element used to encode data into the QR-Code, for instance FIG. 18A, 181. The number of QR-Code modules depends on the amount of encoded information, e.g. 21×21 modules for a QR-Code version 1 or 23×23 modules for a QR-Code version 2. In case the hidden 2D code is a QR-Code, we prefer not to divide it into two halves of exactly the same size as it would cut the QR-Code at the middle of a row of QR-Code modules. We prefer instead to cut the QR-Code after an integer number of vertical modules m+1 for the upper part and m for the lower part. Assuming that we would like to hide the message "ROSSIER-11111979" with the QR-Code version 1 of FIG. 18A containing 21×21 modules, we cut this QR-Code into an upper QR-Code part of 11×21 modules (FIG. 18B) and into a lower QR-Code part of 10×21 modules (FIG. 18C).

After having partitioned the original 2D code into two parts, we synthesize the first half-size visible layer hiding the upper 2D code part with the selected sequence of random scattered line segments having line orientation $\theta_1$ (FIG. 19A) where the active area of scattered segments is bounded by boundary 191. Exterior to boundary 191 is the frame 195 containing the grating of non-scattered line segments used for the rectification of the acquired and perspectively corrected image. We synthesize in a similar way the second half-size visible layer hiding the lower 2D code part with line orientation $\theta_2$ (FIG. 19B). These two visible layer parts have the same scattered segment active area boundaries 191 and 192.

The half-size composite visible layer (FIG. 20) that can be printed or reproduced onto valuable documents and articles is obtained by the pixel by pixel union of the first half-size visible layer having orientation $\theta_1 = -45°$ (FIG. 19A) and the second half-size visible layer having orientation $\theta_1 = 45°$ (FIG. 19B).

In order to be able to reconstruct the full 2D code after having recovered the upper and lower 2D code parts, we first locate the starting intersection ($x_{cs}, y_{cs}$) of the cross-grating frame (FIG. 20, 2001) and define at a distance ($\Delta x_{cas}, \Delta y_{cas}$) from it the active area upper registration location ($x_{as}, y_{as}$), see FIG. 20, 2002. In the partially revealed 2D code part of FIG. 21B, the corresponding location is 2108. We also define at a distance ($\Delta x_{cae}, \Delta y_{cae}$) from the cross-grating ending point ($x_{ce}, y_{ce}$), (see FIG. 20, 2004), the active area lower registration location ($x_{ae}, y_{ae}$), see FIG. 20, 2003. In the partially revealed 2D code part of FIG. 21A, the corresponding location is 2106. After applying the Gaussian low pass filter and the thresholding operation separately on the partly revealed upper (FIG. 21A) and partly revealed lower (FIG. 21B) 2D code parts, the two parts are assembled one below the other by cutting the upper recovered 2D code part at the vertical position of the active area lower registration location ($x_{ae}, y_{ae}$), (in FIG. 21A, 2106), and by cutting the lower recovered 2D code part at the vertical position of the active area upper registration location ($x_{as}, y_{as}$), in FIG. 21B, 2108.

The recovery and the decoding of the 2D code is obtained in a similar way as described in Section "Synthesizing, reproducing, acquiring and recovering the hidden 2D codes". We first apply a cross-grating localization procedure in order to obtain the effective location of the half-size visible layer starting cross-grating intersection point (in the acquired visible layer, FIG. 22A, 2201). We then apply the rectification and scaling operations. From the starting cross-grating intersection point 2201, we obtain the active area upper registration location 2202. From the ending cross-grating intersection point 2203, we obtain the active area lower registration location 2204. We then superpose the resulting half size perspectively corrected, rectified and possibly scaled composite visible layer hiding the two half-size hidden 2D code parts and the hidden layers, by making use of the starting cross-grating intersection location ($x_{cs}, y_{cs}$) as a registration point for the half-size composite visible layer and for the two hidden layers. We obtain the binary upper 2D code part (FIG. 23A) and the binary lower 2D code part (FIG. 23B) by applying to each of the two superpositions a Gaussian low pass filter and an Otsu thresholding operation.

To finalize the recovery of the 2D code, we recombine the upper and lower binary 2D code part images onto one full binary 2D code. At the active area lower registration location ($x_{ae}, y_{ae}$) we cut the upper 2D code (FIG. 23A, 2301) and at the active area upper registration location ($x_{as}, y_{as}$) we cut the lower 2D code (FIG. 23B, 2302). We then assemble them vertically into a full 2D code image (FIG. 24). In this assembly, the cut line (FIG. 23A, 2301) at the bottom of the upper binary 2D code is brought onto the cut line (FIG. 23B, 2302) at the top of the lower binary 2D code. This full binary 2D code image is decoded by a standard 2D code decoder, such as the ZXing software. The corresponding message is then obtained in clear form.

"Quarter-Size" Hidden 2D Code

Often a significant part of a 2D code (e.g. a QR-Code) is not used for encoding information but for acquiring its image by a camera and for positioning the acquisition in respect to a predefined template. For instance, in order to be able to acquire the QR-Code of FIG. 25, it needs to be surrounded with the quiet zone 2501 consisting of a white space area of more than 20% of its total surface. This quiet zone helps differentiating the background of the QR-Code and its content. Furthermore, the QR-Code contains the three 2502, 2503 and 2504 positioning markers that are used both to locate the area covered by the QR-Code and to provide its orientation. Finally, the three spacing zones 2505, 2506 and 2507 are used for delimiting the positioning markers and the QR-Code modules encoding the information. We can further reduce the size of a half-size hidden spatial code hiding a single 2D code by removing the modules that are part of the positioning markers. These markers are reconstructed by the software recovering the hidden 2D code.

The presented example of a QR-Code of 21×21 modules contains in total 21×21=441 modules. If we keep only the information modules (FIG. 25, 2508, area of the dashed polygon), we need to hide in the printed visible layer only 249 modules. In this case, the printable active part of the visible layer will be only 249/441=56% percent of the total size when comparing with a standard version 1 QR-Code of the same information capacity.

This can be achieved by synthesizing the first half-size visible layer by hiding 129 out of the 249 information modules and synthesizing the second half-size visible layer by hiding 120 out of the 249 information modules. After having recovered the first and second half size modules hidden within them, we can reconstruct the full 2D code and decode its message content. In order to create the composite visible layer, we need to cut the information modules 2508 of FIG. 25 into small chunks of modules of different sizes (FIG. 26). These chunks are placed together into the first and second half-size active areas of the visible layers.

In reference to FIG. 26, for the hidden content of the first half-size visible layer we define the chunk area A of 5×8 modules, the area B of 8×8 modules, the area C of 2×5 modules, the area D of 2×3 modules, the area E of 1×5 modules, the area F of 2×1 modules and the area G of 2×1 modules, i.e. in total 5×8+8×8+2×5+2×3+1×5+2×1+2×1=129 information modules. These chunks A, B, C, D, E, F, G are placed as shown in FIG. 27A. For the hidden content of the second half-size visible layer we define the chunk area H of 8×5 modules, the area I of 8×5 modules and the area J of 5×8 modules, i.e. in total 8×5+8×5+5×8=120 information modules. These chunks H, I, J are placed as shown in FIG. 27B.

The hidden content of the first half-size visible layer is obtained by a matrix of 9×15 modules (FIG. 27A) combining for its indices x=[1 to 5], y=[1 to 8] (FIG. 27A, 2701) the chunk area of modules A, its indices x=[6 to 13], y≤[1 to 8] (FIG. 27A, 2702) the chunk area of modules B, its indices x=[14 to 15], y=[1 to 5] (FIG. 27A, 2703) the chunk area of modules C, its indices x=[14 to 15], y=[6 to 8] (FIG. 27A, 2704) the chunk area of modules D, its indices x=[1 to 5], y=9 (FIG. 27A, 2705) a 90 degrees clockwise rotation of the chunk area of modules E, its indices x=[6 to 7], y=9 (FIG. 27A, 2706) the chunk area of modules F and its indices x=[8 to 9], y=9 (FIG. 27A, 2707) the chunk area of modules G.

The hidden content of the second half-size visible layer is obtained by a matrix of 8×15 modules (FIG. 27B) combining for its indices x=[1 to 5], y=[1 to 8] (FIG. 27B, 2711) a 90 degrees clockwise rotation of the chunk area of modules H, for its indices x=[6 to 10], y=[1 to 8] (FIG. 27B, 2712) a 90 degrees clockwise rotation of the chunk area of modules I and its indices x=[11 to 15], y=[1 to 8] (FIG. 27B, 2713) the chunk area of modules J.

We first construct the hidden shapes with only the information modules. With them, both half-size visible layers are synthesized. We synthesize the first half-size visible layer hiding the first half-size information modules for the selected key with orientation $\theta_1$ and the second half-size visible layer hiding the second half-size information modules with possibly the same key but with the selected orientation $\theta_2$. The resulting quarter-size composite visible layer that can be printed onto valuable documents and articles is obtained by the union of the first half-size visible layer having the orientation $\theta_1=-45°$ and the second half-size visible layer having orientation $\theta_2=+45°$ (FIG. 28).

The recovery of the quarter size hidden 2D code is carried out in a similar manner as the recovery of the half size spatial code (see section "Half-size hidden 2D code"). In order to be able to reconstruct the full 2D code we define the following visible layer 2D code intersection and registration points. We define a half-size composite visible layer starting cross-grating intersection point (FIG. 28, 2801) and an active area upper 2D code registration point (FIG. 28, 2802) at the top left position of the active area of the first half-size visible layer. We also define a half-size visible layer ending cross-grating intersection point (FIG. 28, 2804) as well as an active area bottom left registration point (FIG. 28, 2803) of the upper 2D code. We further define an additional intersection point 2805 at the upper right location of the printable visible layer cross-grating.

The recovery and the decoding of the 2D code is obtained in a similar way as described in the sections "Synthesizing, reproducing, acquiring and recovering the hidden 2D code" and "Half-size hidden 2D code". We compute the acquired perspectively corrected rectified and possibly scaled half-size visible layer and superpose on top of it one after the other the two half-size hidden layers. Furthermore, we compute the effective locations of the intersection, respectively, registration points 2801, 2802, 2803, 2804 and 2805 in the acquired perspectively corrected rectified and scaled half-size visible layer. This enables recovering the first (FIG. 29A) and second (FIG. 29B) hidden contents by filtering the superposition of the visible and the hidden layers with a Gaussian low pass filter and by applying an Otsu thresholding operation.

The last step of the recovery of the full 2D code differs slightly from the method proposed in the section "Half-size hidden 2D code" since we need to reconstruct the full 2D code information modules by reordering back the recovered chunks of information modules according to the scheme shown in FIGS. 26, 27A and 27B. When the information modules are reconstructed, we need to further surround them with the three QR-Code positioning markers (FIG. 25, 2502, 2503, 2504).

We find the locations of the chunk areas in the first recovered half-size visible layer by obtaining the effective locations 2900, 2901 and 2902 (FIG. 29A) and deriving from them the corresponding chunk corners. The recovered chunk A of modules 2903 and chunk B of modules 2904 are placed side by side at the bottom part of the reconstructed QR-Code (FIGS. 30, 3000 and 3001). Chunks 2905 (C) and 2906 (D) are placed side by side in the middle of the QR-Code (FIGS. 30, 3002 and 3003). Chunk 2907 (E) is counter clockwise rotated by 90 degrees and placed at the location 3004. Chunks 2908 (F) and 2909 (G) are placed in the middle of the QR-Code at the locations 3005 and 3006. In a similar manner, we find the locations of the chunks within the second recovered half-size visible layer. The recovered chunk H of modules 2910 is counter clockwise rotated by 90 degrees and placed at the location 3015. The recovered chunk I of modules 2911 is counter clockwise rotated by 90 degrees and placed at the location 3007 and the recovered chunk J of modules 2912 is placed at the location 3008. Finally, we add in the reconstructed QR-Code the three images of the positioning markers 3009, 3010 and 3011 and we surround the reconstructed QR-Code with the safety zone area 3012. The reconstructed QR-Code image of FIG. 30 is sent to the ZXing 2D bar code decoding library and its content is decoded.

Hiding Text and Symbols

Instead of hiding 2D codes with the visible layer of scattered segments, one may also hide text or graphic symbols. The black and white areas of the letters replace the black and white areas of the 2D code. A first text message (e.g. "VALID") can be associated with the scattered segments of the visible layer oriented in one orientation and the second text message (e.g. "DOC") is associated with the scattered segments of the visible layer oriented in the second orientation. Their union yields the composite visible layer of scattered segments shown in FIG. 31. Regarding the construction of this visible layer of scattered segments, consult section "Generation of visible layer of scattered line segments having orientation θ". The message hidden within the acquired perspectively corrected, rectified and possibly scaled composite visible layer can be recovered by synthesizing in the smartphone the hidden layers with the same keys that were used for synthesizing the visible layers forming the composite visible layer. One hidden layer (FIG. 32A) reveals the first message ("VALID", FIG. 33A) and the second hidden layer (FIG. 32AB) reveals the second message ("DOC", FIG. 33B).

Hiding a 2D Code within a Graphical Halftone Image

In some cases, a customer would like to hide a message within a 2D code that forms a graphical design element. For example, the star design shown in the visible layer of FIG. 34 is represented by a combination of two segment thicknesses, a thickness $\tau_1=1$ pixel and a thickness $\tau_2=2$ pixels. This example shows that a binary design image can be used to create a visible layer with scattered segments having two different thicknesses. Black parts of the binary design image are represented by scattered lines of thickness $\tau_2=2$ pixels and white parts of the binary design image are represented by scattered lines of thickness $\tau_1=1$ pixel. The corresponding hidden layer whose inverse intensity image is given in FIG. 35 enables recovering the hidden 2D code by carrying out operations comprising superposition, Gaussian low pass filtering and thresholding. The resulting recovered 2D code is shown in FIG. 36. Depending on the material on which the visible layer is reproduced, it may be possible to extend this technique to a visible layer with more than two thicknesses, for example 3 or 4 thicknesses, thereby forming a variable intensity image. Such graphical design elements can be embodied by symbols, typographic characters, graphical shapes, logos, or clipart.

Hiding a Message with a Custom 2D Code

When a limited set of characters, numbers or signs needs to be hidden, one can conceive a custom 2D code of smaller dimensions that incorporates a limited number of small black and white lines, triangles, squares or rectangles. FIG. 38 shows on the left a visible layer with an empty active area. This visible layer comprises a solid black frame 3800, a cross grating 3801 as well the active area 3802 where a custom code 3805 could be hidden by creating according to a key a visible layer with scattered line segments. FIG. 39 shows a composite visible layer hiding one custom code by one layer of scattered segments and hiding a second custom code by a second layer of the scattered segments having an orientation orthogonal to the first layer. These custom 2D codes are revealed with hidden layers synthesized with the same key that was used to generate the layers of scattered segments forming the composite visible layer.

Applications

There are a number of applications of the present invention. Let us first describe an authentication application. Documents, labels or goods may incorporate a visible layer of scattered segments hiding a 2D code. The keys with which the scattered segments of a visible layer have been laid out are transferred to the smartphone of a person or to a computing device ("the authenticator") that authenticates the document, label or good. Within the smartphone or the computing device, the authentication application generates with the previously received key the hidden layer of scattered segments. The authentication application allows the authenticator to acquire an image of the visible layer of scattered segments, or to receive such an image from another computing device or smartphone, to perform perspective correction, rectification and to superpose on the perspectively corrected and rectified visible layer the hidden layer of scattered segments. The superposition image is low-pass filtered and thresholded, yielding the recovered 2D code. The recovered 2D code is decoded and its alphanumerical message is compared with alphanumerical messages of authentic documents, labels or goods. In case the resulting alphanumerical message matches one of the authentic alphanumerical messages, the considered document, label or good is authentic. Otherwise it is considered to be a counterfeit or a falsification. The resulting message may also be stored in a repository, either by the smartphone performing the acquisition or by a tracking computing server. In case the visible layer of scattered segments is a composite visible layer hiding two 2D codes, the same procedure is applied, but with the two keys that were used to generate the two layers of scattered segments. Up to the different orientations $\theta_1$ and $\theta_2$ of the two visible layers, the two keys may be identical. The first key enables generating the first hidden layer and the second key enables generating the second hidden layer. Their respective superpositions with the perspectively corrected and rectified composite visible layer yield the recovery of the two hidden 2D codes.

A computing server (FIG. 37, 3711) tracks the presence of valuable items such as documents or goods across locations, countries and time. Important 2D code information is hidden within the visible layer of scattered segments 3705 that is reproduced on these documents or goods (3703). In the whole system, there are a number of keys, e.g. one million keys. The keys are numbered for example from 1 to 1'000'000. There is one specific key identifier (e.g. available as a smartphone readable bar-code 3704) within each valuable item. When the valuable item is controlled, the controlling smartphone 3700 scans the bar-code with the key identifier (3704), possibly encrypted, and acquires 3706 the visible layer of scattered segments 3705. With the previously described authentication application, using the key associated to the obtained key identifier (e.g. "250" in FIG. 37) to generate the hidden layer, it can make sure that the valuable item is authentic (recovered 2D code 3715). Alternately, the controlling smartphone 3700 interacts with the computing tracking server 3711 by sending him the possibly encrypted key identifier, the acquired and perspectively corrected image of the visible layer of scattered segments and the time and location when the valuable item was controlled, e.g. when the visible layer of scattered segments was acquired (message 3717). The computing tracking server can then, if necessary, decrypt the key identifier. With the key identifier (e.g. 3716, identifier "250"), the tracking server retrieves from a file containing valid keys the key that is used to generate the hidden layer. The generated hidden layer is superposed with the perspectively corrected and rectified visible layer. The superposition, after low-pass filtering and thresholding, yields the hidden 2D code possibly incorporating important tracking information such as "product ID", "series number (NO)", "date of production (PD)", "target countries (CC)", see FIG. 37, 3715 with the revealed QR-Code showing "ID BUV25 NO 207355 PD 20220808 CC AT D F CH". The tracking server can then insert in its repository the tracking information as well as the controlling time and location. This tracking server may then establish a map showing on a user computer 3712 for a given type of articles, where and when the articles were controlled. For a given type of articles, it may also establish statistics about the number of articles that were sold in the different countries over a time period of interest. Since the 2D code is hidden, authentication and tracking can be done confidentially. Final clients buying an article have no information about the fact that such an article is authenticated and/or tracked.

ADVANTAGES OF THE PRESENT INVENTION

A. The present invention enables hiding 2D codes such as standard 2D codes, custom 2D codes and 2D shapes comprising typographic characters or graphic shapes. These 2D codes are hidden within a two-dimensional rectangular layer called "visible layer". The active area of the visible layer contains the scattered line segments hiding the 2D code. The line segments are scattered according to a key specifying length and offset of each individual line segment and specifying the orientation of the contributing line segments. The hidden 2D codes or 2D shapes can only be recovered by a second layer called "hidden layer" made of line segments scattered according to the same key and having the same orientation as the scattered segments of the visible layer. Without knowing the key, one cannot recover the hidden 2D codes or 2D shapes.

B. The key comprises at least one vector containing the lengths and the phases or the perpendicular offsets of the scattered line segments. Since the vector has as many entries as desired, within one band there can be a non-repetitive sequence of [length, offset] pairs, where each length and offset is set with the help of a random function.

C. In a preferred implementation, the scattered line segments are conceived in a horizontal space. They are then rotated to the orientation specified by the key, e.g. −45°. Since the final layout of the scattered line segments is obtained by a rotation operation, the orientation of the scattered line segments can be freely specified for a given key. Angles different from −45° and +45° can be chosen.

D. The key can also contain a plurality of vectors with [length, offset] entries, with one vector per band. All these vectors can have different contents, ensuring that no one band of scattered line segments resembles the next band of scattered line segments. Both the resulting visible layer and the hidden layer of scattered line segments generated with such a key have transitions at random locations. A potential intruder cannot guess which transitions are due to the key and which ones are due to black-white or white-black transitions of the hidden 2D code. Therefore, he cannot recover the hidden 2D code.

E. The smartphone that acquires the visible layer made of scattered line segments comprises a software cross-grating localizing module that performs rectification of the perspectively corrected visible layer by first localizing the top left of the visible layer (FIG. 16A, 161, or FIG. 16B, 166) and then by localizing the top left pixel (FIG. 16A, 164, FIG. 16B, 169, FIG. 17, 171) of the cross-grating frame circumscribing the active part of the visible layer. Finally the starting intersection location (FIG. 17, 178) of the cross-grating frame is found. This cross-grating localizing procedure avoids searching by shifting steps the spatial correspondence between the perspectively corrected rectified visible layer and the hidden layer. The smartphone therefore recovers the hidden 2D code much faster than with the prior art shift and correlation method described in U.S. Pat. No. 10,628,647.

F. An authentication framework can be structured by associating to different customers different keys. Each customer generates the visible layer of scattered segments hiding its 2D code with its own key. This key is also used to synthesize the hidden layer of scattered segments. Since a very large number of significantly different keys can be generated, many different customers (e.g. 1 million customers) can use the authentication framework simultaneously without interfering one with another. The set of all allowable keys can be sent in advance to the computing device creating the hidden layer and recovering the hidden 2D code. These keys are stored on that computing device in a key record file. For visible layer acquisition and 2D code recovery, the computing device or smartphone performing the acquisition needs only to transmit a key identifier to the computing device creating the hidden layer and recovering the hidden 2D code. This key identifier can be transmitted in encrypted or in clear form. The receiving computing device, if necessary, decrypts the key identifier and uses it to access the key in the key record file.

G. The smartphones that acquire, perspectively correct and rectify visible layers of scattered segments hiding 2D codes can be part of a larger distributed track and trace computing framework. These smartphones communicate with the computing tracking server and forward him the acquired visible layers with the hidden 2D codes, either unprocessed or after perspective correction and rectification. They possibly transfer to the tracking server the key identifier, encrypted or clear, that serves to retrieve the key. They also transmit to the tracking server the time and location when the acquisition was made. This enables the tracking server to add in its repository one entry per acquisition and to perform statistics on the locations and times of visible layer acquisitions by smartphones.

H. A visible layer of scattered line segments can have line segments of variable thicknesses and therefore show to the observer a written message or a graphic element (FIG. 34). When reproduced at high resolution, the written message or the graphic element is visible, but not the underlying scattered segments. Therefore, an observer would not suspect that additional information such as a 2D code is hidden within a visible layer built by scattered halftone line segments showing a graphical element.

I. The disclosed methods of reducing the size of 2D codes enable creating hidden codes which are either slightly more than half or slightly more than quarter the space compared with the place taken by a normal 2D code. In the case of a QR-Code version 1, the space taken on the visible layer by the information content is reduced to $^{11}/_{21}$=52.3% (see FIG. 18B, size 11×21, FIG. 18A, size 21×21). For a "quarter size" QR-Code version 1, the space taken on the visible layer by the information content is reduced to (9*15)/(21*21)=30.6% (see FIG. 27A, size 9×15, FIG. 25, size 21×21).

J. The disclosed method of hiding a custom 2D code is especially interesting for hiding into a document or valuable article a limited amount of information, for example a few numbers or a few letters selected from a limited set of letters such as {A,B,C,D}. An active area with scattered line segments comprising only 5×5 modules enables storing millions of different 2D codes. A visible layer of scattered segments comprising such a small active area, a surrounding cross grating, and a thin dark frame can be made as small as 2×2 millimeters.

K. The presented methods enable the secret transmission of information from the real world of documents and objects to databases located on computer networks. Main applications are the confidential authentication of documents and valuable articles as well as the confidential tracking of goods across space and time.

REFERENCES FROM THE SCIENTIFIC LITERATURE, CITED ABOVE

[Bradley & Roth 2007] D. Bradley, G. Roth, Adaptive Thresholding Using the Integral Image, Journal of Graphics Tools, Vol. 12, No. 2, Taylor and Francis, pp. 13-21.

[Douglas and Peucker 1973] D. H. Douglas, T. K. Peucker, Algorithms for the reduction of the number of points required to represent a digitized line or its caricature, Cartographica: The International Journal for Geographic Information and Geovisualization Vol. 10 No. 2, 1973, pp. 112-122.

[Hartley and Zisserman 2003] R. Hartley, A. Zisserman, Multiple View Geometry in Computer Vision, Section 2.3 Projective transformations, 2nd Edition, Cambridge University Press, 2003, pp. 32-36.

[Otsu 1979] N. Otsu, A threshold selection method from gray-level histograms, IEEE Transactions on Systems, Man and Cybernetics Vol. 9, No. 1, 1979, pp. 62-66.

[Suzuki and Abe 1985] S. Suzuki, K. Abe, Topological structural analysis of digitized binary images by border following, Computer Vision, Graphics, and Image Processing, Vol. 30, No 1, 1985, pp. 32-46.

The invention claimed is:

1. A method for hiding and recovering a 2D code, said 2D code being hidden within a visible layer of scattered line segments, the method comprising the step of defining a key specifying the distribution of said scattered line segments, where recovering said 2D code comprises the steps of creating within a computing device a hidden layer of line segments scattered according to said key and superposing within the computing device said hidden layer and the visible layer that has been acquired, perspectively corrected, and rectified.

2. The method of claim 1, where said key specifies lengths and phases of the scattered line segments present in the visible and hidden layers and where transitions between white and black areas of said 2D code induce additional phase changes within said visible layer of scattered line segments.

3. The method of claim 2, where the scattered segments of both the visible layer and the hidden layer have the same orientation, and where both the lengths and the phases of the scattered line segments are obtained with random functions.

4. The method of claim 2, where in white areas of said 2D code the scattered line segments of the visible layer and the scattered line segments of the hidden layer are disjoint and where in black areas of the 2D code, the scattered line segments of the visible layer and of the hidden layer overlap.

5. The method of claim 2, where the lengths and the phases of the line segments are specified in a horizontal space formed by vertically laid out horizontal bands and where the actual line segments are created at an oblique orientation by rotating the line segments specified in the horizontal space.

6. The method of claim 5, where sequences of scattered line segments repeat themselves horizontally within the horizontal bands, where sequences of scattered segments on other bands are shifted instances of the scattered line segments present in a base band, the shift values being given by sequence shift numbers stored into a sequence shift number vector, and where sequence shift numbers are random integer numbers between 1 and w−1, where w is the length of said sequences of scattered line segments.

7. The method of claim 1, where the visible layer displays a graphic element formed by the scattered line segments at different thicknesses, said graphic element being selected from the group of graphic shapes, symbols, typographic characters, logos, and clipart.

8. The method of claim 1, where the visible layer is a composite visible layer which hides a first 2D code within a first layer of scattered line segments at a first orientation $\theta_1$ and hides a second 2D code within a second layer of scattered line segments at a second orientation $\theta_2$ and where the composite visible layer of scattered line segments is the union of the first and second layers of scattered line segments.

9. The method of claim 1, where rectification of the acquired and perspectively corrected visible layer is carried out by localizing a cross-grating frame surrounding the area of the scattered line segments, by establishing correspondences between theoretically correct cross-grating intersections and actual cross-grating intersections and by deriving from said correspondences a geometric transformation mapping actual visible layer scattered segment locations onto locations as close as possible to theoretically correct visible layer scattered segment locations.

10. The method of claim 9, where localization of the cross-grating frame is embodied by localizing the top left corner of the cross-grating frame, the localization comprising a moving horizontal kernel and a moving vertical kernel giving at each position the average intensity of the underlying part of the visible layer, where by traversing areas selected from the succession of high intensity, low intensity, high intensity and middle intensity areas, the vertical kernel locates the leftmost location and the horizontal kernel the top most location of the cross-grating, said left most and top most locations defining coordinates of the top left corner of the cross-grating.

11. The method of claim 1, where the top part of the hidden 2D code is hidden by scattered line segments at a first orientation and the bottom part of the hidden 2D code is hidden by scattered line segments at a second orientation and where said top part and said bottom part are recovered separately and assembled into a full 2D code.

12. The method of claim 1, where the hidden 2D code is derived from a QR Code whose information modules are rearranged to form a first part hidden by scattered line segments at a first orientation and a second part hidden by scattered line segments at a second orientation and where recovering said QR Code requires recovering said first part by superposing on the acquired, perspectively corrected, and rectified visible layer a first hidden layer and said second part by superposing on said visible layer a second hidden layer, and reassembling into a full QR Code the recovered information modules obtained by said recovered first and second parts.

13. The method of claim 1, where said computing device comprises a camera or a scanner for the acquisition of the visible layer, and where said computing device sends the recovered 2D code to a tracking computing server which enters the corresponding decoded 2D code message into a repository.

14. The method of claim 1, where the computing device is a distributed computing system comprising at least two computers, where the acquisition of the visible layer is performed by one of said computers interfaced with a camera or with a scanner, where steps of perspective correction, rectification, creation of the hidden layer, superposition of the hidden and the visible layers, low pass filtering and thresholding are performed by at least one computer of the distributed computing system and where one of the computers writes into a repository the recovered and decoded 2D code message as well as the time and geographic location of the acquisition.

15. The method of claim 1, where the hidden and recovered 2D code is a spatial code selected from the set of QR Codes, data matrix codes, Aztec codes, 1D bar codes, custom codes, written words, alphanumerical signs, and symbols.

16. The method of claim 1, where the visible layer of scattered line segments is obtained by a process for transferring an image onto a substrate, said process being selected from the set of lithographic, photolithographic, photographic, electro-photographic, patterning, engraving, laser engraving on plastic, metal or other substrates, etching, perforating, embossing, vaporizing, material deposition, molding, 2D printing, and 3D printing processes.

17. The method of claim 1, where the visible layer of scattered line segments is obtained by (i) printing with ink on paper, (ii) printing with ink on plastic, (iii) deposition of metal on a substrate selected from metal, plastic, silicon and glass, (iv) deposition of plastic on a substrate selected from metal, plastic, silicon and glass, (v) patterning on plastic, (vi) patterning on metal, (vii) patterning on glass, (viii) injection of plastic, (ix) molding of plastic, (x) molding of metal, (xi) 3D printing of plastic, or (xii) 3D printing of metal.

18. A composite visible layer comprising randomly scattered line segments laid out along two different orientations, whose line segment distribution hides at least one 2D code, said 2D code being recoverable by a computing device, equipped with a camera or a scanner, (a) carrying out an acquisition of said composite visible layer, (b) performing on the acquired composite visible layer a perspective correction, (c) performing on the acquired and perspectively corrected visible layer a rectification, (d) synthesizing a hidden layer of scattered line segments with a same key that was used to synthesize the scattered line segments of the visible layer and (e) superposing the acquired, perspectively corrected and rectified composite visible layer with said synthesized hidden layer of scattered line segments, (f) low-pass filtering and thresholding the superposition, thereby recovering the hidden 2D code.

19. The composite visible layer of claim 18, where the computing device transmits the acquired perspectively corrected visible layer to a tracking computing server, said tracking computing server performing steps (c), (d), (e) and (f), thereby recovering the hidden 2D code, decoding it and storing its message into a repository.

20. The composite visible layer of claim 18, where the computing device is a smartphone and where the visible layer is obtained by an operation selected from the set of: (i) printing with ink on paper, (ii) printing with ink on plastic, (iii) laser engraving on plastic, metal or other substrates, (v) deposition of metal on a substrate selected from metal, plastic, silicon and glass, (iv) deposition of plastic on a substrate selected from metal, plastic, silicon and glass, (vi) patterning on plastic, (vii) patterning on metal, (viii) patterning on glass, (ix) injection of plastic, (x) molding of plastic, (xi) molding of metal, (xii) 3D printing of plastic, and (xiii) 3D printing of metal.

21. A computing device operable for authenticating documents or goods by recovering a 2D code hidden into a visible layer of line segments scattered according to a key, said computing device comprising:
(i) a CPU, a memory, a display, a camera and a network interface;
(ii) a software module operable for acquisition, perspective correction, and rectification of said visible layer of scattered line segments;
(iii) a software module operable for the synthesis of a hidden layer made of line segments scattered according to said key;
(iv) a software module for the superposition of the perspectively corrected rectified visible layer and of said hidden layer; said superposition enabling recovering, after low-pass filtering, and thresholding, the hidden 2D code and after decoding, the corresponding 2D code message.

22. The computing device of claim 21, embodied by a smartphone, where the key specifying the layout of scattered line segments specifies for each line segment both its length and its phase, where lengths and phases of the scattered line segments are obtained by random number generation.

23. The smartphone of claim 22, where the layout of scattered line segments is specified in a horizontal space formed by vertically laid out horizontal bands and where the actual scattered line segments are created at an oblique orientation, by rotating the scattered line segments specified in the horizontal space.

24. The smartphone of claim 23, where a sequence of scattered line segments repeats itself horizontally within a horizontal base band and where sequences of scattered line segments on neighboring bands are shifted instances of the scattered line segments present in the base band, shift values being given by sequence shift numbers stored in a sequence shift number vector, said sequence shift numbers being integer random numbers between 1 and w−1, where w is the length of the sequence of scattered line segments.

25. The smartphone of claim 22, where, for authentication purpose, the recovered 2D code is decoded into a message, said message being compared with a list of valid messages.

26. The computing device of claim 21, where the recovered 2D code messages associated with the documents or goods are stored in a repository with the aim of establishing statistics about the presence of said documents or goods both in terms of geographic location and in terms of time.

* * * * *